United States Patent
Nourai et al.

(10) Patent No.: US 11,790,482 B2
(45) Date of Patent: Oct. 17, 2023

(54) MIXED REALITY SYSTEM WITH VIRTUAL CONTENT WARPING AND METHOD OF GENERATING VIRTUAL CONTENT USING SAME

(71) Applicant: Magic Leap, Inc., Plantation, FL (US)

(72) Inventors: Reza Nourai, Danville, CA (US); Robert Blake Taylor, Porter Ranch, CA (US); Michael Harold Liebenow, Loxahatchee, FL (US); Gilles Cadet, Davie, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/659,284

(22) Filed: Apr. 14, 2022

(65) Prior Publication Data

US 2022/0245758 A1    Aug. 4, 2022

Related U.S. Application Data

(63) Continuation of application No. 16/518,431, filed on Jul. 22, 2019, now Pat. No. 11,379,948.

(60) Provisional application No. 62/702,238, filed on Jul. 23, 2018.

(51) Int. Cl.
*G06T 3/00* (2006.01)
*G06F 3/01* (2006.01)
*G06T 19/00* (2011.01)

(52) U.S. Cl.
CPC ............ *G06T 3/0093* (2013.01); *G06F 3/011* (2013.01); *G06F 3/017* (2013.01); *G06T 19/006* (2013.01)

(58) Field of Classification Search
CPC ..... G06T 3/0093; G06T 19/006; G06T 15/20; G06T 17/20; G06F 3/011; G06F 3/017; G06F 3/013
See application file for complete search history.

(56) References Cited

U.S. PATENT DOCUMENTS

| | | | |
|---|---|---|---|
| 4,462,165 A | 7/1984 | Lewis | |
| 5,280,265 A | 1/1994 | Kramer et al. | |
| 5,583,974 A | 12/1996 | Winner et al. | |
| 5,592,401 A | 1/1997 | Kramer | |
| 5,684,498 A | 11/1997 | Welch et al. | |

(Continued)

FOREIGN PATENT DOCUMENTS

| | | |
|---|---|---|
| AU | 2017214748 | 8/2018 |
| AU | 2017305227 | 2/2019 |

(Continued)

OTHER PUBLICATIONS

Foreign Examiner's Report for CA Patent Appln. No. 2979560 dated May 31, 2022.

(Continued)

*Primary Examiner* — Maurice L. McDowell, Jr.
(74) *Attorney, Agent, or Firm* — Vista IP Law Group, LLP

(57) ABSTRACT

A computer implemented method for warping virtual content includes receiving rendered virtual content data, the rendered virtual content data including a far depth. The method also includes receiving movement data indicating a user movement in a direction orthogonal to an optical axis. The method further includes generating warped rendered virtual content data based on the rendered virtual content data, the far depth, and the movement data.

19 Claims, 57 Drawing Sheets

(56) References Cited

U.S. PATENT DOCUMENTS

| | | |
|---|---|---|
| 5,784,115 A | 7/1998 | Bozdagi |
| 5,844,530 A | 12/1998 | Tosaki |
| 5,930,741 A | 7/1999 | Kramer |
| 6,377,401 B1 | 4/2002 | Bartlett |
| 6,407,736 B1 | 6/2002 | Regan |
| 6,701,296 B1 | 3/2004 | Kramer et al. |
| 6,891,533 B1 | 5/2005 | Alcorn et al. |
| 7,375,529 B2 | 5/2008 | Dupuis et al. |
| 7,443,154 B1 | 10/2008 | Merewether et al. |
| 8,165,352 B1 | 4/2012 | Mohanty et al. |
| 8,401,308 B2 | 3/2013 | Nakamura et al. |
| 8,446,426 B2 | 5/2013 | Gonion |
| 8,950,867 B2 | 2/2015 | Macnamara |
| 8,989,775 B2 | 3/2015 | Shaw |
| 9,013,505 B1 | 4/2015 | Thorton |
| 9,160,727 B1 | 10/2015 | Saylor et al. |
| 9,215,293 B2 | 12/2015 | Miller |
| 9,417,452 B2 | 8/2016 | Schowengerdt et al. |
| 9,465,129 B1 | 10/2016 | Olsson et al. |
| 9,639,935 B1 | 5/2017 | Douady-Plevin et al. |
| 9,671,566 B2 | 6/2017 | Abovitz et al. |
| 9,791,700 B2 | 10/2017 | Schowengerdt |
| 9,814,430 B1 | 11/2017 | Berme et al. |
| 9,874,749 B2 | 1/2018 | Bradski et al. |
| 9,952,673 B2 | 4/2018 | Kramer et al. |
| 10,130,429 B1 | 11/2018 | Weir |
| 10,338,677 B2 | 7/2019 | Guenter |
| 10,481,689 B1 | 11/2019 | Jeromin |
| 10,721,280 B1 | 7/2020 | Heppner et al. |
| 10,843,067 B1 | 11/2020 | Peuhkurinen et al. |
| 10,942,252 B2 | 3/2021 | Chen et al. |
| 10,964,119 B2 | 3/2021 | Nourai et al. |
| 11,176,901 B1 | 11/2021 | Hunt et al. |
| 11,315,214 B2 | 4/2022 | Liebenow et al. |
| 2001/0043738 A1 | 11/2001 | Sawney et al. |
| 2002/0033803 A1 | 3/2002 | Holzrichter et al. |
| 2002/0180727 A1 | 12/2002 | Guckenberger et al. |
| 2003/0052965 A1 | 3/2003 | Junkins et al. |
| 2003/0092448 A1 | 5/2003 | Forstrom et al. |
| 2003/0120448 A1 | 7/2003 | Moriya et al. |
| 2003/0234823 A1 | 12/2003 | Sato et al. |
| 2004/0140949 A1 | 7/2004 | Takagi |
| 2004/0174337 A1 | 9/2004 | Kubota et al. |
| 2004/0201857 A1 | 10/2004 | Foxlin |
| 2005/0107870 A1 | 5/2005 | Wang et al. |
| 2005/0156601 A1 | 7/2005 | Dupuis et al. |
| 2006/0161871 A1 | 7/2006 | Hotelling et al. |
| 2006/0253804 A1 | 11/2006 | Fukushima et al. |
| 2007/0049374 A1 | 3/2007 | Ikeda et al. |
| 2007/0072674 A1 | 3/2007 | Ohta et al. |
| 2007/0126733 A1 | 6/2007 | Yang et al. |
| 2007/0273644 A1 | 11/2007 | Mondine Natucci |
| 2007/0298883 A1 | 12/2007 | Feldman et al. |
| 2008/0024523 A1 | 1/2008 | Tomite et al. |
| 2008/0133521 A1 | 6/2008 | Podilchuk |
| 2008/0275667 A1 | 11/2008 | Ohta |
| 2008/0309884 A1 | 12/2008 | O'Dor et al. |
| 2009/0005166 A1 | 1/2009 | Sato |
| 2009/0051653 A1 | 2/2009 | Barney et al. |
| 2009/0115406 A1 | 5/2009 | Anderson et al. |
| 2009/0173886 A1 | 7/2009 | Chowdhury |
| 2009/0184825 A1 | 7/2009 | Anderson |
| 2010/0066676 A1 | 3/2010 | Kramer et al. |
| 2010/0085423 A1 | 4/2010 | Lange |
| 2010/0103205 A1 | 4/2010 | Lisaka et al. |
| 2010/0141261 A1 | 7/2010 | Overby et al. |
| 2010/0277476 A1 | 11/2010 | Johansson et al. |
| 2010/0302152 A1 | 12/2010 | Kirigaya |
| 2010/0309292 A1 | 12/2010 | Ho et al. |
| 2011/0018874 A1 | 1/2011 | Hasselgreen et al. |
| 2011/0025603 A1 | 2/2011 | Underkoffler et al. |
| 2011/0184950 A1 | 7/2011 | Skaff et al. |
| 2011/0199088 A1 | 8/2011 | Bittar et al. |
| 2011/0238399 A1 | 9/2011 | Ophir et al. |
| 2011/0248987 A1 | 10/2011 | Mitchell |
| 2011/0263329 A1 | 10/2011 | Miyazaki et al. |
| 2011/0298748 A1 | 12/2011 | Chen et al. |
| 2011/0304699 A1* | 12/2011 | Ito .................. H04N 13/117 348/47 |
| 2011/0304708 A1* | 12/2011 | Ignatov ............. H04N 13/128 348/51 |
| 2012/0038549 A1 | 2/2012 | Mandella et al. |
| 2012/0099800 A1 | 4/2012 | Llano et al. |
| 2012/0117076 A1 | 5/2012 | Austermann et al. |
| 2012/0194516 A1 | 8/2012 | Newcombe et al. |
| 2012/0206451 A1* | 8/2012 | Tian .................. G06T 15/205 345/419 |
| 2012/0206452 A1 | 8/2012 | Geisner et al. |
| 2012/0236030 A1 | 9/2012 | Border et al. |
| 2012/0328196 A1 | 12/2012 | Kasahara et al. |
| 2013/0002614 A1 | 1/2013 | Nowatzyk et al. |
| 2013/0083011 A1 | 4/2013 | Geisner et al. |
| 2013/0084984 A1 | 4/2013 | Gagner et al. |
| 2013/0117377 A1 | 5/2013 | Miller |
| 2013/0128230 A1 | 5/2013 | Macnamara |
| 2013/0147790 A1* | 6/2013 | Hildreth .................. G06F 3/011 345/419 |
| 2013/0169626 A1 | 7/2013 | Balan et al. |
| 2013/0225199 A1 | 8/2013 | Shaw |
| 2013/0230211 A1 | 9/2013 | Tanabiki et al. |
| 2013/0241773 A1 | 9/2013 | Laine |
| 2013/0278635 A1 | 10/2013 | Maggiore |
| 2013/0290222 A1 | 10/2013 | Gordo et al. |
| 2013/0312009 A1 | 11/2013 | Kramer et al. |
| 2013/0321462 A1 | 12/2013 | Salter et al. |
| 2013/0346168 A1 | 12/2013 | Zhou et al. |
| 2014/0006026 A1 | 1/2014 | Lamb et al. |
| 2014/0011589 A1 | 1/2014 | Barney et al. |
| 2014/0037140 A1 | 2/2014 | Benhimane et al. |
| 2014/0062841 A1 | 3/2014 | Ishikawa et al. |
| 2014/0075060 A1 | 3/2014 | Sharp et al. |
| 2014/0080428 A1 | 3/2014 | Rhoads et al. |
| 2014/0119598 A1 | 5/2014 | Ramachandran et al. |
| 2014/0139226 A1 | 5/2014 | Jaaskelainen et al. |
| 2014/0145932 A1 | 5/2014 | Underkoffler et al. |
| 2014/0176591 A1 | 6/2014 | Klein et al. |
| 2014/0181587 A1 | 6/2014 | Sridharan et al. |
| 2014/0195988 A1 | 7/2014 | Kramer et al. |
| 2014/0212027 A1 | 7/2014 | Hallquist et al. |
| 2014/0222409 A1 | 8/2014 | Efrat et al. |
| 2014/0225822 A1 | 8/2014 | Underkoffler et al. |
| 2014/0267420 A1 | 9/2014 | Schowengerdt et al. |
| 2014/0267646 A1 | 9/2014 | Na'Aman et al. |
| 2014/0285375 A1 | 9/2014 | Crain |
| 2014/0298269 A1 | 10/2014 | Underkoffler et al. |
| 2014/0306866 A1 | 10/2014 | Miller et al. |
| 2014/0321702 A1 | 10/2014 | Schmalstieg |
| 2014/0323148 A1 | 10/2014 | Schmalstieg et al. |
| 2014/0325373 A1 | 10/2014 | Kramer et al. |
| 2014/0354548 A1 | 12/2014 | Lee |
| 2015/0002542 A1 | 1/2015 | Chan et al. |
| 2015/0016777 A1 | 1/2015 | Abovitz et al. |
| 2015/0019651 A1 | 1/2015 | Kazi et al. |
| 2015/0029218 A1 | 1/2015 | Williams et al. |
| 2015/0040074 A1 | 2/2015 | Hofmann et al. |
| 2015/0070347 A1 | 3/2015 | Hofmann et al. |
| 2015/0071525 A1* | 3/2015 | Routhier ............. H04N 13/128 382/154 |
| 2015/0077326 A1 | 3/2015 | Kramer et al. |
| 2015/0092015 A1 | 4/2015 | Stafford |
| 2015/0100380 A1 | 4/2015 | Jones, Jr. et al. |
| 2015/0100593 A1 | 4/2015 | Underkoffler et al. |
| 2015/0161476 A1 | 6/2015 | Kurz et al. |
| 2015/0163345 A1 | 6/2015 | Cornaby et al. |
| 2015/0172568 A1 | 6/2015 | Choe et al. |
| 2015/0177831 A1 | 6/2015 | Chan et al. |
| 2015/0178554 A1 | 6/2015 | Kanaujia et al. |
| 2015/0178939 A1 | 6/2015 | Bradski et al. |
| 2015/0205126 A1 | 7/2015 | Schowengerdt |
| 2015/0205364 A1 | 7/2015 | Underkoffler et al. |
| 2015/0205388 A1 | 7/2015 | Osterhout |
| 2015/0215611 A1 | 7/2015 | Wu et al. |
| 2015/0221133 A1 | 8/2015 | Groten et al. |
| 2015/0234477 A1 | 8/2015 | Abovitz et al. |

(56) References Cited

U.S. PATENT DOCUMENTS

| | | |
|---|---|---|
| 2015/0243080 A1 | 8/2015 | Steinbach et al. |
| 2015/0262372 A1 | 9/2015 | Cardoso et al. |
| 2015/0301592 A1 | 10/2015 | Miller |
| 2015/0302652 A1 | 10/2015 | Miller et al. |
| 2015/0309264 A1 | 10/2015 | Abovitz et al. |
| 2015/0309563 A1 | 10/2015 | Connor |
| 2015/0310310 A1 | 10/2015 | Hesch |
| 2015/0324198 A1 | 11/2015 | Alsup et al. |
| 2015/0339857 A1 | 11/2015 | O'Connor et al. |
| 2015/0346495 A1 | 12/2015 | Welch et al. |
| 2015/0358539 A1 | 12/2015 | Catt |
| 2015/0371082 A1 | 12/2015 | Csaszar et al. |
| 2015/0373369 A1 | 12/2015 | Jalai et al. |
| 2015/0379772 A1 | 12/2015 | Hoffman |
| 2016/0005233 A1 | 1/2016 | Fraccaroli et al. |
| 2016/0012643 A1 | 1/2016 | Kezele et al. |
| 2016/0016752 A1 | 1/2016 | Helseth et al. |
| 2016/0018896 A1 | 1/2016 | Kramer et al. |
| 2016/0021511 A1 | 1/2016 | Jin et al. |
| 2016/0026253 A1 | 1/2016 | Bradski et al. |
| 2016/0033768 A1 | 2/2016 | Pedrotti et al. |
| 2016/0041048 A1 | 2/2016 | Blum et al. |
| 2016/0098095 A1 | 4/2016 | Gonzalez-Banos et al. |
| 2016/0104311 A1 | 4/2016 | Allyn |
| 2016/0117822 A1 | 4/2016 | Yii et al. |
| 2016/0133201 A1 | 5/2016 | Border et al. |
| 2016/0147065 A1 | 5/2016 | Border et al. |
| 2016/0147070 A1 | 5/2016 | Border et al. |
| 2016/0171644 A1 | 6/2016 | Gruber |
| 2016/0180151 A1 | 6/2016 | Philbin et al. |
| 2016/0180592 A1 | 6/2016 | Bean et al. |
| 2016/0189680 A1 | 6/2016 | Paquette |
| 2016/0203624 A1 | 7/2016 | Anderson |
| 2016/0210783 A1 | 7/2016 | Tomlin et al. |
| 2016/0240008 A1 | 8/2016 | Haddick et al. |
| 2016/0259032 A1 | 9/2016 | Hehn |
| 2016/0259404 A1 | 9/2016 | Woods |
| 2016/0262608 A1 | 9/2016 | Krueger |
| 2016/0282619 A1 | 9/2016 | Oto |
| 2016/0294958 A1 | 10/2016 | Zhang et al. |
| 2016/0299567 A1 | 10/2016 | Crisler et al. |
| 2016/0327789 A1 | 11/2016 | Klug et al. |
| 2016/0378863 A1 | 12/2016 | Shlens et al. |
| 2016/0379092 A1 | 12/2016 | Kutliroff |
| 2017/0011555 A1 | 1/2017 | Li et al. |
| 2017/0032220 A1 | 2/2017 | Medasani et al. |
| 2017/0076328 A1 | 3/2017 | Suzuki |
| 2017/0098406 A1 | 4/2017 | Kobayashi |
| 2017/0109916 A1 | 4/2017 | Kurz et al. |
| 2017/0126988 A1 | 5/2017 | Holzer et al. |
| 2017/0148206 A1 | 5/2017 | Donner et al. |
| 2017/0160798 A1 | 6/2017 | Lanman et al. |
| 2017/0161853 A1 | 6/2017 | Gossweiler et al. |
| 2017/0161919 A1 | 6/2017 | Schroeder |
| 2017/0177082 A1 | 6/2017 | Michail et al. |
| 2017/0184387 A1 | 6/2017 | Lefevre et al. |
| 2017/0205903 A1 | 7/2017 | Miller et al. |
| 2017/0213473 A1 | 7/2017 | Ribeira et al. |
| 2017/0243324 A1 | 8/2017 | Mierle et al. |
| 2017/0244811 A1 | 8/2017 | Mckenzie et al. |
| 2017/0345220 A1 | 11/2017 | Bates |
| 2017/0345398 A1 | 11/2017 | Fuchs et al. |
| 2017/0359570 A1 | 12/2017 | Holzer et al. |
| 2018/0039083 A1 | 2/2018 | Miller et al. |
| 2018/0047332 A1 | 2/2018 | Kuwahara |
| 2018/0053284 A1 | 2/2018 | Rodriguez et al. |
| 2018/0054712 A1 | 2/2018 | Ahuja et al. |
| 2018/0107346 A1 | 4/2018 | Wilson |
| 2018/0203235 A1 | 7/2018 | Fix et al. |
| 2018/0213359 A1 | 7/2018 | Reinhardt et al. |
| 2018/0267309 A1 | 9/2018 | Klug et al. |
| 2018/0268518 A1 | 9/2018 | Nourai et al. |
| 2018/0268519 A1 | 9/2018 | Liebenow et al. |
| 2018/0268610 A1 | 9/2018 | Nourai et al. |
| 2018/0301076 A1 | 10/2018 | Trythall |
| 2018/0315362 A1 | 11/2018 | Newton |
| 2018/0365882 A1 | 12/2018 | Croxsford et al. |
| 2019/0015167 A1 | 1/2019 | Draelos et al. |
| 2019/0056693 A1 | 2/2019 | Gelman et al. |
| 2019/0064526 A1 | 2/2019 | Connor |
| 2019/0066353 A1 | 2/2019 | Anderson et al. |
| 2019/0066365 A1 | 2/2019 | Schmalstieg et al. |
| 2019/0155374 A1 | 5/2019 | Miller et al. |
| 2019/0156504 A1 | 5/2019 | Jiang et al. |
| 2019/0333263 A1 | 10/2019 | Melkote Krishnaprasad et al. |
| 2019/0355176 A1 | 11/2019 | Evans |
| 2020/0005517 A1 | 1/2020 | Anderson et al. |
| 2020/0027194 A1 | 1/2020 | Nourai et al. |
| 2020/0184712 A1 | 6/2020 | Schmalstieg et al. |
| 2020/0209978 A1 | 7/2020 | Pahud et al. |

FOREIGN PATENT DOCUMENTS

| | | |
|---|---|---|
| AU | 2018234921 | 10/2021 |
| AU | 2021204725 B2 | 8/2022 |
| AU | 2021290369 B2 | 10/2022 |
| CA | 2142338 | 3/1994 |
| CA | 2358682 | 3/1994 |
| CN | 101093586 | 12/2007 |
| CN | 101530325 | 9/2009 |
| CN | 103792661 | 5/2014 |
| CN | 104011788 | 8/2014 |
| CN | 104866829 | 8/2015 |
| EP | 2887311 | 6/2015 |
| JP | 2001-208529 | 8/2001 |
| JP | 2007-128009 | 5/2007 |
| JP | 2012-43308 | 3/2012 |
| JP | 2012-96027 | 5/2012 |
| JP | 2015-52832 | 3/2015 |
| JP | 2016-528476 | 9/2016 |
| KR | 10-2014-0034252 | 3/2014 |
| KR | 10-2016-0013939 | 2/2016 |
| KR | 10-2016-0023888 | 2/2016 |
| WO | WO 94/04938 | 3/1994 |
| WO | WO 2009/091563 | 7/2009 |
| WO | WO 2014/160342 | 10/2014 |
| WO | WO 2015134958 | 9/2015 |
| WO | WO 2016/038240 | 3/2016 |
| WO | WO 2016141373 | 9/2016 |
| WO | WO 2017096396 | 6/2017 |
| WO | WO 2017136833 | 8/2017 |
| WO | WO 9720244 | 12/2019 |
| WO | WO 2020/023383 | 1/2020 |

OTHER PUBLICATIONS

Foreign OA for JP Patent Appln. No. 2021-116964 dated Jun. 6, 2022.

Foreign NOA for JP Patent Appln. No. 2022-2800 dated May 24, 2022.

Foreign NOA for JP Patent Appln. No. 2022-2802 dated May 24, 2022.

Foreign Response for JP Patent Appln. No. 2021-41375 dated May 30, 2022.

Foreign Exam Report for AU Patent Appln. No. 2022200841 dated May 19, 2022.

Foreign Response for CN Patent Appln. No. 201880007856.8 dated Apr. 4, 2023.

Notice of Allowance for U.S. Appl. No. 17/514,606 dated Apr. 5, 2023.

Foreign Exam Report for CA Patent Appln. No. 3054619 dated Mar. 28, 2023.

Foreign OA for CN Patent Appln. No. 201880018310.2 dated Mar. 7, 2023 (with English translation).

Foreign Response for JP Patent Appln. No. 2021-41375 dated Apr. 19, 2023.

Foreign Response for AU Patent Appln. No. 2022200841 dated Apr. 20, 2023.

Foreign OA for CN Patent Appln. No. 201880018506.1 dated Mar. 8, 2023 (with English translation).

(56) References Cited

OTHER PUBLICATIONS

Foreign Exam Report for CA Patent Appln. No. 2979560 dated Jan. 10 2023.
Foreign OA for JP Patent Appln. No. 2021-50357 dated Dec. 27, 2022 (with English translation).
Foreign Response for AU Patent Appln. No. 2022200841 dated Jan. 16, 2023.
Foreign Response for JP Patent Appln. No. 2021-168082 dated Jan. 16, 2023.
Foreign OA for CN Patent Appln. No. 201880007856.8 dated Nov. 30, 2022 (with English translation).
Foreign OA for KR Patent Appln. No. 10-2022-7005613 dated Dec. 26, 2022 (with English translation).
Foreign NOA for IL Patent Appln. No. 293782 dated Dec. 18, 2022 in English.
Foreign NOA for AU Patent Appln. No. 2021204725 dated Jul. 26, 2022.
Notice of Allowance for U.S. Appl. No. 17/353,434 dated Aug. 15, 2022.
Foreign Exam Report for NZ Patent Appln. No. 750261 dated Aug. 5, 2022.
Foreign FOA for KR Patent Appln. No. 10-2021-7006131 dated Aug. 25, 2022.
Foreign Response for KR Patent Appln. No. 10-2022-7005613 dated Aug. 29, 2022.
Foreign Response for CA Patent Appln. No. 2979560 dated Apr. 27, 2023.
Foreign NOA for JP Patent Appln. No. 2021-168082 dated May 15, 2023.
Foreign OA for KR Patent Appln. No. 10-2021-7012722 dated Apr. 19, 2023 (with English translation).
Foreign OA for CN Patent Appln. No. 201780054387.0 dated Apr. 28, 2023.
Amendment Response to NFOA for U.S. Appl. No. 17/652,964 dated May 8, 2023.
Foreign Exam Report for CA Patent Appln. No. 3011377 dated Feb. 22, 2023.
Foreign Exam Report for AU Patent Appln. No. 2022200841 dated Feb. 13, 2023.
Notice of Allowance for U.S. Appl. No. 17/514,606 dated Feb. 6, 2023.
Foreign NOA for CN Patent Appln. No. 201980049056.7 dated Feb. 21, 2023.
Foreign Exam Report for EP Patent Appln. No. 17837488.0 dated Mar. 16, 2023.
Ferhat Altai et al: "Physical Human Activity Recognition Using Wearable Sensors", Sensors, vol. 15, No. 12, Dec. 11, 2015 (Dec. 11, 2015 ), pp. 31314-31338, XP055397645, DOI: 10.3390/s151229858.
Aryabrata Basu et al: "Immersive 3DUI on one dollar a day", 3D User Interfaces (3DUI), 2012 IEEE Symposium On, IEEE, Mar. 4, 2012 (Mar. 4, 2012), pp. 97-100, XP032169260, DOI: 10.1 1 09/3DUI.2012.6184191, ISBN : 978-1-4673-1204-2.
Foreign OA for KR Patent Appln. No. 10-2022-7041575 dated Feb. 24, 2023.
Foreign Response for KR Patent Appln. No. 10-2022-7005613 dated Mar. 24, 2023.
Foreign NOA for IL Patent Appln. No. 294134 dated Feb. 26, 2023.
Foreign Resonse for JP Patent Appln. No. 2021-503570 dated Mar. 27, 2023.
Foreign NOA for IL Patent Appln. No. 290142 dated Feb. 27, 2023.
Non-Final Office Action for U.S. Appl. No. 17/652,964 dated Feb. 8, 2023.
Foreign OA for JP Patent Appln. No. 2021-41375 dated Jan. 25, 2023 (with English translation).
Foreign Response for CN Patent Appln. No. 201780054387.0 dated Feb. 15, 2023.
Amendment Response to NFOA for U.S. Appl. No. 17/514,606 dated Dec. 19, 2022.
Foreign Response for CN Patent Appln. No. 201980049056.7 dated Nov. 25, 2022.
Notice of Allowance for U.S. Appl. No. 17/813,442 dated Dec. 2, 2022.
Non-Final Office Action for U.S. Appl. No. 14/641,376 dated Apr. 14, 2016.
Response to Non-Final office action filed Sep. 12, 2016 for U.S. Appl. No. 14/641,376.
Final Office Action for U.S. Appl. No. 14/641,376 dated Nov. 14, 2016.
Response to Final Office action filed Mar. 14, 2017 for U.S. Appl. No. 14/641,376.
PCT International Search Report and Written Opinion for International Appln. No. PCT/US15/19339, Applicant Magic Leap, Inc., Forms PCT/ISA/210, 220, and 237, dated Jun. 24, 2015 (10 pages).
PCT International Search Report and Written Opinion for International Appln. No. PCT/US16/21095, Applicant Magic Leap, Inc., forms PCT/ISA/210, 220, and 237, dated May 31, 2016 (12 pages).
PCT International Search Report and Written Opinion for International Appln. No. PCT/US16/65001, Applicant Magic Leap, Inc., forms PCT/ISA/210, 220, and 237, dated Feb. 16, 2017 (16 pages).
PCT International Search Report and Written Opinion for International Appln. No. PCT/US2017/016722, Applicant Magic Leap, Inc., forms PCT/ISA/210, 220, and 237, dated Apr. 14, 2017 (24 pages).
Notice of Allowance dated Aug. 14, 2017 for U.S. Appl. No. 14/641,376.
Preliminary Amendment filed Aug. 24, 2017 for U.S. Appl. No. 15/425,837.
Non-Final Office Action dated Dec. 6, 2017 for U.S. Appl. No. 15/062,104.
Voluntary Amendment for Canadian Appln. No. 2979560 filed Oct. 6, 2017, 24 pages.
Voluntary Amendment for Japanese Appln. No. 2017-546703 filed Nov. 7, 2017, 7 pages.
Response to Non-Final office action filed Mar. 6, 2018 for U.S. Appl. No. 15/062,104.
Final Office Action filed Apr. 30, 2018 for U.S. Appl. No. 15/062,104.
Coiliot, C., Moutoussamy, J., Boda, M., and Leroy, P.: New ferromagnetic core shapes for induction sensors, J. Sens. Sens. Syst., 3,1-8, https://doi.org/10.5194/jsss-3-1-2014, 2014.
Non-Final Office Action dated Apr. 5, 2018 for U.S. Appl. No. 15/425,837.
Response to Non-Final Office Action filed Jul. 5, 2018 for U.S. Appl. No. 15/425,837.
Pre appeal brief filed Aug. 30, 2018 for U.S. Appl. No. 15/062,104.
Notice of Allowance dated Sep. 6, 2018 for U.S. Appl. No. 15/425,837.
Extended European Search Report dated Oct. 16, 2018 for EP Application No. 16759643.6.
Amendment After Allowance dated Nov. 15, 2018 for U.S. Appl. No. 15/425,837.
Non final Office Action dated Nov. 29, 2018 for U.S. Appl. No. 15/369,646.
Extended European Search Report dated Jan. 7, 2019 for EP Application No. 16871733.8.
Song Yafei et al.: Fast Estimation of Relative Poses for 6-DOF Image Localization, 2015 IEEE International Conference on Multimedia Big Data, IEEE; Apr. 20, 2015, pp. 156-163, XP033173496.
Ng Joe Yue-Hei et al.: Exploiting local features from deep networks for image retrieval, 2015 IEEE Conference on Computer Vision and Pattern recognition workshops (CVPRW), IEEE; Jun. 7, 2015, pp. 53-61, XP032795533.
Bay Herbert et al.: SURF: Speeded Up Robust Features, International Conference on Simulation, Modeling and Programming for Autonomous Robots, Simpar 2010, Lecture Notes in Computer Science; Lect Notes Computer; May 7, 2006, pp. 404-417, XP047429677.
Alex Kendall et al.: PoseNet: A Convolutional Network for Real-Time 6-DOF Camera Relocalization,https://arxiv.org/pdf/1505.07427v3.pdf, Nov. 23, 2015; XP055536871.
Extended European Search Report dated Jan. 17, 2019 for EP Application No. 17748352.6.

(56) References Cited

OTHER PUBLICATIONS

Nair Rahul et al.: "A Survey on Time-of-Flight Stero Fusion", Oct. 9, 2015, Medical Image Computing and Computer Assisted Intervention—MICCAI 2015, 18th International Conference, Munich, Germany, Oct. 5-9, 2015; Proceedings; Lecture Notes in Computer Science; Lect Notes Computer; Springer International Publishing, CH, XP047148654.
Zhu J J et al.: Joint depth and alpha matte optimization via fusion of stero and time-of-flight sensor, 2009 IEEE Conference on Computer Vision and Pattern recognition (CVPR), IEEE; Jun. 20, 2009, pp. 453-460, XP002700137.
Amendment After Non-Final Office Action dated Feb. 28, 2019 for U.S. Appl. No. 15/369,646.
PCT International Search Report and Written Opinion for International Appln. No. PCT/US18/22884, Applicant Magic Leap, Inc., forms PCT/ISA/210, 220, and 237, dated May 21, 2018 (13 pages).
Non-Final Office Action for U.S. Appl. No. 15/923,560 dated Jan. 2, 2019.
Amendment Response to Non-Final Office Action for U.S. Appl. No. 15/923,560 dated Apr. 1, 2019.
PCT International Search Report and Written Opinion for International Appln. No. PCT/US18/22993, Applicant Magic Leap, Inc., forms PCT/ISA/210, 220, and 237, dated Jun. 8, 2018 (13 pages).
PCT Invitation to Pay Additional Fees for International Appln. No. PCT/US18/23011, Applicant Magic Leap, Inc. dated May 25, 2018 (18 pages).
PCT International Search Report and Written Opinion for International Appln. No. PCT/US18/23011, Applicant Magic Leap, Inc. dated Jul. 23, 2018 (18 pages).
Non-Final Office Action for U.S. Appl. No. 15/924,078 dated Mar. 21, 2019.
Reply brief filed May 6, 2019 for U.S. Appl. No. 15/062,104.
Response to Extended European Search Report dated May 13, 2019 for EP Application No. 16759643.6.
Non Final Office action dated Jun. 17, 2019 for U.S. Appl. No. 15/924,011.
Tian et al., View Synthesis Techniques for 3D Video, Proc. SPIE 7443, Applications of Digital Image Processing XXXII, 74430T, Sep. 2009 (Year: 2009).
Final Office Action dated Jun. 21, 2019 for U.S. Appl. No. 15/369,646.
Response to Non-Final Office Action filed Jun. 21, 2019 for U.S. Appl. No. 15/924,078.
Response to Restriction Requirement filed Jul. 22, 2019 for U.S. Appl. No. 15/877,359.
Final Office Action for U.S. Appl. No. 15/923,560 dated Jul. 11, 2019.
Non-Final Office Action for U.S. Appl. No. 15/665,335 dated Apr. 22, 2019.
Response to Non-Final Office Action for U.S. Appl. No. 15/665,335 dated Jul. 22, 2019.
Response to Restriction Requirement filed Mar. 18, 2019 for U.S. Appl. No. 15/665,335.
PCT International Search Report and Written Opinion for International Patent Appln. No. PCT/US2017/044762 dated Oct. 5, 2017 (8 pages).
Response to Extended European Search Report dated Jul. 30, 2019 for European Application No. 16871733.8, (12 pages).
Final Office Action for U.S. Appl. No. 15/924,078 dated Aug. 9, 2019.
Response to Final Office Action and AFCP for U.S. Appl. No. 15/369,646, filed Aug. 21, 2019.
Response Non Final Office action filed Sep. 12, 2019 for U.S. Appl. No. 15/924,011.
Advisory Action dated Sep. 6, 2019 for U.S. Appl. No. 15/369,646.
RCE and Response to Final Office Action for U.S. Appl. No. 15/369,646, filed Sep. 19, 2019.
Office Action for Chinese Appln. No. 201680025479.1 dated Jul. 23, 2019, 16 pages w/English translation.
Response to Final Office Action and AFCP for U.S. Appl. No. 15/924,078, filed Oct. 9, 2019.
Response to Final Office Action for U.S. Appl. No. 15/923,560, filed Oct. 10, 2019.
1st Examination Report dated Oct. 1, 2019 for European Application No. 16759643.6.
Non-Final Office Action dated Oct. 21, 2019 for U.S. Appl. No. 15/877,359.
Final office action dated Oct. 22, 2019 for U.S. Appl. No. 15/924,011.
Advisory Action dated Oct. 22, 2019 for U.S. Appl. No. 15/924,078.
Non-Final Office Action dated Oct. 30, 2019 for U.S. Appl. No. 16/220,617.
Non-Final Office Action dated Oct. 31, 2019 for U.S. Appl. No. 15/923,560.
RCE and Response to Final Office Action filed Nov. 11, 2019 for U.S. Appl. No. 15/924,078.
Non Final Office Action dated Nov. 8, 2019 for U.S. Appl. No. 15/369,646.
Final office action dated Aug. 9, 2019 for for U.S. Appl. No. 15/924,078.
Office Action for Israeli Appln. No. 254300 dated Oct. 27, 2019, 7 pages w/English translation.
Response to Office Action for Chinese Appln. No. 201680025479.1 filed Nov. 26, 2019, 9 pages w/English translation of claims.
Extended European Search Report dated Nov. 21, 2019 for European Application No. 18767086.4.
Extended European Search Report for European Appln. No. 17837488.0 dated Jul. 11, 2019 (10 pages).
Robert Earl Patterson, et al. "Low-Level Factors in Human Factors of Stereoscopic 3D Displays", ProQuest Ebook Central, Springer, London, Dec. 29, 2014. doi:10.1007/978-1-4471-6651-1_4, chapter 4.2; 4.3.
Jannick Rolland, et al. "The past, present and future of head-mounted display designs"; Nov. 8, 2004, Proc. SPIE 5638, p. 368.
RCE and Response to Final Office Action for U.S. Appl. No. 15/665,335, filed Dec. 4, 2019.
PCT International Search Report and Written Opinion for International Patent Appln. No. PCT/US2019/042819, dated Dec. 4, 2019 (12 pages).
PCT Invitation to Pay Additional Fees for International Patent Appln. No. PCT/US2019/042819, dated Sep. 18, 2019 (2 pages).
Lee, Y., et al., "Estimating Gaze Depth Using Multi-Layer Perceptron," Published by IEEE, retrived electronically on Apr. 12, 2019 (5 pages).
Extended European Search Report for European Appln. No. 18766694.6 dated Nov. 21, 2019 (9 pages).
Theohari S Theohari S et al. "The Magic of the Z-Buffer: A Survey", Journal of WSCG, Plzen, Czech Republic, Feb. 5, 2001, XP55640849.
Amir H. Behzadan et al: "Scalable 1-14 Algorithm for Resolving Incorrect Occlusion in Dynamic Augmented Reality Engineering Environments : Scalable algorithm for resolving incorrect occlusion", Computer-Aided Civil and Infrastructure Engineering, vol. 25, No. I, Jan. 1, 2010, pp. 3-19, XP55640847.
Breen D E et al: "Interactive occlusion 1-14 and automatic object placement for augmented reality", Computer Graphics Forum, Wiley-Blackwell Publishing Ltd, GB, vol. 15, No. 3, Aug. 26, 1996, pp. 11-22, XP002515919.
Mark WR et al: "Post-Rendering 3D 1-14 Warping", Proceedings Of 1997 Symposium On Interactive 3 D Graphics Apr. 27-30, 1997 Providence, RI, USA; ACM, New York, NY, USA, Apr. 27, 1997, pp. 7-16, XP000725355.
Amendment After Final Office Action for U.S. Appl. No. 15/924,011 dated Dec. 19, 2019.
Non-Final Office Action for U.S. Appln. No. 16/22,630 dated Dec. 26, 2019.
Non-Final Office Action for U.S. Appl. No. 15/924,078 dated Jan. 13, 2020.
Extended European Search Report for European Appln. No. 18742228.2 dated Jan. 13, 2020 (8 pages).
Amendment After non-final Office Action for U.S. Appl. No. 15/877,359 dated Jan. 21, 2020.
Notice of Allowance for U.S. Appl. No. 15/924,011 dated Jan. 23, 2020.
Response to Extended European Search Report for European Appln. No. 17837488.0 filed Jan. 28, 2020 (23 pages).

(56) References Cited

OTHER PUBLICATIONS

Amendment After non-final Office Action for U.S. Appl. No. 16/220,617 dated Jan. 30, 2020.
Amendment After non-final Office Action for U.S. Appl. No. 15/923,560 dated Jan. 31, 2020.
Response to Examination Report filed Feb. 11, 2020 for European Application No. 16759643.6.
Amendment After non-final Office Action for U.S. Appl. No. 15/369,646 dated Feb. 10, 2020.
Notice of Allowance for U.S. Appl. No. 16/220,617 dated Feb. 20, 2020.
Response to Office Action filed Feb. 20, 2020 for Israeli Patent Application No. 254300, (3 pages).
Foreign Office Action for Japanese Patent Appln. No. 2017-546703 dated Mar. 10, 2020.
Amendment After non-final Office Action for U.S. Appl. No. 15/924,078 dated Apr. 13, 2020.
Notice of Allowance for U.S. Appl. No. 15/369,646 dated Apr. 8, 2020.
Final Office Action for U.S. Appl. No. 15/877,359 dated Apr. 16, 2020.
Foreign Office Action for Israeli Patent Application No. 259766 dated Mar. 1, 2020.
Amendment After non-final Office Action for U.S. Appl. No. 16/220,630 dated Apr. 27, 2020.
Non-Final Office Action for U.S. Appl. No. 16/848,496 dated May 18, 2020.
Notice of Allowance for U.S. Appl. No. 15/923,560 dated May 19, 2020.
Notice of Allowance for U.S. Appl. No. 15/924,078 dated May 18, 2020.
Foreign Office Action for CN Patent Appln. No. 201680025479.1 dated Apr. 7, 2020.
Jiang, P., etc., "Electro-magnetic Tracking System for Capsule-typed Telemetric Device", Optics and Precision Engineering, vol. 15, No. 8, pp. 1247-1252, Aug. 2007.
1st Examination Report dated Jun. 24, 2020 for New Zealand Patent Application No. 743271.
Foreign Office Action for CN Patent Appln. No. 201680025479.1 dated Jun. 18, 2020.
Notice of Allowance for U.S. Appl. No. 16/220,630 dated Jun. 8, 2020.
Response to Extended European Search Report for European Appln. No. 18767086.4 filed Jun. 15, 2020 (84 pages).
Response to Extended European Search Report for European Appln. No. 18766694.6 filed Jun. 19, 2020 (78 pages).
1st Examiner's Report for AU European Patent Appln. No. 2016225963 dated Jul. 1, 2020.
Foreign Office Action Response for JP Patent Appln. No. 2017-546703 dated Jun. 1, 2020.
Extended European Search Report for EP Patent Appln. No. 18768030.1 dated Jun. 18, 2020.
Mark, W., et al., "Post-Rendering 3D Warping", Proceedings of 1997 Symposium on 3D Graphics, Apr. 27-30, 1997, Providence, RI, USA, pp. 7-ff, XP058285072.
Amendment Response to Non-Final Office Action for U.S. Appl. No. 16/848,496 dated Jul. 22, 2019.
Foreign Exam Report for NZ Patent Appln. No. 735465 dated Jul. 22, 2020.
1st Examination Report for NZ Patent Appln. No. 734200 dated Jun. 15, 2020.
Foreign Submission Reply for EP Patent Appln No. 18766694.6 dated Jun. 19, 2020.
Foreign Examination Report for EP Patent Appln. No. 17837488.0 dated Jul. 22, 2020.
Response to Extended European Search Report for European Appln. No. 18742228.2 dated Aug. 10, 2020 (86 pages).
Notice of Allowance for U.S. Appl. No. 15/923,560 dated Aug. 25, 2020.
Notice of Allowance for U.S. Appl. No. 16/848,496 dated Aug. 24, 2020.
Foreign Office Action for KR Patent Appln. No. 10-2019-7006281 dated Aug. 28, 2020.
Non-Final Office Action for U.S. Appl. No. 16/945,613 dated Sep. 3, 2020.
Notice of Allowance for U.S. Appl. No. 16/220,630 dated Sep. 11, 2020.
Foreign Office Action for JP Patent Application No. 2019-505238 dated Sep. 10, 2020 (no translation available).
Notice of Allowance for U.S. Appl. No. 15/369,646 dated Sep. 22, 2020.
Notice of Allowance for U.S. Appl. No. 16/220,630 dated Sep. 23, 2020.
Non-Final Office Action for U.S. Appl. No. 16/809,346 dated Oct. 16, 2020.
1st Examination Report for AU Patent Appln. No. 2017214748 dated Oct. 14, 2020.
Non-Final Office Action for U.S. Appl. No. 16/518,431 dated Oct. 27, 2020.
Foreign Exam Report for EP Patent Appln. No. 18767086.4 dated Sep. 23, 2020.
Foreign Exam Report for EP Patent Appln. No. 18766694.6 dated Sep. 23, 2020.
N Stewart et al: "An improved z-buffer CSG rendering algorithm", Proceedings of the Eurographics / SIGGRAPH Workshop On Graphics Hardware. Lisbon, Aug. 31-Sep. 1, 1998; pp. 25-30, XP058111343.
Wolberg G et al: "Separable image warping with spatial lookup tables", Computer Graphics, ACM, US, vol. 23, No. 3, Jul. 1, 1989, pp. 369-378, XP058214788.
R T Stevens: "Primitive", In: "Quick Reference to Computer Graphics Terms A Division of Harcourt Brace & Company", Jan. 1, 1995, XP55730228, p. 166.
J D Foley: "The z-buffer algorithm", In: "Computer Graphics—Principles and Practice", Addison-Wesley, Jan. 1, 1990 (Jan. 1, 1990), XP55731635, pp. 668-672.
Notice of Allowance for U.S. Appl. No. 16/848,496 dated Nov. 2, 2020.
Foreign OA Response for KR Patent Appln. No. 10-2019-7006281 dated Oct. 28, 2020.
Notice of Allowance for U.S. Appl. No. 16/938,578 dated Nov. 19, 2020.
Foreign Exam Report for EP Patent Appln. No. 18742228.2 dated Oct. 1, 2020.
Foreign OA Response for EP Patent Appln. No. 17837488.0 dated Nov. 20, 2020.
Foreign OA Response for IL Patent Application No. 259766 dated Nov. 25, 2020.
1st Exam Report for AU Patent Application No. 2016365422 dated Nov. 4, 2020.
Foreign OA Response for JP Patent Application No. 2019-505238 dated Dec. 1, 2020.
Response to Non-Final Office Action for U.S. Appl. No. 16/945,613 filed Dec. 3, 2020.
Foreign Final OA for JP Patent Appln. No. 2017-546703 dated Nov. 20, 2020.
Foreign OA for KR Patent Appln. No. 10-2019-7006281 dated Dec. 15, 2020.
Foreign Exam Report for AU Patent Appln. No. 2017305227 dated Dec. 16, 2020.
Foreign NOA for IL Patent Application No. 259766 dated Nov. 29, 2020.
Amendment Response to NFOA for U.S. Appl. No. 16/809,346 dated Jan. 11, 2020.
Foreign OA For JP Patent Appln. No. 2019-505238 dated Jan. 12, 2021.
Foreign OA for JP Patent Appln. No. 2018-540434 dated Dec. 17, 2020.
Response to Non-Final Office Action for U.S. Appl. No. 16/518,431, filed Jan. 27, 2021.
Foreign Response for JP Patent Appln. No. 2019-510409 dated Jan. 28, 2021.

(56) References Cited

OTHER PUBLICATIONS

Foreign OA for IL Patent Appln. No. 254300 dated Nov. 15, 2020.
Foreign Response for NZ Patent Appln. No. 735465 dated Jan. 21, 2021.
Foreign NOA for KR Patent Appln. No. 10-2019-7022837 dated Jan. 27, 2021.
Foreign Final OA for KR Patent Appln. No. 10-2019-7006281 dated Jan. 27, 2021.
Foreign Response for EP Patent Appln. No. 18742228.2 dated Feb. 11, 2021.
Foreign Response for EP Patent Appln. No. 18768030.1 dated Jan. 18, 2021.
Foreign OA for JP Patent Appln. No. 2019-539183 dated Feb. 19, 2021.
Foreign Exam Report for EP Patent Appln. No. 16871733.8 dated Jan. 11, 2021.
Final Office Action for U.S. Appl. No. 16/518,431 dated Mar. 2, 2021.
Foreign OA for JP Patent Appln. No. 2018-528977 dated Feb. 16, 2021.
Sumit Chopra et al., "Learning a Similarity Metric Discriminatively, with Application to Face Verification", 2005 IEEE Computer Society Conference on Computer Vision and Pattern Recognition (CVPR'05), US, IEEE, Jun. 20, 2005, vol. 1, pp. 539-546 (a document showing a well-known technique).
Florian Schroff et al., "FaceNet: A Unified Embedding for Face Recognition and Clustering", 2015 IEEE Conference on Computer Vision and Pattern Recognition (CVPR), US, IEEE, Jun. 7, 2015, pp. 815-823 (a document showing a well-known technique).
Foreign Exam Report for IN Patent Appln. No. 201747032796 dated Mar. 10, 2021.
Final Office Action for U.S. Appl. No. 16/945,613 dated Mar. 18, 2021.
Notice of Allowance for U.S. Appl. No. 16/809,346 dated Mar. 22, 2021.
Foreign OA for CN Patent Appln. No. 201780010073.0 dated Jan. 21, 2021.
Foreign Exam Report for AU Patent Appln. No. 2018233733 dated Mar. 11, 2021.
Foreign Exam Report for AU Patent Appln. No. 2018236457 dated Mar. 10, 2021.
Foreign Response for AU Patent Appln. No. 2018236457 dated Mar. 26, 2021.
Foreign Exam Report for AU Patent Appln. No. 2018234921 dated Mar. 11, 2021.
Foreign Response for AU Patent Appln. No. 2017214748 dated Mar. 29, 2021.
Foreign Exam Report for AU Patent Appln. No. 2018210015 dated Feb. 23, 2021.
Foreign Response for AU Patent Appln. No. 2018210015 dated Mar. 12, 2021.
Foreign Exam Report for NZ Patent Appln. No. 735465 dated Feb. 15, 2021.
Foreign Response for NZ Patent Appln. No. 735465 dated Mar. 31, 2021.
Foreign Response for AU Patent Appln. No. 2016225963 dated Mar. 31, 2021.
Foreign Response for EP Patent Appln. No. 18767086.4 dated Apr. 6, 2021.
Foreign Response for EP Patent Appln. No. 18766694.6 dated Apr. 6, 2021.
Foreign Notice of Acceptance for AU Patent Appln. No. 2018210015 dated Mar. 24, 2021.
Foreign NOA for IL Patent Appln. No. 267946 dated Apr. 7, 2021.
Foreign Response for JP Patent Appln. No. 2019-505238 dated Apr. 16, 2021.
Foreign OA for KR Patent Appln. No. 10-2017-7028140 dated Apr. 21, 2021.
Foreign Response for JP Patent Appln. No. 2018-540434 dated May 17, 2021.
Foreign Response for EP Patent Appln. No. 16871733.8 dated May 17, 2021.
Foreign Response for JP Patent Appln. No. 2019-539183 dated May 17, 2021.
Foreign Exam Report for EP Patent Appln. No. 16759643.6 dated Apr. 29, 2021.
Foreign Response for AU Patent Appln. No. 2016365422 dated May 14, 2021.
Foreign Response for JP Patent Appln. No. 2018-528977 dated May 13, 2021.
Foreign Response for CN Patent Appln. No. 201780010073.0 dated Jun. 4, 2021.
Notice of Allowance for U.S. Appl. No. 16/945,613 dated Jun. 9, 2021.
Foreign OA for CN Patent Appln. No. 201880018442.5 dated Apr. 1, 2021.
Non-Final Office Action for U.S. Appl. No. 17/022,317 dated Jun. 10, 2021.
Foreign Exam Report for IN Patent Appln. No. 201847023727 dated Jun. 15, 2021.
Foreign Amendment for KR Patent Appln. No. 10-2017-7028140 dated Jun. 15, 2021.
Foreign OA for IL Patent Appln. No. 260614 dated Mar. 22, 2021.
Foreign NOA for JP Patent Appln. No. 2019-539183 dated Jun. 21, 2021.
2nd Exam Report for EP Patent Appln. No. 17837488.0 dated May 28, 2021.
Non-Final Office Action for U.S. Appl. No. 16/518,431 dated Jun. 23, 2021.
Response to Final Office Action for U.S. Appl. No. 16/945,613, filed May 17, 2021.
RCE Response to Final Office Action for U.S. Appl. No. 16/518,431 dated Jun. 1, 2021.
Foreign FOA for JP Patent Appln. No. 2018-528977 dated Jun. 7, 2021.
Foreign NOA for IL Patent Appln. No. 254300 dated Apr. 22, 2021.
Foreign Response for IL Patent Appln. No. 254300 dated Mar. 14, 2021.
Foreign FOA for JP Patent Appln. No. 2018-540434 dated Jun. 14, 2021.
Foreign Exam Report for CA Patent Appln. No. 2979560 dated Jun. 15, 2021.
Foreign Exam Report for EP Patent Appln. No. 2016365422 dated Jun. 11, 2021.
Foreign OA for KR Patent Appln. No. 10-2019-7030322 dated Jul. 15, 2021.
Foreign OA for JP Patent Appln. No. 2019-550189 dated Jul. 13, 2021.
Foreign OA for JP Patent Appln. No. 2019-505238 dated Jul. 2, 2021.
Foreign Response for IL Patent Appln. No. 260614 dated Jul. 21, 2021.
Non-Final Office Action for U.S. Appl. No. 16/922,145 dated Jul. 22, 2021.
Notice of Allowance for U.S. Appl. No. 16/945,613 dated Aug. 3, 2021.
English Translation of Foreign OA for JP Patent Appln. No. 2019-550189 dated Jul. 8, 2021.
Foreign OA for JP Patent Appln. No. 2019-550231 dated Jul. 26, 2021.
Foreign OA for JP Patent Appln. No. 2019-550200 dated Jul. 26, 2021.
Foreign NOA for NZ Patent Appln. No. 735465 dated Jul. 22, 2021.
Foreign Response for CN Patent Appln. No. 201880018442.5 dated Aug. 12, 2021.
Foreign OA for CN Patent Appln. No. 201780010073.0 dated Jul. 9, 2021.
Foreign NOA for KR Patent Appln. No. 10-2017-7028140 dated Aug. 23, 2021.
Foreign Exam Report for IN Patent Appln. No. 201947005860 dated Aug. 18, 2021.
Decision to Grant for EP Patent Appln. No. 18742228.2 dated Aug. 19, 2021.

(56) References Cited

OTHER PUBLICATIONS

Foreign Exam Report for AU Patent Appln. No. 2021204725 dated Aug. 24, 2021.
Foreign NOA for JP Patent Appln. No. 2018-548394 dated Sep. 7, 2021.
Foreign Response for EP Patent Appln. No. 16759643.6 dated Sep. 3, 2021.
Foreign Response for IN Patent Appln. No. 201747032796 dated Sep. 8, 2021.
Foreign Response for AU Patent Appln. No. 2018234921 dated Sep. 15, 2021.
Foreign Response for KR Patent Appln. No. 10-2019-7030322 dated Sep. 13, 2021.
Foreign Response for KR Patent Appln. No. 10-2019-7030321 dated Sep. 10, 2021.
Foreign Response for AU Patent Appln. No. 2016365422 dated Sep. 16, 2021.
Foreign Response forCN Patent Appln. No. 201780010073.0 dated Sep. 22, 2021.
Foreign Response for JP Patent Appln. No. 2019-505238 dated Sep. 27, 2021.
Foreign Response for KR Patent Appln. No. 10-2019-7029900 dated Sep. 17, 2021.
Foreign Exam Report for IN Patent Appln. No. 201847025793 dated Sep. 22, 2021.
Foreign Response for AU Patent Appln. No. 2018233733 dated Oct. 1, 2021.
Foreign NOA for JP Patent Appln. No. 2019-505238 dated Oct. 5, 2021.
Foreign Response for EP Patent Appln. No. 17837488.0 dated Oct. 5, 2021.
Notice of Allowance for U.S. Appl. No. 17/022,317 dated Oct. 6, 2021.
Foreign Response for JP Patent Appln. No. 2019-550189 dated Oct. 8, 2021.
Foreign Notice of Acceptance for AU Patent Appln. No. 2018234921 dated Sep. 27, 2021.
3rd Exam Report for AU Patent Appln. No. 2016365422 dated Oct. 11, 2021.
Foreign Notice of Appeal for JP Patent Appln. No. 2018-540434 dated Oct. 13, 2021.
Foreign Exam Report for EP Patent Appln. No. 18767086.4 dated Sep. 1, 2021.
Foreign Response for CA Patent Appln. No. 2979560 dated Oct. 13, 2021.
Foreign NOA for IL Patent Appln. No. 268916 dated Sep. 12, 2021.
Amendment Response to NFOA for U.S. Appl. No. 16/922,145 dated Oct. 18, 2021.
Foreign Response for AU Patent Appln. No. 2016365422 dated Oct. 22, 2021.
Foreign Response for JP Patent Appln. No. 2019-550200 dated Oct. 22, 2021.
Foreign Response for JP Patent Appln. No. 2019-550231 dated Oct. 22, 2021.
Extended European Search Report for EP Patent Appln. No. 19840248.9 dated Sep. 29, 2021.
Schmeing Michael et al: "Faithful Disocclusion Filling in Depth Image Based Rendering Using Superpixel-Based Inpainting", IEEE Transactions On Multimedia, IEEE Service Center, US, vol. 17, No. 12, Dec. 1, 2015 (Dec. 1, 2015), pp. 2160-2173, XP011589953, ISSN: 1520-9210, DOI: 10.1109/TMM.2015.2476372 [retrieved on Nov. 13, 2015].
Foreign Exam Report for EP Patent Appln. No. 18766694.6 dated Sep. 24, 2021.
Foreign NOA for IL Patent Appln. No. 268911 dated Oct. 27, 2021.
Non-Final Office Action for U.S. Appl. No. 17/091,278 dated Nov. 18, 2021.
Notice of Allowance for U.S. Appl. No. 16/518,431 dated Nov. 17, 2021.
Foreign NOA for KR Patent Appln. No. 10-2019-7030321 dated Nov. 4, 2021.
Notice of Allowance for U.S. Appl. No. 16/922,145 dated Nov. 19, 2021.
Notice of Allowance for U.S. Appl. No. 16/937,510 dated Dec. 1, 2021.
Foreign NOA for KR Patent Appln. No. 10-2019-7029900 dated Nov. 18, 2021.
Foreign NOA for KR Patent Appln. No. 10-2019-7030322 dated Nov. 18, 2021.
Foreign OA for CN Patent Appln. No. 201780010073.0 dated Oct. 29, 2021.
Foreign NOA for IL Patent Appln. No. 268962 dated Nov. 28, 2021.
Foreign Response for EP Patent Appln. No. 18742228.2 dated Dec. 7, 2021.
Foreign OA for CN Patent Appln. No. 201680080997.3 dated Sep. 29, 2021.
2nd Exam Report for CA Patent Appln. No. 2979560 dated Nov. 25, 2021.
Foreign NOA for JP Patent Appln. No. 2019-550189 dated Dec. 14, 2021.
Foreign NOA for JP Patent Appln. No. 2019-550200 dated Dec. 14, 2021.
Non-Final Office Action for U.S. Appl. No. 17/178,524 dated Dec. 15, 2021.
Foreign NOA for AU Patent Appln. No. 2017305227 dated Dec. 1, 2021.
Foreign OA for JP Patent Appln. No. 2019-550231 dated Dec. 14, 2021.
Non-Final Office Action for U.S. Appl. No. 17/137,107 dated Dec. 21, 2021.
Notice of Allowance for U.S. Appl. No. 17/022,317 dated Dec. 22, 2021.
Foreign Response for CN Patent Appln. No. 201780010073.0 dated Dec. 31, 2021.
Foreign Exam Report for IN Patent Appln. No. 201947030779 dated Jan. 4, 2022.
Foreign Response for EP Patent Appln. No. 18767086.4 dated Jan. 11, 2022.
Foreign NOA for CN Patent Appln. No. 201880018442.5 dated Jan. 12, 2022.
Foreign Exam Report for IN Patent Appln. No. 201947040457 dated Feb. 3, 2022.
Foreign Exam Report for IN Patent Appln. No. 201947040458 dated Feb. 4, 2022.
Foreign Exam Report for IN Patent Appln. No. 201947040852 dated Feb. 1, 2022.
Foreign OA for KR Patent Appln. No. 10-2021-7006131 dated Feb. 9, 2022 (with English translation).
Amendment Response to NFOA for U.S. Appl. No. 17/091,278 dated Feb. 18, 2022.
Foreign OA for JP Patent Appln. No. 2017-546703 dated Feb. 3, 2022 (with English translation).
Notice of Allowance for U.S. Appl. No. 16/518,431 dated Feb. 24, 2022.
Foreign OA for JP Patent Appln. No. 2022-002800 dated Feb. 8, 2022 (with English translation).
Foreign Response for JP Patent Appln. No. 2019-550231 dated Mar. 8, 2022.
Foreign OA for JP Patent Appln. No. 2022-2802 dated Feb. 8, 2022 (with English translation).
Foreign NOA for JP Patent Appln. No. 2019-550231 dated Mar. 11, 2022.
Amendment Response to NFOA for U.S. Appl. No. 17/178,524 dated Mar. 15, 2022.
Amendment Response to NFOA for U.S. Appl. No. 17/137,107 dated Mar. 21, 2022.
Foreign Response for CA Patent Appln. No. 2979560 dated Mar. 24, 2022.
Notice of Allowance for U.S. Appl. No. 17/091,278 dated Mar. 28, 2022.
Foreign Summons for Oral Proceedings for EP Patent Appln. No. 16871733.8 dated Mar. 15, 2022.

(56) References Cited

OTHER PUBLICATIONS

Foreign Response for IN Patent Appln. No. 201847025793 dated Mar. 21, 2022.
Foreign Response for EP Patent Appln. No. 18766694.6 dated Apr. 4, 2022.
Notice of Allowance for U.S. Appl. No. 17/178,524 dated Apr. 6, 2022.
Foreign Exam Report for AU Patent Appln. No. 2022201750 dated Apr. 6, 2022.
Foreign Exam Report for AU Patent Appln. No. 2021290369 dated Mar. 29, 2022.
Foreign NOA for IL Patent Appln. No. 264489 dated Mar. 21, 2022.
Foreign Response for KR Patent Appln. No. 10-2021-7006131 dated Apr. 11, 2022.
Notice of Allowance for U.S. Appl. No. 17/137,107 dated Apr. 20, 2022.
Non-Final Office Action for U.S. Appl. No. 17/353,434 dated Apr. 28, 2022.
Foreign Response for EP Patent Appln. No. 19840248.9 dated Apr. 29, 2022.
Foreign NOA for CN Patent Appln. No. 201780010073.0 dated Apr. 6, 2022.
Foreign NOA for IL Patent Appln. No. 260614 dated Mar. 16, 2022.
Foreign Response for JP Patent Appln. No. 2022-2802 dated May 9, 2022.
Foreign Response for JP Patent Appln. No. 2022-2800 dated May 9, 2022.
Foreign Response for JP Patent Appln. No. 2017-546703 dated May 5, 2022.
Extended European Search Report for EP Patent Appln. No. 21196532.2 dated Mar. 28, 2022.
Foreign OA for CN Patent Appln. No. 201780054387.0 dated Sep. 30, 2022.
Foreign Notice of Acceptance for AU Patent Appln. No. 2021290369 dated Oct. 10, 2022.
Foreign Response for IN Patent Appln. No. 201947040457 dated Oct. 20, 2022 in English.
Foreign Response for IN Patent Appln. No. 201947040852 dated Oct. 21, 2022 in English.
Foreign Response for EP Patent Appln. No. 21196532.2 dated Oct. 27, 2022.
Foreign Response for IN Patent Appln. No. 201947040460 dated Oct. 25, 2022 in English.
Foreign Response for IN Patent Appln. No. 201947040458 dated Oct. 26, 2022 in English.
Foreign OA for JP Patent Appln. No. 2021-168082 dated Oct. 14, 2022 (with English translation).
Foreign Notification Prior to Acceptance for IL Patent Appln. No. 290308 dated Sep. 4, 2022.
Non-Final Office Action for U.S. Appl. No. 17/514,606 dated Sep. 20, 2022.
Foreign Response for AU Patent Appln. No. 2021290369 dated Sep. 29, 2022.
Foreign Response for CA Patent Appln. No. 2979560 dated Sep. 30, 2022.
Foreign Response for IN Patent Appln. No. 201947030779 dated Sep. 30, 2022.
Foreign Response for JP Patent Appln. No. 2021-41375 dated Oct. 3, 2022.
Foreign NOA for JP Patent Appln. No. 2021-116964 dated Oct. 3, 2022.
Foreign Exam Report for NZ Patent Appln. No. 790720 dated Sep. 27, 2022.
Foreign Response for AU Patent Appln. No. 2021204725 dated Jul. 15, 2022.
Foreign NOA for IL Patent Appln. No. 284939 dated May 31, 2022.
Foreign Intent to Grant for EP Patent Appln. No. 16759643.6 dated Jul. 21, 2022.
Foreign OA for JP Patent Appln. No. 2021-41375 dated Jul. 4, 2022 (with English translation).
Amendment Response to NFOA for U.S. Appl. No. 17/353,434 dated Jul. 28, 2022.
Foreign NOA for JP Patent Appln. No. 2017-546703 dated Aug. 3, 2022.
Foreign OA for ON Patent Appln. No. 201980049056.7 dated Aug. 3, 2022.
Foreign NOA for IL Patent Appln. No. 284404 dated Jul. 31, 2022.
Foreign Exam Report for CA Patent Appln. No. 3054617 dated Apr. 6, 2023.
Foreign Response for CN Patent Appln. No. 201880018506.1 dated Jun. 27, 2023.
Foreign Response for CN Patent Appln. No. 201780054387.0 dated Jun. 26, 2023.
Foreign Response for CN Patent Appln. No. 201880018310.2 dated Jul. 17, 2023.
Foreign NOA for AU Patent Appln. No. 2022200841 dated May 16, 2023.
Foreign NOA for JP Patent Appln. No. 2021-503570 dated Jun. 2, 2023.
Foreign NOA for JP Patent Appln. No. 2021-41375 dated Jun. 5, 2023.
Foreign Exam Report for CA Patent Appln. No. 3055218 dated May 19, 2023.
Foreign Amendment for KR Patent Appln. No. 10-2021-7012722 dated Jun. 12, 2023.
Foreign Response for CA Patent Appln. No. 3011377 dated Jun. 16, 2023.
Foreign NOA for CA Patent Appln. No. 2979560 dated Jun. 1, 2023.
Foreign NOA for KR Patent Appln. No. 10-2022-7005613 dated Jul. 20, 2023.
Foreign Response for CA Patent Appln. No. 3054619 dated Jul. 25, 2023.
Foreign Response for EP Patent Appln. No. 17837488.0 dated Jul. 27, 2023.
Foreign NOA for CN Patent Appln. No. 201880018506.1 dated Jul. 14, 2023.
Foreign Exam Report for NZ Patent Appln. No. 744300 dated Aug. 11, 2023.
Final Office Action for U.S. Appl. No. 17/652,964 dated Aug. 10, 2023.
Foreign OA for JP Patent Appln. No. 2022-100963 dated Jul. 27, 2023 (with English translation).
Foreign Response for KR Patent Appln. No. 10-2022-7041575 dated Aug. 23, 2023.

* cited by examiner

MIXED REALITY SYSTEM WITH VIRTUAL CONTENT WARPING AND METHOD OF GENERATING VIRTUAL CONTENT USING SAME

CROSS-REFERENCE TO RELATED APPLICATIONS

The present application is a continuation of pending U.S. patent application Ser. No. 16/518,431, filed Jul. 22, 2019, entitled "MIXED REALITY SYSTEM WITH VIRTUAL CONTENT WARPING AND METHOD OF GENERATING VIRTUAL CONTENT USING SAME", which claims priority to U.S. Provisional Application No. 62/702,238, filed on Jul. 23, 2018, entitled "MIXED REALITY SYSTEM WITH VIRTUAL CONTENT WARPING AND METHOD OF GENERATING VIRTUAL CONTENT USING SAME." This application includes subject matter similar to the subject matter described in U.S. Utility application Ser. Nos. 15/924,011, 15/923,560, and 15/924,078, all filed on Mar. 17, 2017 (attorney docket numbers ML-0479 US, ML-0480 US, ML-0482 US). The contents of the patents and patent applications mentioned herein are hereby expressly and fully incorporated by reference in their entirety, as though set forth in full.

FIELD OF THE INVENTION

The present disclosure relates to mixed reality systems with virtual content warping, and methods for generating a mixed reality experience including warped virtual content using the same.

BACKGROUND

Modern computing and display technologies have facilitated the development of "mixed reality" (MR) systems for so called "virtual reality" (VR) or "augmented reality" (AR) experiences, wherein digitally reproduced images, or portions thereof, are presented to a user in a manner wherein they seem to be, or may be perceived as, real. A VR scenario typically involves presentation of digital or virtual image information without transparency to actual real-world visual input. An AR scenario typically involves presentation of digital or virtual image information as an augmentation to visualization of the real-world around the user (i.e., transparency to real-world visual input). Accordingly, AR scenarios involve presentation of digital or virtual image information with transparency to the real-world around the user.

Various optical systems generate images at various depths for displaying MR (VR and AR) scenarios. Some such optical systems are described in U.S. Utility patent application Ser. No. 14/555,585 filed on Nov. 27, 2014 (attorney docket number ML.20011.00), the contents of which are hereby expressly and fully incorporated by reference in their entirety, as though set forth in full.

MR systems typically employ wearable display devices (e.g., head-worn displays, helmet-mounted displays, or smart glasses) that are at least loosely coupled to a user's head, and thus move when the user's head moves. If the user's head motions are detected by the display device, the data being displayed can be updated to take the change in head pose (i.e., the orientation and/or location of user's head) into account.

As an example, if a user wearing a head-worn display device views a virtual representation of a virtual object on the display device and walks around an area where the virtual object appears, the virtual object can be rendered for each viewpoint (corresponding to a position and/or orientation of the head-worn display device), giving the user the perception that they are walking around an object that occupies real space. If the head-worn display device is used to present multiple virtual objects at different depths, measurements of head pose can be used to render the scene to match the user's dynamically changing head pose and provide an increased sense of immersion. However, there is an inevitable lag between rendering a scene and displaying/projecting the rendered scene.

Head-worn display devices that enable AR provide concurrent viewing of both real and virtual objects. With an "optical see-through" display, a user can see through transparent (or semi-transparent) elements in a display system to view directly the light from real objects in a real-world environment. The transparent element, often referred to as a "combiner," superimposes light from the display over the user's view of the real world, where light from the display projects an image of virtual content over the see-through view of the real objects in the environment. A camera may be mounted onto the head-worn display device to capture images or videos of the scene being viewed by the user.

MR systems attempt to present photo-realistic, immersive MR scenarios.

However, head movement during a lag time between generation of virtual content ("rendered virtual content") and display of the rendered virtual content may result in visual artifacts (e.g., glitches). This problem may be exacerbated by rapid head movement during the lag time.

In order to address this issue, some optical systems may include a warping software/system/method that receives rendered virtual content from a source. The warping system then "warps" (i.e., transforms the "frame of reference" of) the received rendered virtual content for display in a frame of reference of the display system/viewer (the "display frame of reference"). This approach takes the originally rendered virtual content, and transforms the way that the virtual content is presented to attempt to display the virtual content from a different perspective at the time of display.

Some warping software/systems/methods warp the rendered virtual content to correct for rotational or coarse positional user movements (i.e., of the user's field of view "FOV"). Such systems are not optimized to correct for other types of user movements (e.g., substantially lateral user movements along an axis orthogonal to the user's optical axis). Accordingly, some warping software/systems/methods can result in artifacts with user movement.

SUMMARY

In one embodiment, a computer implemented method for warping virtual content includes receiving rendered virtual content data, the rendered virtual content data including a far depth. The method also includes receiving movement data indicating a user movement in a direction orthogonal to an optical axis. The method further includes generating warped rendered virtual content data based on the rendered virtual content data, the far depth, and the movement data.

In one or more embodiments, the rendered virtual content data corresponds to a near virtual object and a far virtual object, and the warped rendered virtual content data corresponds to a warped near virtual object and a warped far virtual object. A first position shift between the near virtual object and the warped near virtual object may be substantially equal to a second position shift between the far virtual object and the warped far virtual object.

In one or more embodiments, generating the warped rendered virtual content data based on the rendered virtual content data, the far depth, and the movement data reduces a parallax related artifact compared to the rendered virtual content data. The parallax may be related artifact is a disocclusion artifact. The parallax related artifact may be a smearing artifact or a jitter artifact.

In one or more embodiments, the rendered virtual content data corresponds to a first depth segment. The method also includes receiving second rendered virtual content data corresponding to a second depth segment, the second rendered virtual content data including a second far depth. The method further includes generating warped second rendered virtual content data based on the second rendered virtual content data, the second far depth, and the movement data.

In another embodiment, a computer implemented method for warping virtual content includes receiving rendered virtual content data, the rendered virtual content data including a far depth and a near depth. The method also includes receiving movement data indicating a user movement in a direction orthogonal to an optical axis. The method further includes generating warped rendered virtual content data based on the rendered virtual content data, the far depth, the near depth, and the movement data.

In one or more embodiments, generating warped rendered virtual content data based on the rendered virtual content data, the far depth, the near depth, and the movement data includes averaging the far depth and the near depth.

In still another embodiment, a computer implemented method for warping virtual content includes receiving rendered virtual content data. The method also includes receiving movement data indicating a user movement in a direction orthogonal to an optical axis. The method further includes receiving gaze data indicating a user gaze. Moreover, the method includes determining a depth based on the gaze data. In addition, the method includes generating warped rendered virtual content data based on the rendered virtual content data, the depth, and the movement data.

In yet another embodiment, a computer implemented method for warping virtual content includes receiving rendered virtual content data. The method also includes receiving movement data indicating a user movement in a direction orthogonal to an optical axis. The method further includes generating mesh data from the rendered virtual content data. Moreover, the method includes determining depth data from the mesh data. In addition, the method includes generating warped rendered virtual content data based on the rendered virtual content data, the mesh data, the depth data, and the movement data.

In one or more embodiments, the method also includes adjusting a mesh size when generating the mesh data. The mesh data may be generated using a grid mesh. The depth data may be determined based on a plurality of depths in the mesh and content of the mesh at each of the plurality of depths.

In another embodiment, a computer implemented method for determining a depth of a virtual object includes re-projecting a first image of the virtual object corresponding to a first eye over a second image of the virtual object corresponding to a second eye at a plurality of depths to generate a plurality of respective combination images. The method also includes measuring the re-projection error in each of the plurality of respective combination images to generate a plurality of re-projection errors. The method further includes identifying a minimum re-projection error in the plurality of re-projection errors corresponding to a combination image of the plurality of respective combination images. Moreover, the method includes identifying a depth corresponding to the combination image as the depth of the virtual object.

In one or more embodiments, the depth of the virtual object is used to warp the virtual object from a first point to view to a second point of view. The plurality of depths may consist of 64 depths. Each of the plurality of depths may correspond to a one pixel difference in re-projecting the first image of the virtual object.

In still another embodiment, a computer implemented method for determining a minimum stabilization depth includes obtaining an amount of point of view (POV) movement. The method also includes determining a relationship between stabilization depth and pixel movement at the stabilization depth based on the amount of POV movement. The method further includes obtaining a maximum unnoticeable pixel movement for a display system. Moreover, the method includes identifying a stabilization depth corresponding to the maximum unnoticeable pixel movement for the display system as the minimum stabilization depth of the display system.

In one or more embodiments, the method also includes comprising warping only content closer than the minimum stabilization depth to a viewer when a point of view changes. The relationship between stabilization depth and pixel movement at the stabilization depth may be an inverse relationship.

Additional and other objects, features, and advantages of the disclosure are described in the detail description, figures and claims.

BRIEF DESCRIPTION OF THE DRAWINGS

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosures briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which.

DETAILED DESCRIPTION

Various embodiments of the disclosure are directed to systems, methods, and articles of manufacture for warping virtual content in a single embodiment or in multiple embodiments. Other objects, features, and advantages of the disclosure are described in the detailed description, figures, and claims.

Various embodiments will now be described in detail with reference to the drawings, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

The virtual content warping systems may be implemented independently of mixed reality systems, but some embodiments below are described in relation to AR systems for illustrative purposes only. Further, the virtual content warping systems described herein may also be used in an identical manner with VR systems.

Illustrative Mixed Reality Scenario and System

The description that follows pertains to an illustrative augmented reality system with which the warping system may be practiced. However, it is to be understood that the embodiments also lend themselves to applications in other types of display systems (including other types of mixed reality systems), and therefore the embodiments are not to be limited to only the illustrative system disclosed herein.

Figure 1:
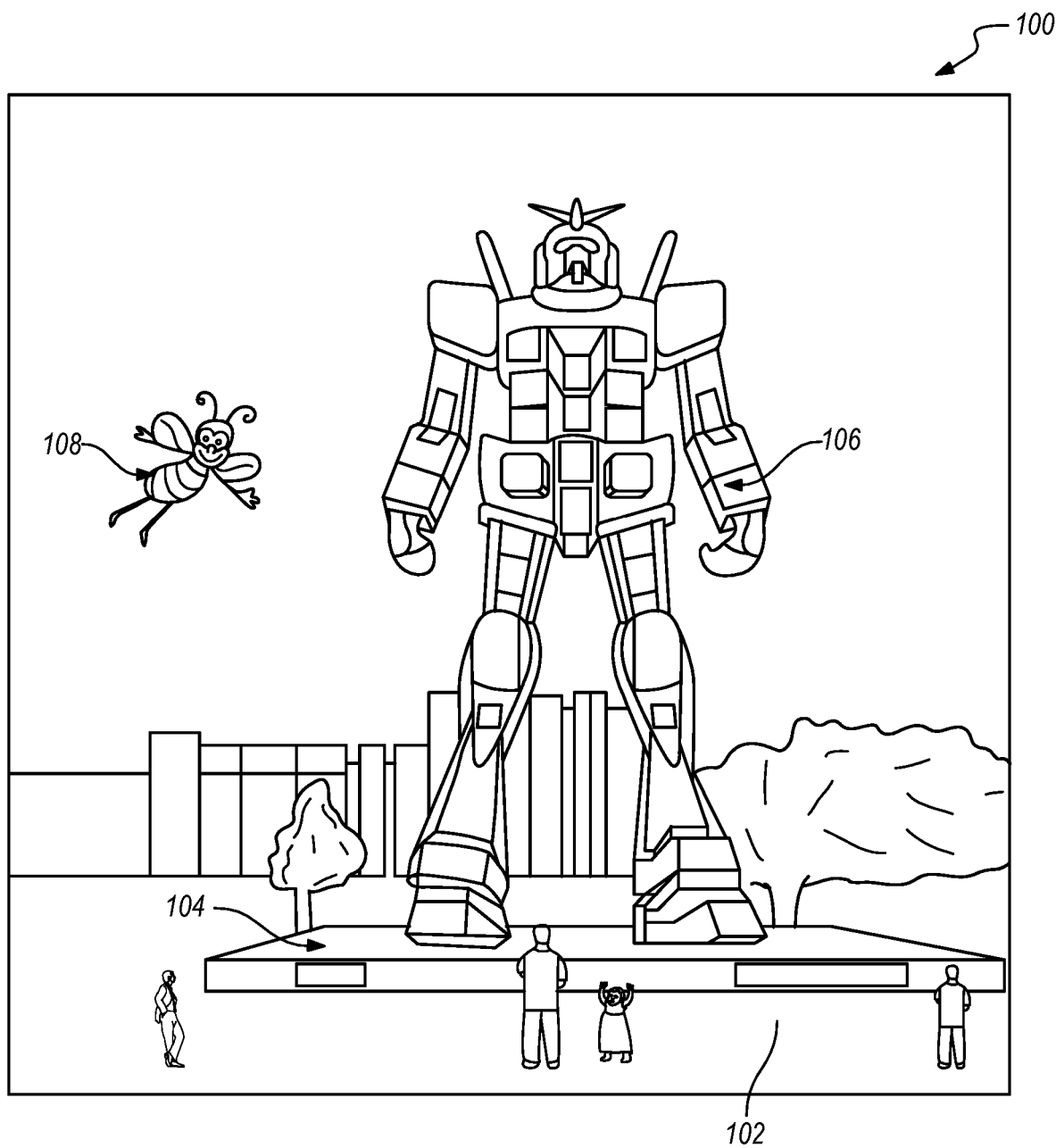
FIG. 1 depicts a user's view of augmented reality (AR) through a wearable AR user device, according to some embodiments.

Mixed reality (e.g., VR or AR) scenarios often include presentation of virtual content (e.g., images and sound) corresponding to virtual objects in relationship to real-world objects. For example, referring to FIG. 1, an AR scene 100 is depicted wherein a user of AR technology sees a real-world, physical, park-like setting 102 featuring people, trees, buildings in the background, and a real-world, physical concrete platform 104. In addition to these items, the user of the AR technology also perceives that they "see" a virtual robot statue 106 standing upon the physical concrete platform 104, and a virtual cartoon-like avatar character 108 flying by which seems to be a personification of a bumblebee, even though these virtual objects 106, 108 do not exist in the real-world.

Like AR scenarios, VR scenarios also account for the poses used to generate/render the virtual content. Accurately warping the virtual content to the AR/VR display frame of reference and warping the warped virtual content can improve the AR/VR scenarios, or at least not detract from the AR/VR scenarios.

The description that follows pertains to an illustrative AR system with which the disclosure may be practiced. However, it is to be understood that the disclosure also lends itself to applications in other types of augmented reality and virtual reality systems, and therefore the disclosure is not to be limited to only the illustrative system disclosed herein.

Figure 2A:
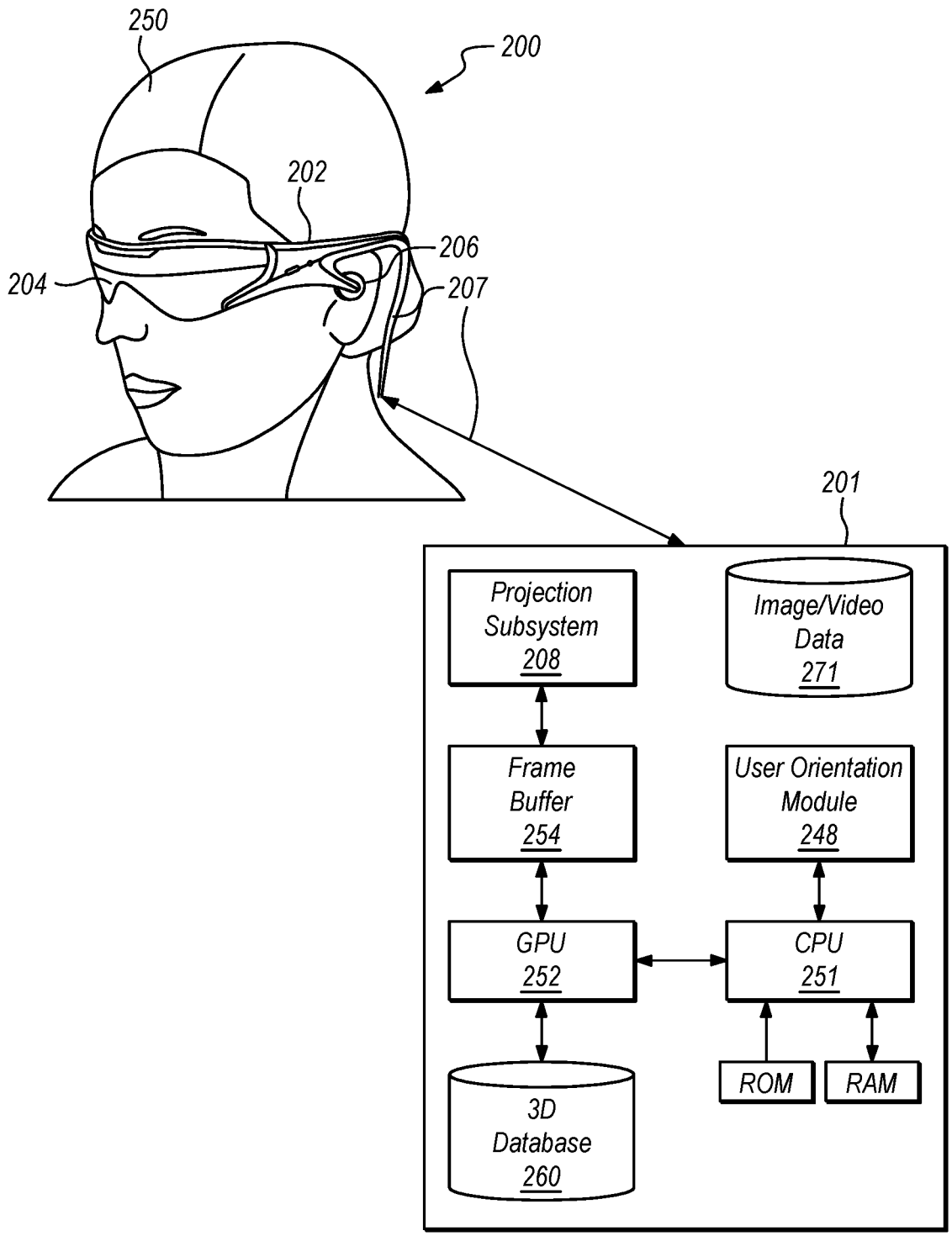
FIGS. 2A-2D schematically depict AR systems and subsystems thereof, according to some embodiments.

FIG. 2A illustrates an AR system 200, according to some embodiments. The AR system 200 may be operated in conjunction with a projection subsystem 208, providing images of virtual objects intermixed with physical objects in a field of view of a user 250. This approach employs one or more at least partially transparent surfaces through which an ambient environment including the physical objects can be seen and through which the AR system 200 produces images of the virtual objects. The projection subsystem 208 is housed in a control subsystem 201 operatively coupled to a display system/subsystem 204 through a link 207. The link 207 may be a wired or wireless communication link.

For AR applications, it may be desirable to spatially position various virtual objects relative to respective physical objects in the field of view of the user 250. The virtual objects may take any of a large variety of forms, having any variety of data, information, concept, or logical construct capable of being represented as an image. Non-limiting examples of virtual objects may include: a virtual text object, a virtual numeric object, a virtual alphanumeric object, a virtual tag object, a virtual field object, a virtual chart object, a virtual map object, a virtual instrumentation object, or a virtual visual representation of a physical object.

The AR system 200 includes a frame structure 202 worn by the user 250, the display system 204 carried by the frame structure 202, such that the display system 204 is positioned in front of the eyes of the user 250, and a speaker 206 incorporated into or connected to the display system 204. In the illustrated embodiment, the speaker 206 is carried by the frame structure 202, such that the speaker 206 is positioned adjacent (in or around) the ear canal of the user 250 (e.g., an earbud or headphone).

The display system 204 is designed to present the eyes of the user 250 with photo-based radiation patterns that can be comfortably perceived as augmentations to the ambient environment including both two-dimensional and three-dimensional content. The display system 204 presents a sequence of frames at high frequency that provides the perception of a single coherent scene. To this end, the display system 204 includes the projection subsystem 208 and a partially transparent display screen through which the projection subsystem 208 projects images. The display screen is positioned in a field of view of the user's 250 between the eyes of the user 250 and the ambient environment.

In some embodiments, the projection subsystem 208 takes the form of a scan-based projection device and the display screen takes the form of a waveguide-based display into which the scanned light from the projection subsystem 208 is injected to produce, for example, images at single optical viewing distance closer than infinity (e.g., arm's length), images at multiple, discrete optical viewing distances or focal planes, and/or image layers stacked at multiple viewing distances or focal planes to represent volumetric 3D objects. These layers in the light field may be stacked closely enough together to appear continuous to the human visual subsystem (e.g., one layer is within the cone of confusion of an adjacent layer). Additionally or alternatively, picture elements may be blended across two or more layers to increase perceived continuity of transition between layers in the light field, even if those layers are more sparsely stacked (e.g., one layer is outside the cone of confusion of an adjacent layer). The display system 204 may be monocular or binocular. The scanning assembly includes one or more light sources that produce the light beam (e.g., emits light of different colors in defined patterns). The light source may take any of a large variety of forms, for instance, a set of RGB sources (e.g., laser diodes capable of outputting red, green, and blue light) operable to respectively produce red, green, and blue coherent collimated light according to defined pixel patterns specified in respective frames of pixel information or data. Laser light provides high color saturation and is highly energy efficient. The optical coupling subsystem includes an optical waveguide input apparatus, such as for instance, one or more reflective surfaces, diffraction gratings, mirrors, dichroic mirrors, or prisms to optically couple light into the end of the display screen. The optical coupling subsystem further includes a collimation element that collimates light from the optical fiber. Optionally, the optical coupling subsystem includes an optical modulation apparatus configured for converging the light from the collimation element towards a focal point in the center of the optical waveguide input apparatus, thereby allowing the size of the optical waveguide input apparatus to be minimized. Thus, the display system 204 generates a series of synthetic image frames of pixel information that present an undistorted image of one or more virtual objects to the user. Further details describing display subsystems are provided in U.S. Utility patent application Ser. No. 14/212,961, entitled "Display System and Method", and Ser. No. 14/331,218, entitled "Planar Waveguide Apparatus With Diffraction Element(s) and Subsystem Employing Same", the contents of which are hereby expressly and fully incorporated by reference in their entirety, as though set forth in full.

The AR system 200 further includes one or more sensors mounted to the frame structure 202 for detecting the position (including orientation) and movement of the head of the user 250 and/or the eye position and inter-ocular distance of the user 250. Such sensor(s) may include image capture devices, microphones, inertial measurement units (IMUs), accelerometers, compasses, GPS units, radio devices, gyros, and the like. For example, in one embodiment, the AR system 200 includes a head worn transducer subsystem that includes one or more inertial transducers to capture inertial measures indicative of movement of the head of the user 250. Such devices may be used to sense, measure, or collect information about the head movements of the user 250. For instance, these devices may be used to detect/measure movements, speeds, acceleration and/or positions of the head of the user 250. The position (including orientation) of the head of the user 250 is also known as a "head pose" of the user 250.

The AR system 200 of FIG. 2A may include one or more forward facing cameras. The cameras may be employed for any number of purposes, such as recording of images/video from the forward direction of the system 200. In addition, the cameras may be used to capture information about the environment in which the user 250 is located, such as information indicative of distance, orientation, and/or angular position of the user 250 with respect to that environment and specific objects in that environment.

The AR system 200 may further include rearward facing cameras to track angular position (the direction in which the eye or eyes are pointing), blinking, and depth of focus (by detecting eye convergence) of the eyes of the user 250. Such eye tracking information may, for example, be discerned by projecting light at the end user's eyes, and detecting the return or reflection of at least some of that projected light.

The augmented reality system 200 further includes a control subsystem 201 that may take any of a large variety of forms. The control subsystem 201 includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs). The control subsystem 201 may include a digital signal processor (DSP), a central processing unit (CPU) 251, a graphics processing unit (GPU) 252, and one or more frame buffers 254. The CPU 251 controls overall operation of the system, while the GPU 252 renders frames (i.e., translating a three-dimensional scene into a two-dimensional image) and stores these frames in the frame buffer(s) 254. While not illustrated, one or more additional integrated circuits may control the reading into and/or reading out of frames from the frame buffer(s) 254 and operation of the display system 204. Reading into and/or out of the frame buffer(s) 254 may employ dynamic addressing, for instance, where frames are over-rendered. The control subsystem 201 further includes a read only memory (ROM) and a random access memory (RAM). The control subsystem 201 further includes a three-dimensional database 260 from which the GPU 252 can access three-dimensional data of one or more scenes for rendering frames, as well as synthetic sound data associated with virtual sound sources contained within the three-dimensional scenes.

The control AR augmented reality subsystem 2010 further includes a user orientation detection module 248. The user orientation module 248 detects an instantaneous position of the head of the user 250 and may predict a position of the head of the user 250 based on position data received from the sensor(s). The user orientation module 248 also tracks the eyes of the user 250, and in particular the direction and/or distance at which the user 250 is focused based on the tracking data received from the sensor(s).

Figure 2B:
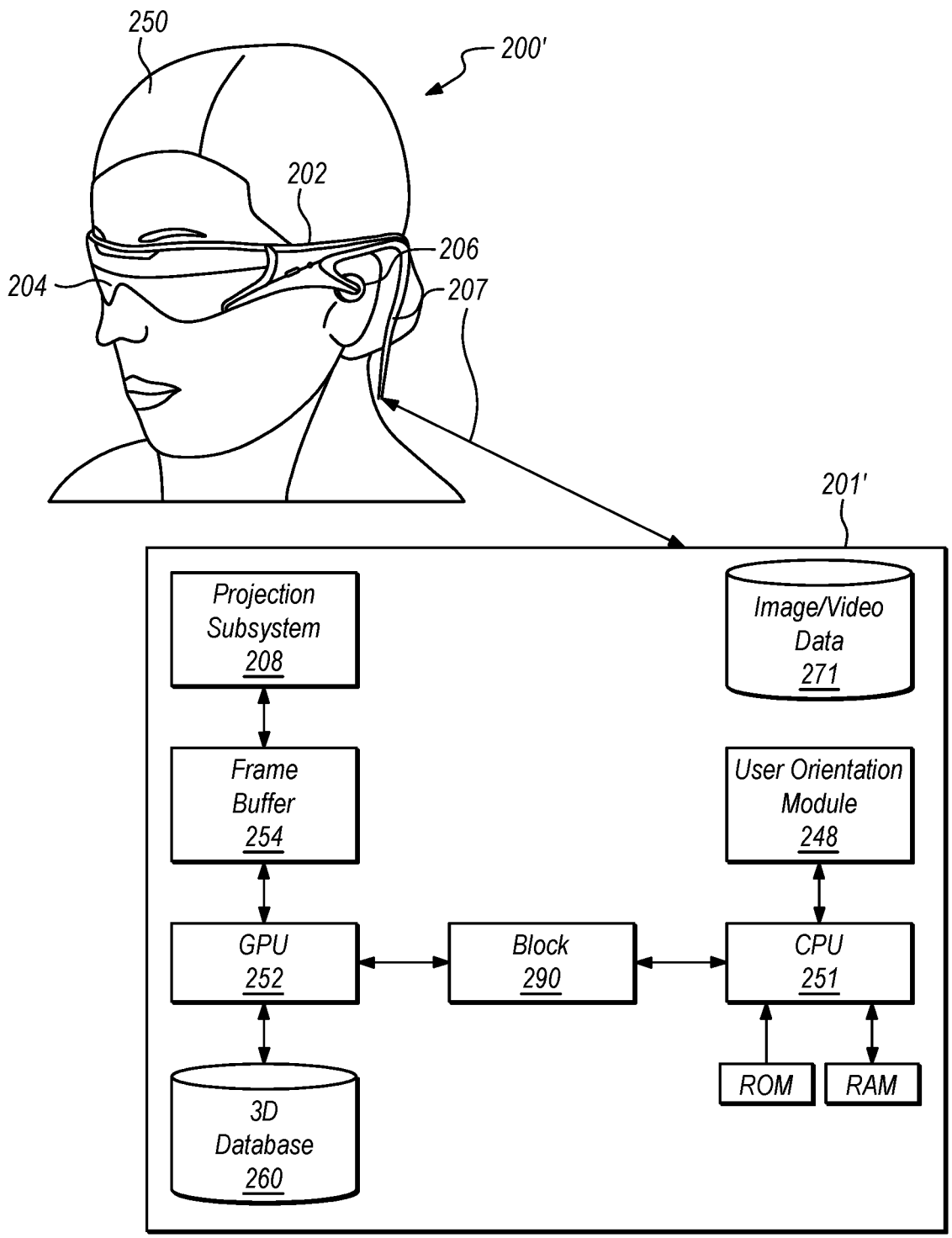

FIG. 2B depicts an AR system 200', according to some embodiments. The AR system 200' depicted in FIG. 2B is similar to the AR system 200 depicted in FIG. 2A and describe above. For instance, AR system 200' includes a frame structure 202, a display system 204, a speaker 206, and a control subsystem 201' operatively coupled to the display system 204 through a link 207. The control subsystem 201' depicted in FIG. 2B is similar to the control subsystem 201 depicted in FIG. 2A and describe above. For instance, control subsystem 201' includes a projection subsystem 208, an image/video database 271, a user orientation module 248, a CPU 251, a GPU 252, a 3D database 260, ROM and RAM.

Figure 2C:
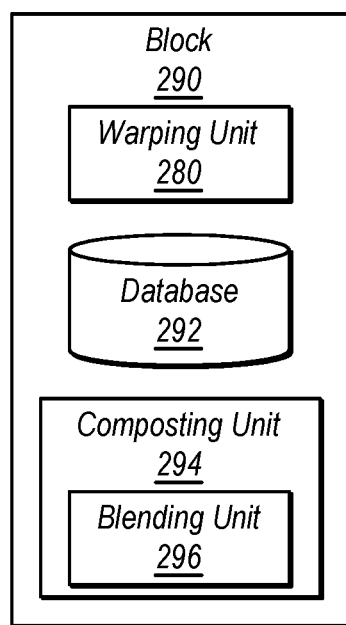
Figure 2D:
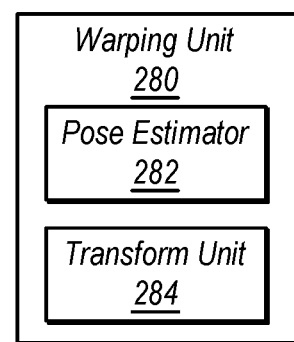

The difference between the control subsystem 201', and thus the AR system 200', depicted in FIG. 2B from the corresponding system/system component depicted in FIG. 2A, is the presence of block 290 in the control subsystem 201' depicted in FIG. 2B. The block 290 is a separate warping block that is independent from either the GPU 252 or the CPU 251. As illustrated in FIG. 2C, the block 290 includes a warping unit 280, a database 292, and a compositing unit 294. The compositing unit 294 includes a blending unit 296. As illustrated in FIG. 2D, the warping unit 280 includes a pose estimator 282 and transform unit 284.

The various processing components of the AR systems 200, 200' may be contained in a distributed subsystem. For example, the AR systems 200, 200' include a local processing and data module (i.e., the control subsystem 201, 201') operatively coupled, such as by a wired lead or wireless connectivity 207, to a portion of the display system 204. The local processing and data module may be mounted in a variety of configurations, such as fixedly attached to the frame structure 202, fixedly attached to a helmet or hat, embedded in headphones, removably attached to the torso of the user 250, or removably attached to the hip of the user 250 in a belt-coupling style configuration. The AR systems 200, 200' may further include a remote processing module and remote data repository operatively coupled, such as by a wired lead or wireless connectivity to the local processing and data module, such that these remote modules are operatively coupled to each other and available as resources to the local processing and data module. The local processing and data module may comprise a power-efficient processor or controller, as well as digital memory, such as flash memory, both of which may be utilized to assist in the processing, caching, and storage of data captured from the sensors and/or acquired and/or processed using the remote processing module and/or remote data repository, possibly for passage to the display system 204 after such processing or retrieval. The remote processing module may comprise one or more relatively powerful processors or controllers configured to analyze and process data and/or image information. The remote data repository may comprise a relatively large-scale digital data storage facility, which may be available through the internet or other networking configuration in a "cloud" resource configuration. In some embodiments, all data is stored and all computation is performed in the local processing and data module, allowing fully autonomous use from any remote modules. The couplings between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless, with the exception of the optical fiber(s).

Summary of Problems and Solutions

Figure 3:
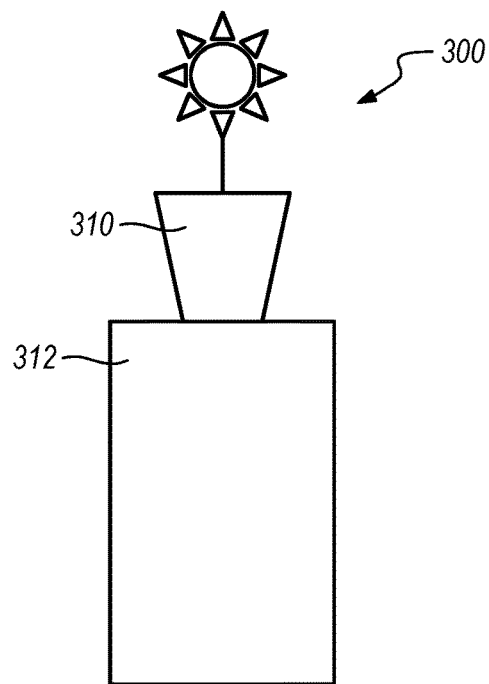
FIGS. 3 and 4 illustrate an artifact with user movement, according to some embodiments.

When an optical system generates/renders virtual content, it may use a source frame of reference that may be related to a pose of the system when the virtual content is rendered. In AR systems, the rendered virtual content may have a predefined relationship with a real physical object. For instance, FIG. 3 illustrates an AR scenario 300 including a virtual flower pot 310 positioned on top of a real physical pedestal 312. An AR system rendered the virtual flower pot 310 based on a source frame of references in which the location of the real pedestal 312 is known such that the virtual flower pot 310 appears to be resting on top of the real pedestal 312. The AR system may, at a first time, render the virtual flower pot 310 using a source frame of reference, and, at a second time after the first time, display/projected the rendered virtual flower pot 310 using an output frame of reference. If the source frame of reference and the output frame of reference are the same, the virtual flower pot 310 will appear where it was intended to be (e.g., on top of the real physical pedestal 312), for example, as illustrated in FIG. 3.

Figure 4:
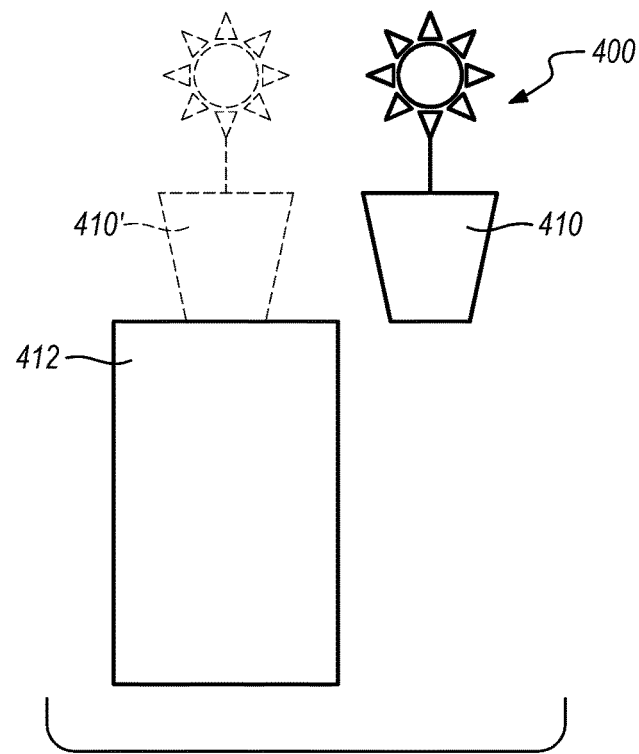

However, if the frame of reference changes (e.g., with user head movement) from the first time at which the virtual flower pot 310 is rendered to the second time at which the rendered virtual flower pot 310 is displayed/projected, the mismatch/difference between the source frame of reference and the output frame of reference may result in visual artifacts/anomalies/glitches. For instance, FIG. 4 shows an AR scenario 400 including a virtual flower pot 410 that was rendered to be positioned on top of a real physical pedestal 412. However, because the AR system was moved to the right (e.g., by head rotation to the right) after the virtual flower pot 410 was rendered but before it was displayed/projected, the virtual flower pot 410 is displayed to the right of its intended position 410' (shown in phantom). As such, the virtual flower pot 410 appears to be floating in midair to the right of the real physical pedestal 412. This artifact may be remedied when the virtual flower pot is re-rendered in the next source frame of reference and displayed in the next output frame of reference (assuming that the AR system motion ceases). However, the artifact will still be visible to some users with the virtual flower pot 410 appearing to glitch by temporarily jumping to an unexpected position. This glitch, and others like it, may have a deleterious effect on the illusion of continuity of an AR scenario.

Some optical systems may include a warping system that warps or transforms a frame of reference of rendered virtual content from the source frame of reference in which the virtual content was generated to the output frame of reference in which the virtual content will be displayed. In the example depicted in FIG. 4, the AR system can detect and/or predict (e.g., using IMUs or eye tracking) the output frame of reference and/or pose. The AR system can then warp or transform the rendered virtual content from the source frame of reference into warped virtual content in the output frame of reference.

Figure 5:
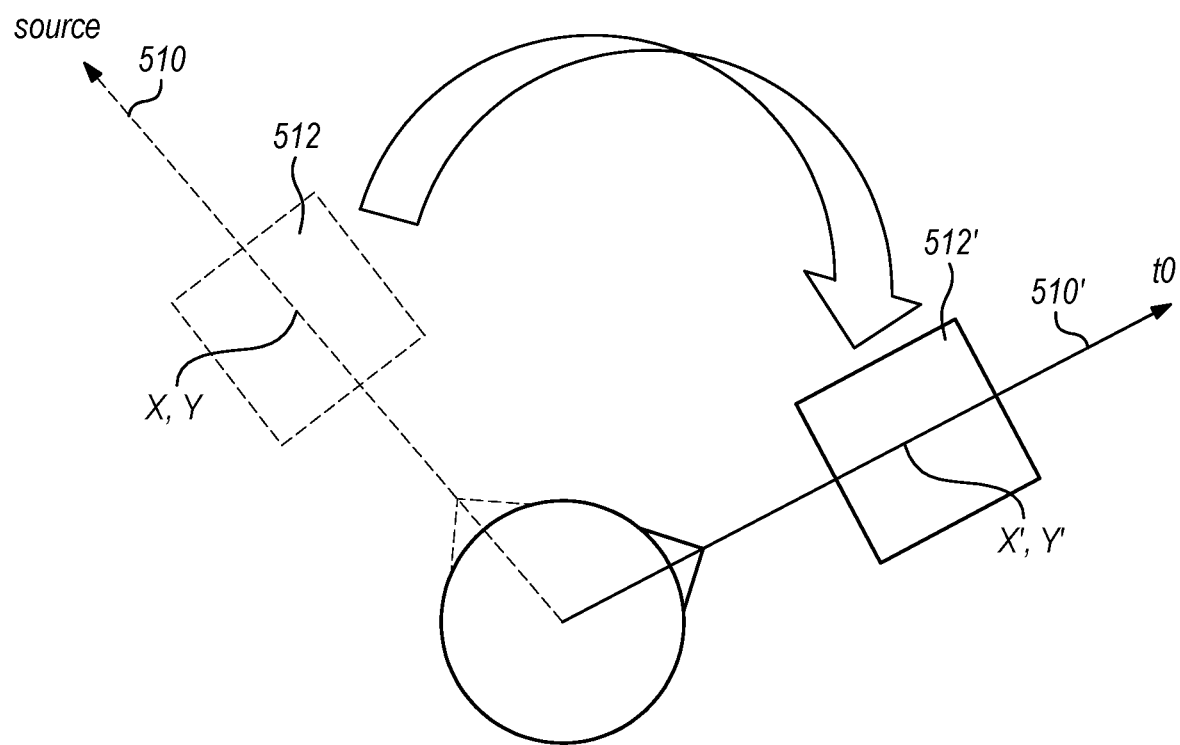
FIG. 5 illustrates warping virtual content to correct for head rotation, according to some embodiments.

FIG. 5 schematically illustrates warping of virtual content to correct for head rotation, according to some embodiments ("rotational warp"). Rendered virtual content 512 in a source frame of reference (render pose) represented by ray 510, is warped into warped virtual content 512' in an output frame of reference (estimated pose) represented by ray 510'. The warp depicted in FIG. 5 may represent a head rotation to the right. While the rendered virtual content 512 is disposed at source X, Y location, the warped virtual content 512' is transformed to output X', Y' location (in a stationary frame of reference). However, due to movement (e.g., rightward rotation) of the user's head and FOV between rendering the virtual content 512 and displaying the warped virtual content 512', the warped virtual content 512' is displayed at a position/orientation relative to the display frame of reference (pose) represent by ray 510' that is the same as the position/orientation of rendered virtual content 512 relative to the source frame of reference (render pose) represented by ray 510. The warp depicted in FIG. 5 results in the warped virtual content 512' being displayed in the display pose as the rendered virtual content 512 would appear if displayed in the render pose.

FIGS. 6-9 schematically illustrates warping of virtual content to correct for head position change, according to some embodiments ("positional warp"). The rendered virtual content 610, 612 from a render pose is warped to generate warped virtual content 610', 612' in a display pose. The FOV change from the render pose to the display pose is a positional change (i.e., movement along some of six degrees of freedom in addition to optional rotation).

Figure 6:
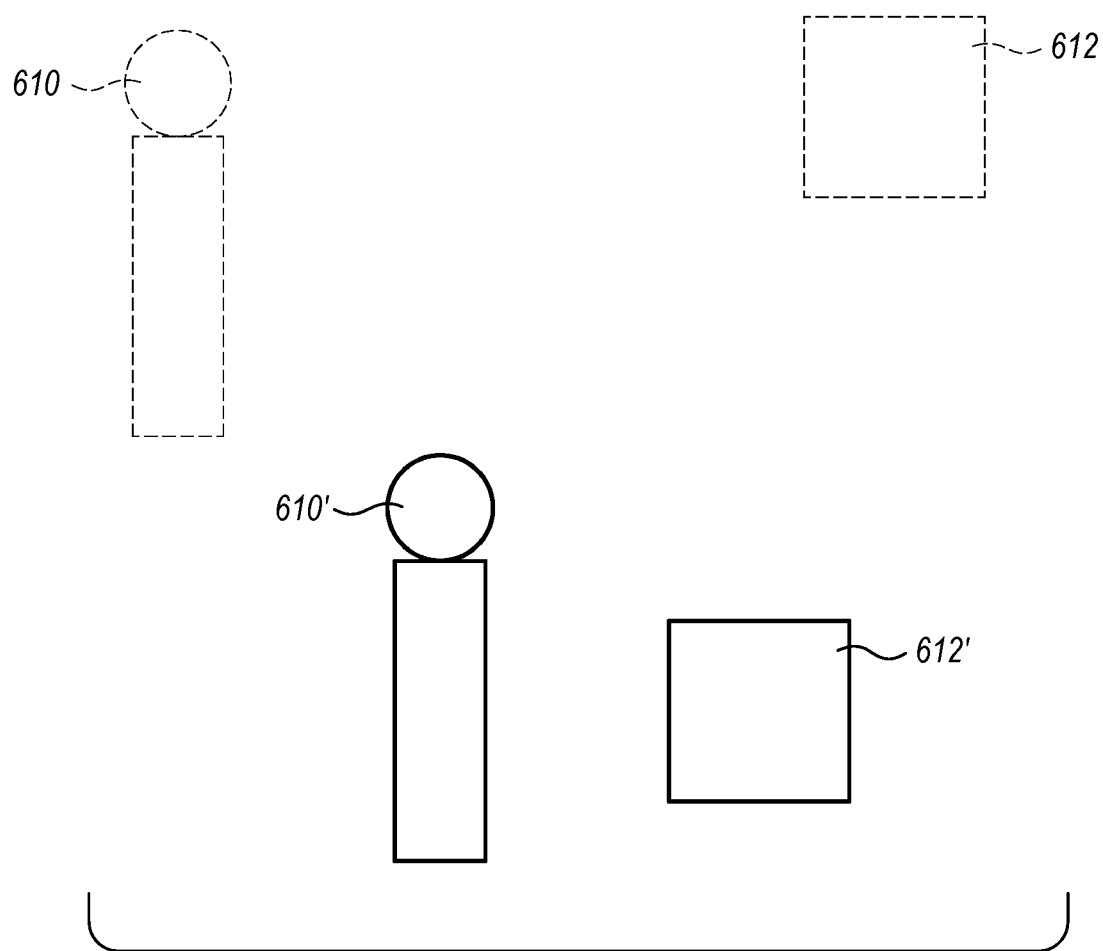
FIGS. 6-9 illustrate warping virtual content to correct for user movement, according to some embodiments.

FIG. 6 depicts a positional warp, according to some embodiments. For instance, an AR system may warp all source subparts forming a 3-D scenario in rendered virtual content. For example, primitives forming a chess piece 610 and a cube 612 may be warped to a warped chess piece 610' and a warped cube 612'. The chess piece 610 and the cube 612 are shown in phantom in FIG. 6 to indicate that they are in the source frame of reference (i.e., render FOV), and will not be displayed. Instead, the warped chess piece 610' and the warped cube 612' (shown in solid lines) in the output frame of reference (i.e., display FOV after positional change) will be displayed.

Some warping systems/methods also depth test all the subparts (e.g., each primitive forming the warped chess piece 610' and the warped cube 612') to generate depth data. After depth testing, the AR system stores all the warped subparts (e.g., primitives) and their relative depths in the source frame of reference (e.g., in a list). Warped virtual content may be stored as a list of all brightnesses/colors at each X, Y position (e.g., pixel) in the output virtual content, including all instances of conflicting warped virtual data (see below).

Figure 7:
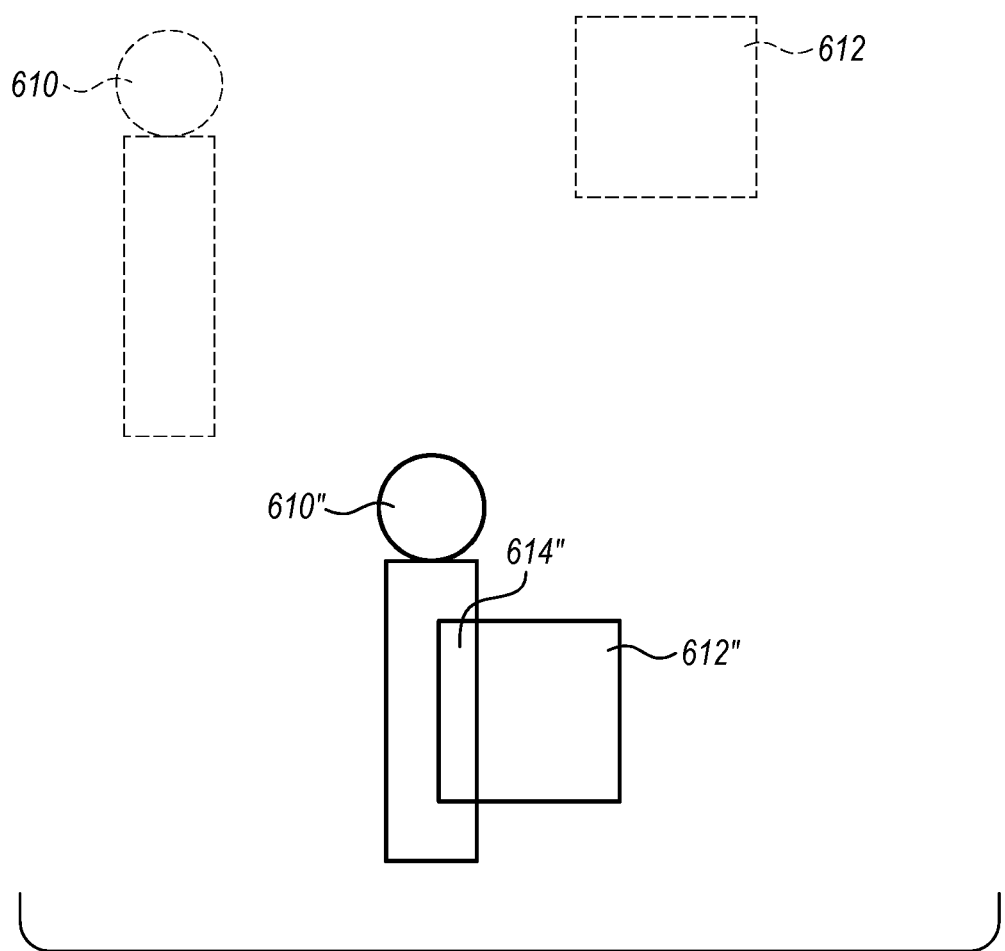

The warping systems then resolves all conflicting virtual data at each X, Y position of the stored warped subparts and relative depths (e.g., the list). For example, as illustrated in FIG. 7, when two or more different subparts of a 3-D scenario (e.g., the chess piece 610 and the cube 612) are warped into an output frame of reference (e.g., the warped chess piece 610" and the warped cube 612"), portions of these subparts may warp/project into (i.e., be assigned to) a same pixel of a final display image. For instance, area 614" in FIG. 7 represents "conflicting" portions of the warped chess piece 610" and the warped cube 612". The warping system resolves/reconciles these conflicting portions of the warped virtual content when generating output virtual content.

In some embodiments, if respective pixels of the warped chess piece 610" and the warped cube 612" (e.g., first and second virtual content) would be displayed on the same pixel of the display (i.e., colliding pixels), the warping system may compare the stored depth data corresponding to the respective colliding/conflicting pixel. The colliding pixel (e.g., warped virtual content) closer to a viewing location in the output frame of reference is displayed (assuming that the content is opaque). The colliding pixel closest to the viewing location in the output frame of reference is used to generate a final display image. The remaining colliding pixels are discarded.

Figure 8:
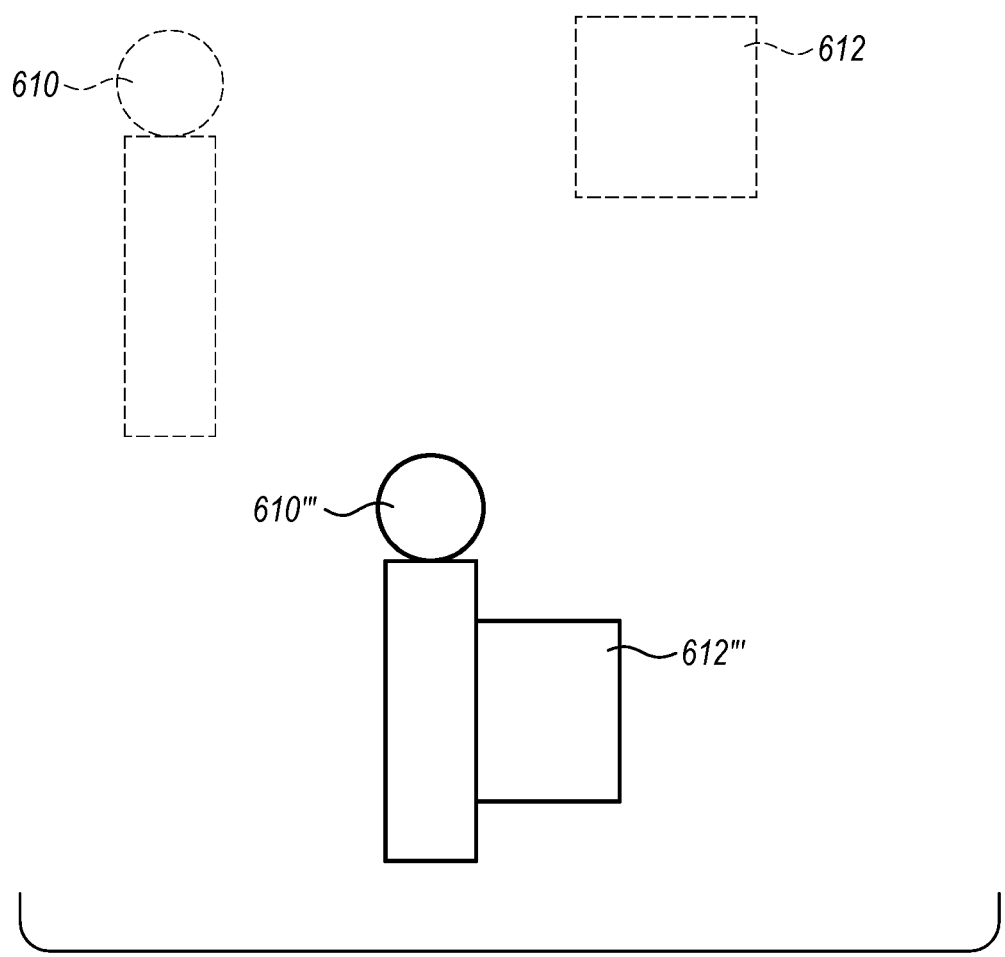
Figure 9:
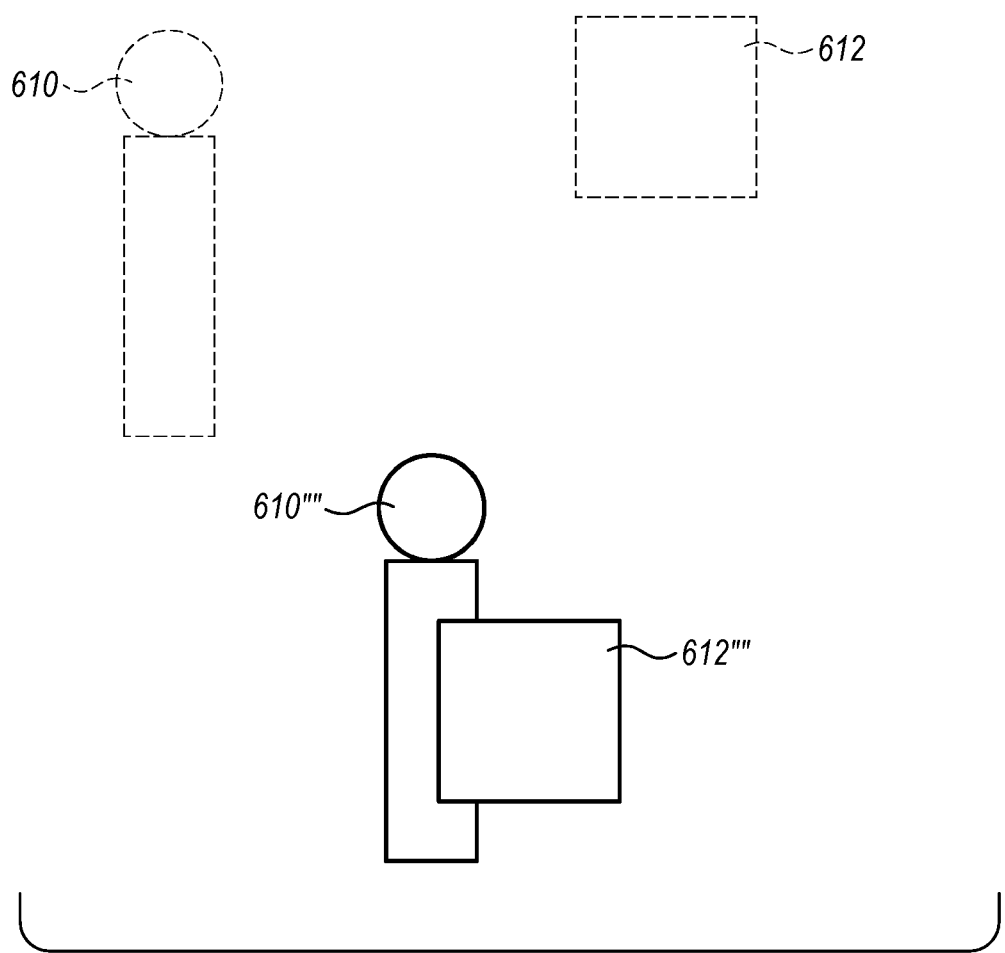

In one instance shown in FIG. 8, the warped chess piece 610''' is closer to the user than the warped cube 612'''. As such, when pixels of the warped chess piece 610''' and the warped cube 612''' collide, the pixels of the warped chess piece 610''' are displayed in the output content. In another instance shown in FIG. 9, the warped cube 612'''' is closer to the user than the warped chess piece 610''''. As such, when pixels of the warped chess piece 610'''' and the warped cube 612'''' collide, the pixels of the warped cube 612'''' are displayed in the output content. Because some warping systems generate depth data in the source frame of reference, the depth comparison may involve multiple transformations and may be more complicated than a direct comparison.

Various steps of warping methods can be perform in two passes or a single pass, as described in U.S. Utility application Ser. No. 15/924,011, the contents of which have been previously incorporate by reference above. Positional warping systems/methods (warping, depth testing, depth comparison, compositing, etc.) can be relatively computationally expensive (resulting in processor/memory related system limitations) and relatively time-consuming (resulting in system latency). Accordingly, some warping methods focus on rotational warp. However, rotational warps can result in various artifacts with various user FOV movements, such as lateral user FOV movement orthogonal to the optical axis (disocclusion, jitter, smearing, which are described in detail below).

In order to address these limitations, the systems/methods described herein include various embodiments for warping virtual content when the user FOV is moved (e.g., laterally orthogonal to the optical axis). While some embodiments are described with reference to lateral user FOV movement, these embodiments address artifacts resulting from other types of user FOV movements. This minimizes computational expense and time required, which increases with the complexity of the 3-D scenario that must be warped for display. Accordingly, the disclosed embodiments facilitate real-time systems such as some mixed reality systems which maintaining size, power, heat and other processing related parameter within acceptable limits.

Illustrative Graphics Processing Unit

Figure 10:
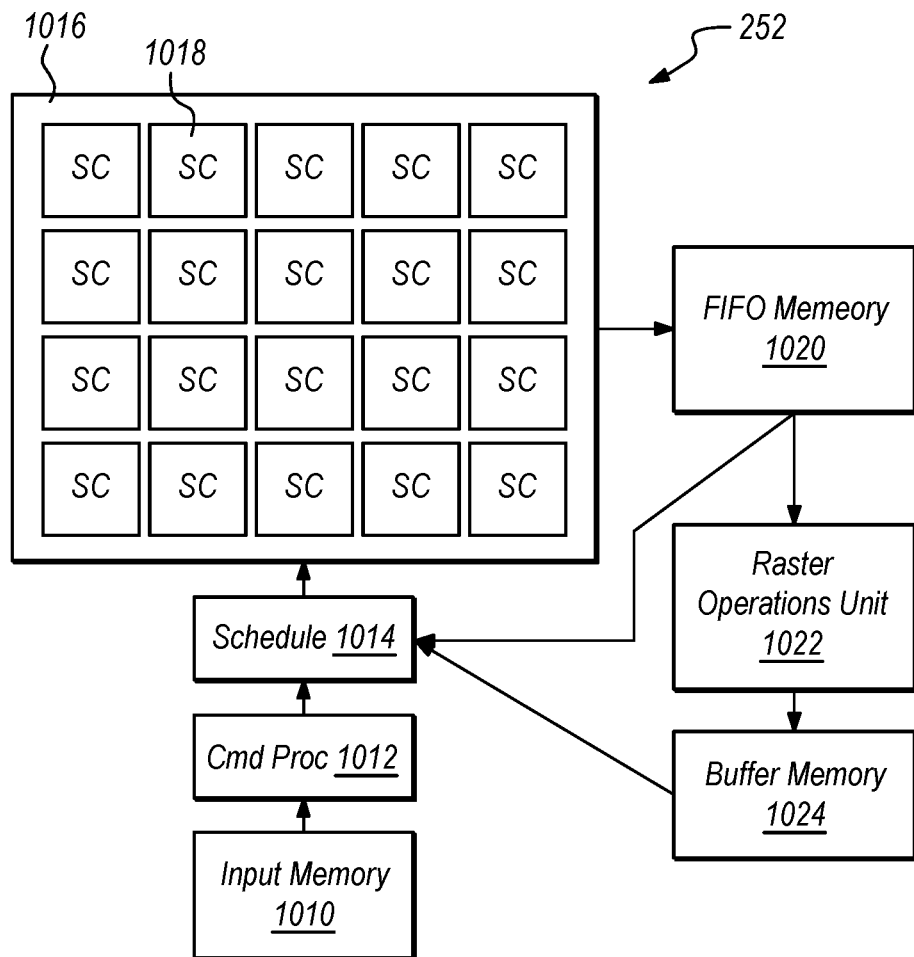
FIG. 10 schematically depicts a graphics processing unit (GPU), according to some embodiments.
Figure 11:
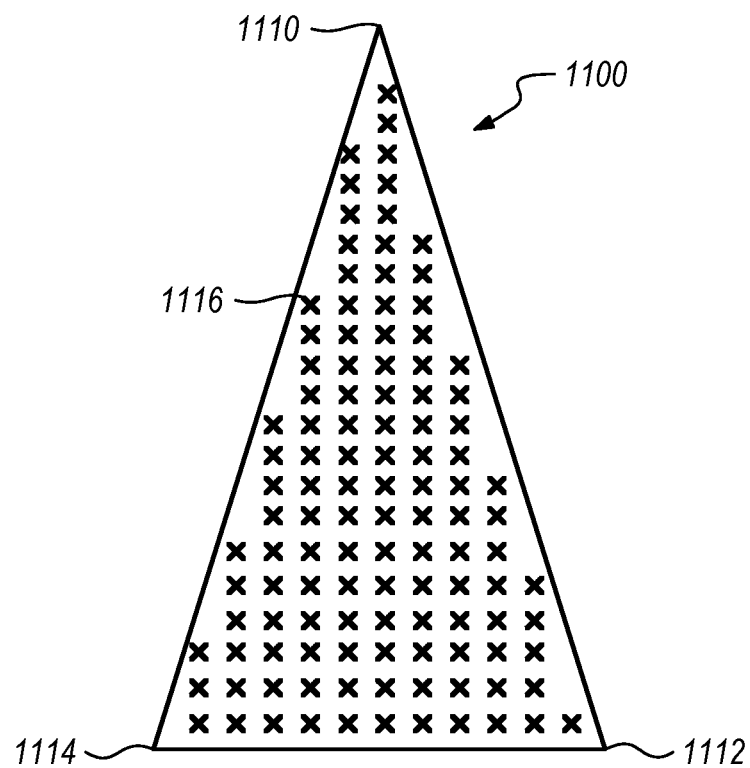
FIG. 11 depicts a virtual object stored as a primitive, according to some embodiments.

FIG. 10 schematically depicts an exemplary graphics processing unit (GPU) 252 to warp rendered virtual content to an output/display frame of reference, according to some embodiments. The GPU 252 includes an input memory 1010 to store the rendered virtual content to be warped. In some embodiments, the virtual content is stored as a primitive (e.g., a triangle 1100 in FIG. 11). The GPU 252 also includes a command processor 1012, which (1) receives/reads the virtual content from the input memory 1010, (2) divides the virtual content into scheduling units, and (3) sends the scheduling units along the rendering pipeline in waves or warps for parallel processing. The GPU 252 further includes a scheduler 1014 to (1) receive the scheduling units from the command processor 1012, and (2) determine whether the "new work" from the command processor 1012 or "old work" returning from downstream in the rendering pipeline (described below) should be sent down the rendering pipeline at any particular time. In effect, the scheduler 1014 determines the sequence in which the GPU 252 processes various input data.

The GPU 252 includes one or more GPU cores 1016, where each GPU core 1016 has a number of parallel executable cores/units ("shader cores") 1018 for processing the scheduling units in parallel. The command processor 1012 divides the virtual content into a number equal to the number of shader cores 1018 (e.g., 32). The GPU 252 also includes a "First In First Out" ("FIFO") memory 1020 to receive output from the GPU core 1016. From the FIFO memory 1020, the output may be routed back to the scheduler 1014 as "old work" for insertion into the rendering pipeline additional processing by the GPU core 1016.

The GPU 252 further includes a Raster Operations Unit ("ROP") 1022 that receives output from the FIFO memory 1020 and rasterizes the output for display. For instance, primitives of virtual content may be stored as the coordinates of vertices of triangles. After processing by the GPU core 1016 (during which the three vertices 1110, 1112, 1114 of the triangle 1100 of FIG. 11 may be warped), the ROP 1022 determines which pixels 1116 are inside of the triangle 1100 defined by three vertices 1110, 1112, 1114 and fills in those pixels 1116 in the virtual content. The ROP 1022 may also perform depth testing on the virtual content.

The GPU 252 also includes a buffer memory 1024 for temporarily storing warped virtual content from the ROP 1022. The warped virtual content in the buffer memory 1024 may include brightness/color and depth information at a plurality of X, Y positions in a field of view in an output frame of reference. The output from the buffer memory 1024 may be routed back to the scheduler 1014 as "old work" for insertion into the rendering pipeline additional processing by the GPU core 1016, or for display in the corresponding pixels of a display system. The GPU cores 1016 first processes the vertices 1110, 1112, 1114 of the triangles 1100, then it processes the pixels 1116 inside of the triangles 1100. When all the fragments of virtual content in the input memory 1010 have been warped and depth tested (if necessary), the buffer memory 1024 will include all of the brightness/color and depth information needed to display a field of view in an output frame of reference.

Virtual Content Warping Systems and Methods for Lateral Shifts

In image processing without head pose changes, the results of the processing by the GPU 252 are color/brightness values and depth values at respective X, Y values (e.g., at each pixel). However with lateral head pose changes (i.e., with lateral movement of the display FOV orthogonal to an optical axis), different portions of virtual content viewed from a viewing location in an output frame of reference different from a source frame of reference in which the virtual content was generated may include various artifacts. As described above, positional warping to correct lateral movement artifacts after lateral head pose changes may be computationally expensive and slow, making it difficult to use with portable display systems, such as mixed reality systems. Further, rotational warping with lateral head pose changes can result various other artifacts.

Figure 12:
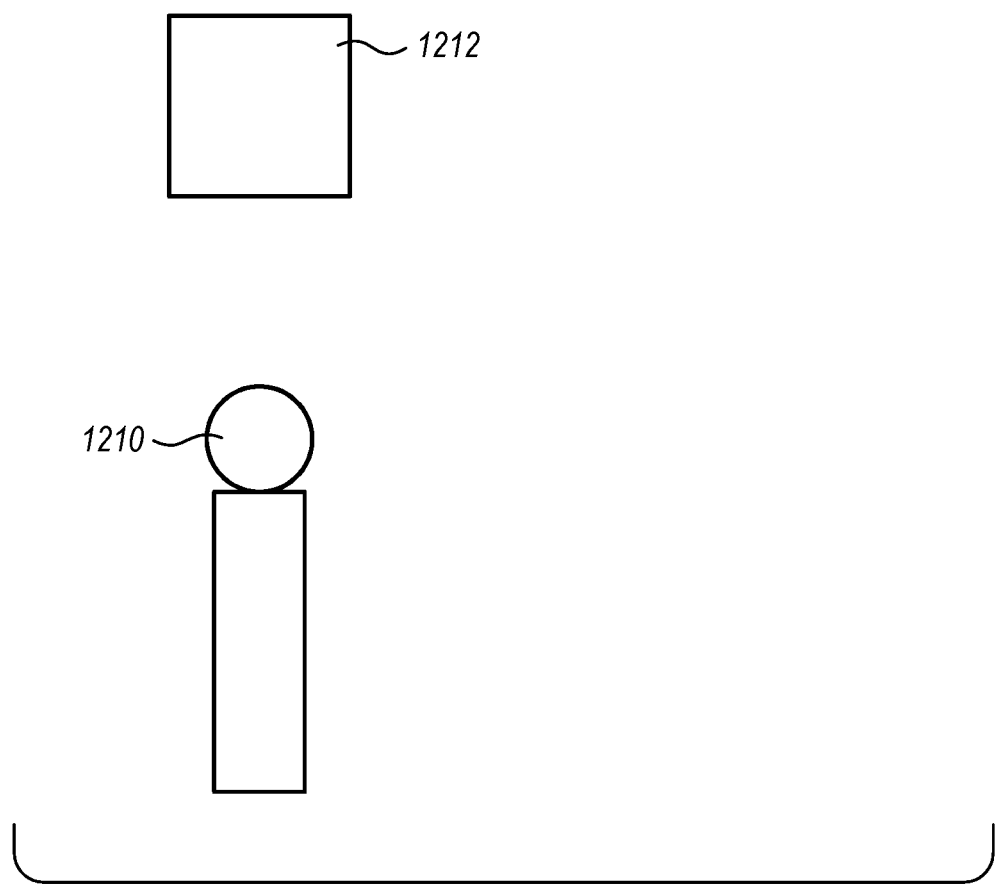
FIGS. 12-14 depict warping two non-overlapping virtual objects located at different depths to correct for user movement, according to some embodiments.
Figure 13:
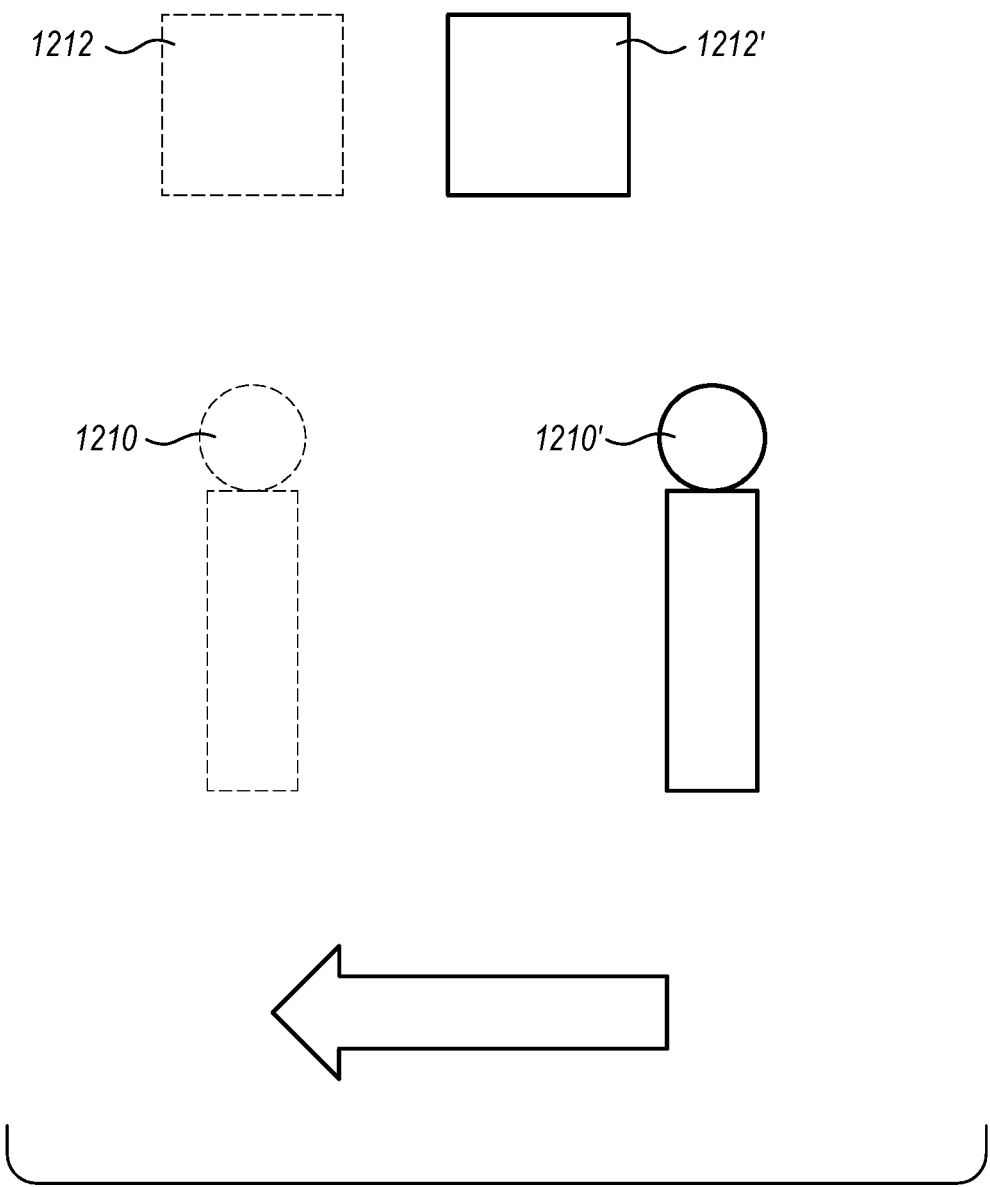
Figure 14:
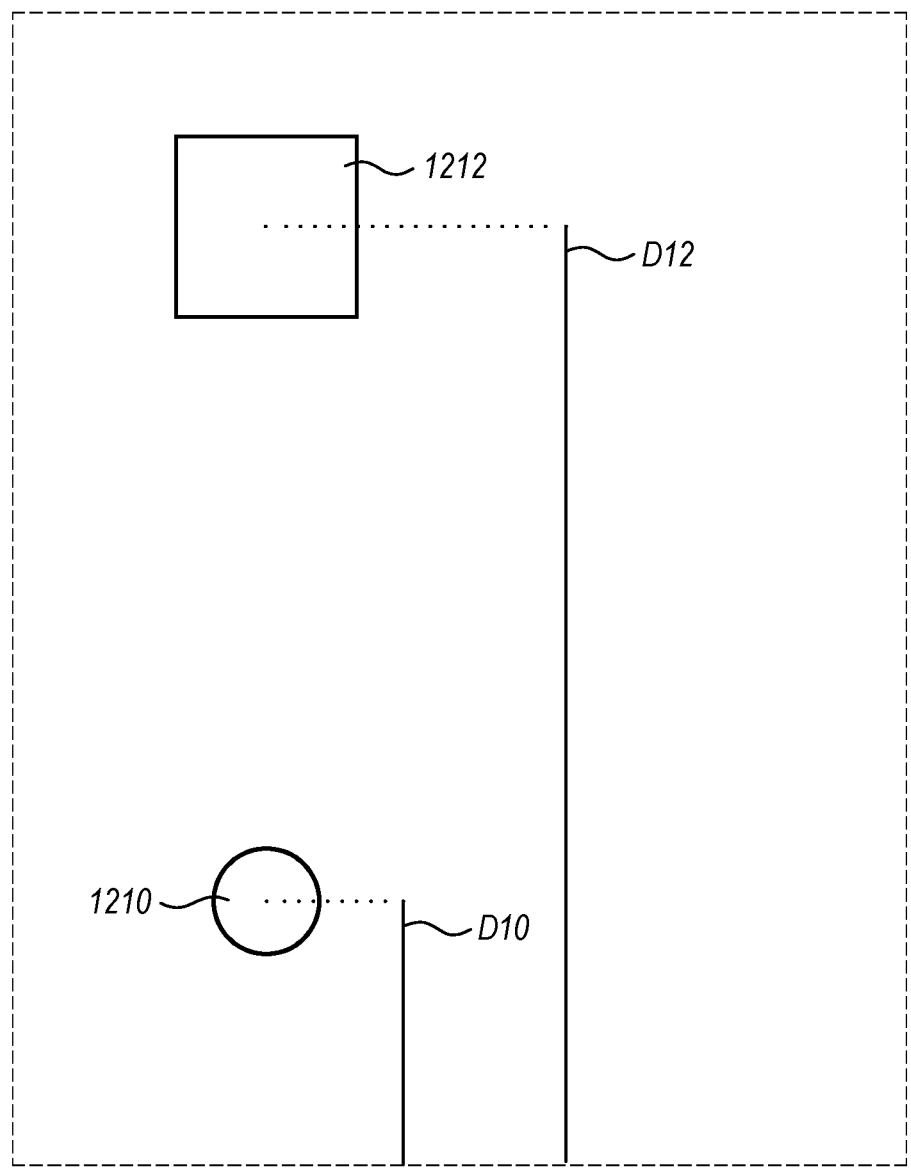

FIGS. 12-14 depict positional warping in response to lateral FOV movement, according to some embodiments. FIG. 12 depicts rendered virtual objects (a chess piece 1210 and a cube 1212).

FIG. 13 depicts the rendered virtual objects 1210, 1212, and warped virtual objects 1210', 1212' after a left lateral FOV movement. The rendered virtual objects 1210, 1212 are shown in phantom in FIG. 13 to indicate that the chess piece 1210 and the cube 1212 as generated in the source frame of reference and not in the display frame of reference are not displayed. Only after the warping system has warped the chess piece 1210 and the cube 1212 are the warped chess piece 1210' and the warped cube 1212' (shown in solid lines) displayed.

FIG. 14 schematically depicts the rendered virtual objects 1210, 1212 from a top view to show the differences in depth of the rendered virtual objects 1210, 1212. The chess piece 1210 is closer to the viewer at depth D10 (i.e., the depth of the center of the chess piece 1210), and the cube 1212 is farther away from the viewer at depth D12 (i.e., the depth of the center of the cube 1212). Consequently, with the same left lateral FOV movement, the closer object (chess piece 1210) appears to move further to the right compared to the farther object (cube 1212). This difference is illustrated in FIG. 13 by the different rightward shifts of the warped chess piece 1210' and the warped cube 1212'. The differences in the rightward shifts depicted in FIG. 13 are selected to illustrate this principle/effect, and is not directly correlated to the depth differences depicted in FIG. 14. With a large depth difference, the closer object can appear to shift rightward while the farther object can appear to be stationary.

In some embodiments, depth testing each pixel of each rendered virtual object 1210, 1212 and warping each pixel based on its depth can be computationally expensive to the point that such positional warping may be impractical to implement in portable systems.

Disocclusion Artifact

Figure 15:
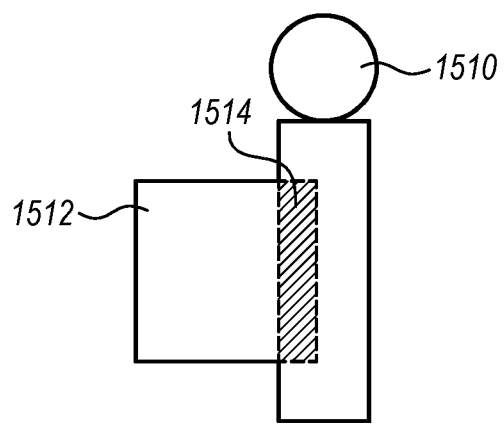
FIGS. 15-19 depict a disocclusion artifact when warping two overlapping virtual objects located at different depths to correct for user movement.
Figure 16:
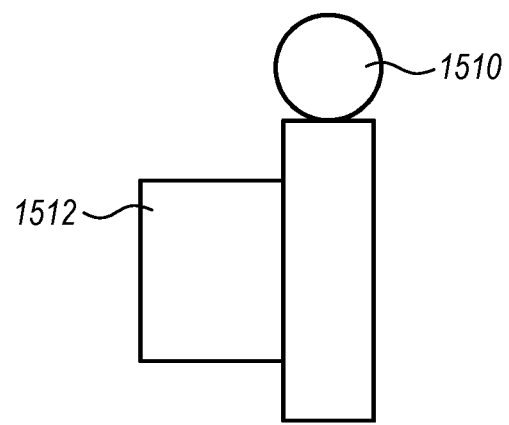

FIGS. 15-19 depict a disocclusion artifact with positional warping, according to some embodiments. FIG. 15 depicts rendered virtual objects (a chess piece 1510 and a cube 1512) with an area of overlap 1514 between chess piece 1510 and the cube 1512 from the render pose. FIG. 16 shows that, because the chess piece 1510 is close to the viewer than the cube 1512, the portion of the cube 1512 corresponding to the overlap area 1514 is not rendered, which the portion of the chess piece 1510 corresponding to the overlap area 1514 is rendered.

Figure 17:
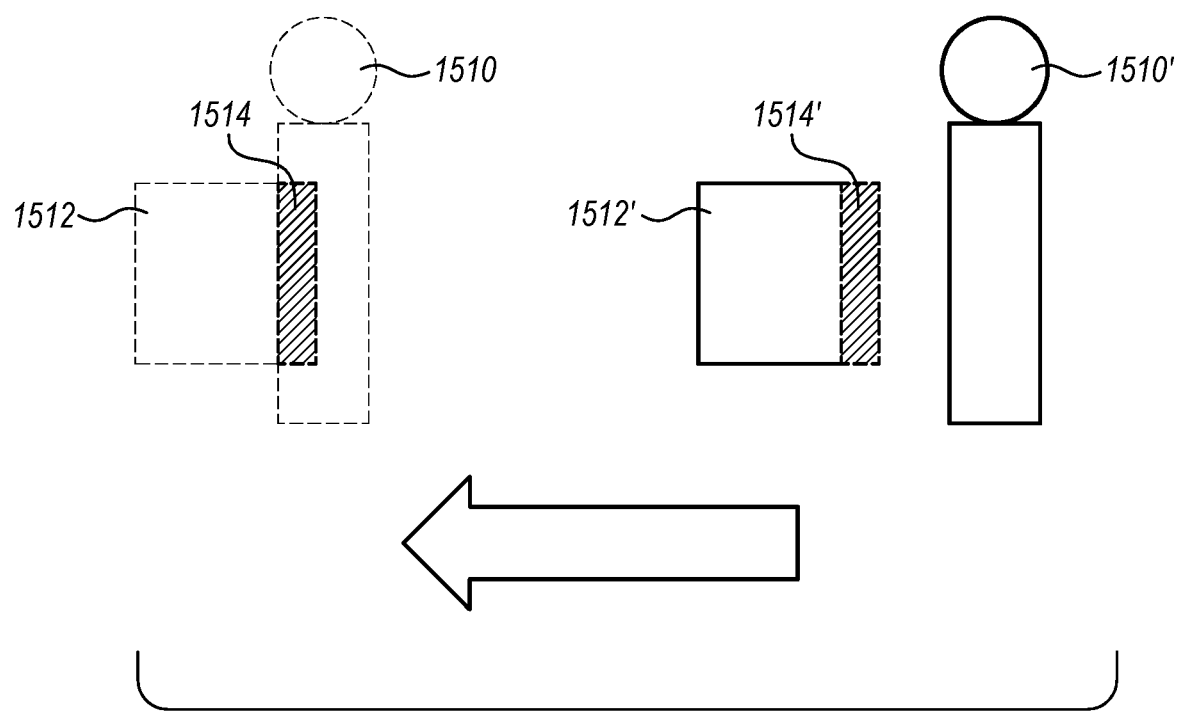

FIG. 17 schematically shows that, with lateral user head movement to the left as in FIG. 13, the virtual objects (chess piece 1510 and cube 1512) are warped to the right to generate warped virtual objects (chess piece 1510' and warped cube 1512'). As explained with respect to FIGS. 13 and 14, because the chess piece 1510 is closer to the viewer then the cube 1512, chess piece 1510 will be warped farther to the right than the cube 1512 in response to lateral user head movement to the left. This differential warping of the chess piece 1510' and the warped cube 1512' uncovers or "disoccludes" the portion of the cube 1512 corresponding to the overlap area 1514. Referring back to FIG. 16, the portion of the cube 1512 corresponding to the overlap area 1514 was not rendered. Accordingly, the now disoccluded portion of the warped cube 1512' corresponding to the previously occluded overlap area 1514' cannot be displayed because the source virtual object (i.e., the cube 1512) did not include the overlap area 1514.

Figure 18:
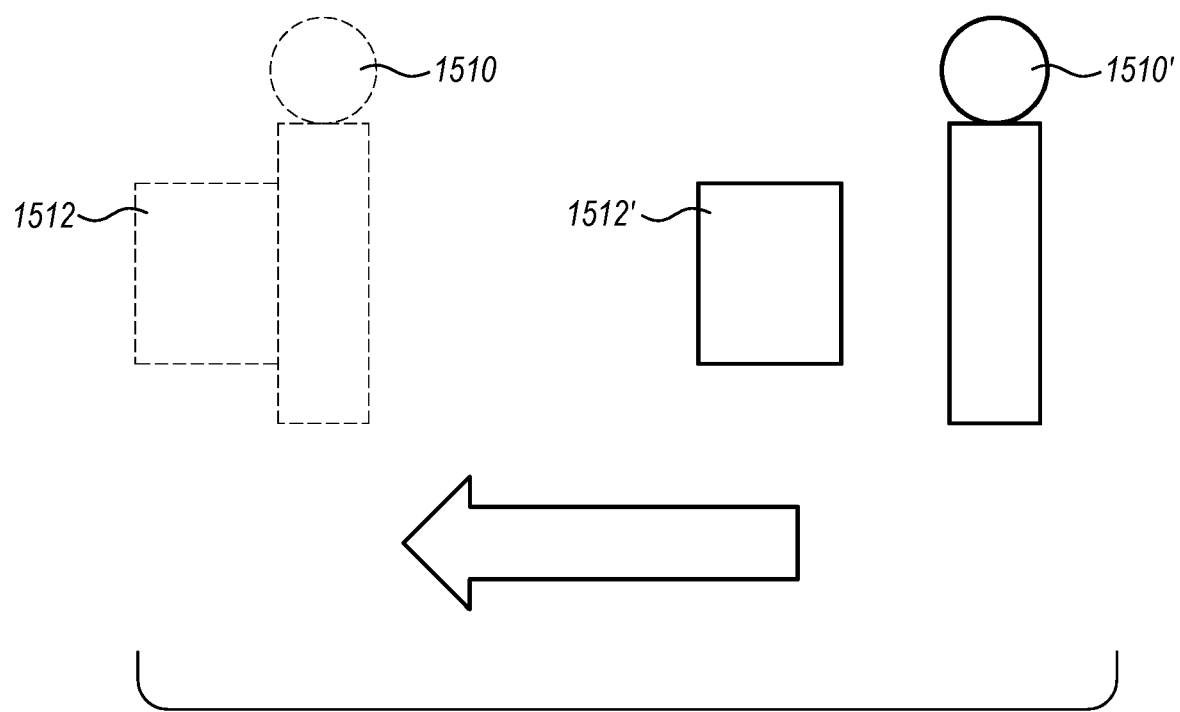
Figure 19:
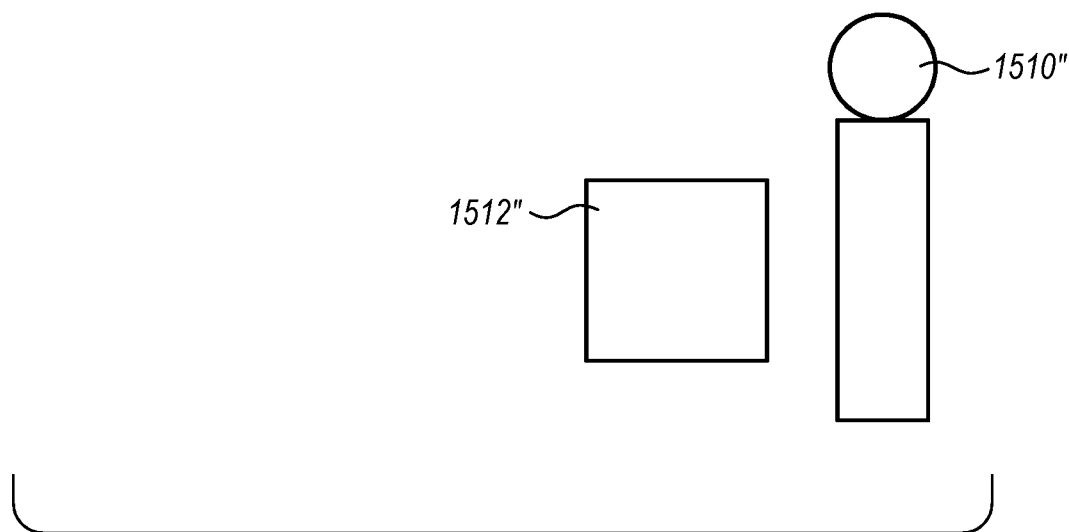

FIG. 18 shows, without including any non-rendered portions, the positional warping described in FIG. 17. FIG. 18 shows that the warped cube 1512' does not include a previously occluded portion (see 1514' in FIG. 17). FIG. 19 depicts the next frame that is rendered and displayed assuming that the lateral user head movement stops at the frame depicted in FIG. 18. As shown in FIG. 19, with the next rendering without user FOV movement, the newly rendered chess piece 1510" and cube 1512" remain in substantially the same position as in FIG. 17. However, the newly rendered cube 1512" includes the previously occluded portion (see 1514' in FIG. 17), thereby forming a complete cube 1512".

Comparing FIGS. 18 and 19 shows the disocclusion artifact where in a previously occluded portion of a virtual object (see 1514' in FIG. 17) is first not displayed after a warp uncovers the previously disoccluded portion as shown in FIG. 18. Then the previously occluded portion appears when the virtual object is next rendered and displayed as shown in FIG. 19. Wherein the disocclusion artifact depicted in FIG. 17-19 includes a significant portion of the virtual object (the cube) disappearing and appearing, in other embodiments, depending on many factors including differences in depth, amounts of overlap, speed of FOV movement, disocclusion artifacts may manifest as cracks or other missing portions in solid virtual objects. Regardless of the manifestation, disocclusion artifacts may impact the user experience, reducing the realism of a mixed reality scenario. Because the embodiment depicted in FIGS. 15-19 still utilizes positional warp, the disocclusion artifacts are also accompanied by the computational expense of positional warp.

Smearing Artifact

Figure 20:
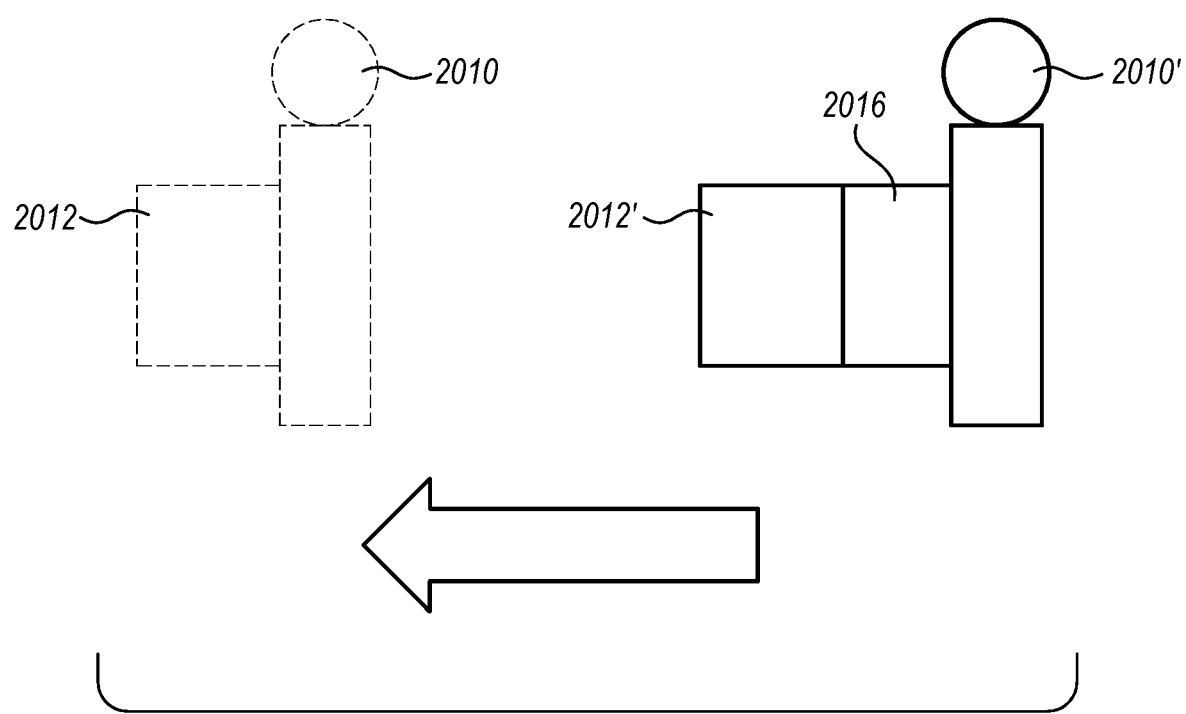
FIGS. 20 and 21 depict a smearing artifact when warping two overlapping virtual objects located at different depths to correct for user movement.
Figure 21:
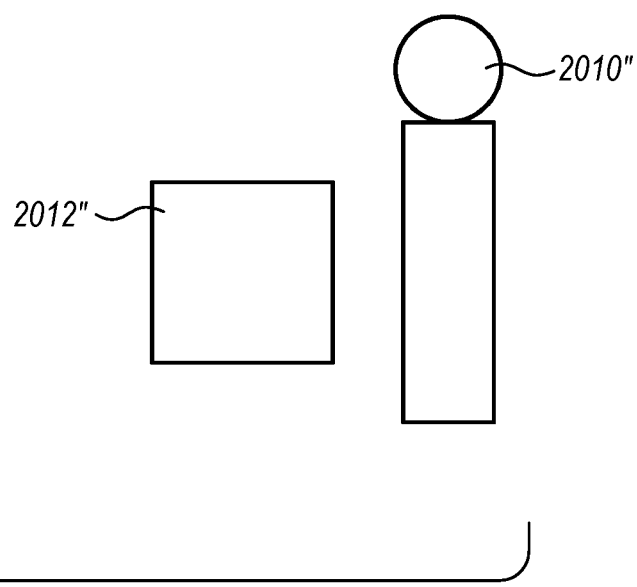

FIGS. 20 and 21 depict a smearing artifact with warping, according to some embodiments. In order to minimize the disocclusion artifacts described above, some warping system/methods stretch a far virtual object when it is disoccluded by warping to fill-in the space between the differentially warped virtual objects. FIG. 20 shows such a warp of virtual objects (chess piece 2010 and cube 2012) to the right to generate warped virtual objects (warped chess piece 2010' and warped cube 2012') in response to lateral user head movement to the left. A non-occluded portion of the cube 2012 has been stretched to form a filler section 2016 in the space between the warped chess piece 2010' and warped cube 2012'.

FIG. 21 depicts the next rendering of the chess piece 2010" and cube 2012" without user FOV movement. With the next rendering, the newly rendered chess piece 2010" and cube 2012" remain in substantially the same position as in FIG. 20. However, the newly rendered cube 2012" is based on the complete cube (e.g., the cube 1514 from FIG. 17) and does not include the filler section 2016 in FIG. 20. Further, any differences in characteristics between the portion of the newly rendered cube 2012" and the filler section 2016, which was based on a different portion of the previously rendered cube 2012, will be apparent to the user when comparing FIGS. 20 and 21. Such characteristics may include color, texture, and the like. This difference in characteristics between the portion of the newly rendered cube 2012" and the filler section 2016 may be referred to as a smearing artifact because the filler section 2016 may appear as a smear of the different portion of the previously rendered cube 2012/2012'. Smearing artifacts can also impact the user experience, reducing the realism of a mixed reality scenario. Because the embodiment depicted in FIGS. 20-21 still utilizes positional warp, the smearing artifacts are also accompanied by the computational expense of positional warp.

Single Depth Warp and Jitter Artifact

Figure 22:
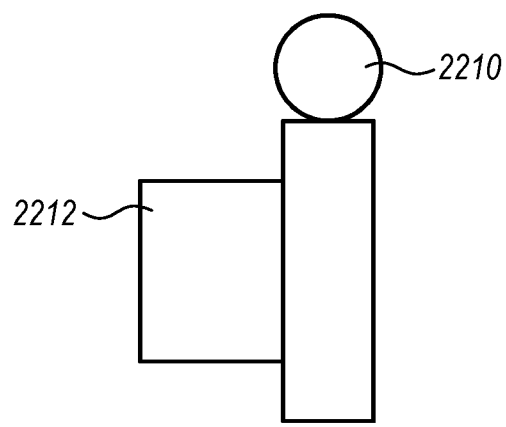
FIGS. 22-24 depict a jitter artifact when warping two overlapping virtual objects located at different depths to correct for user movement.
Figure 23:
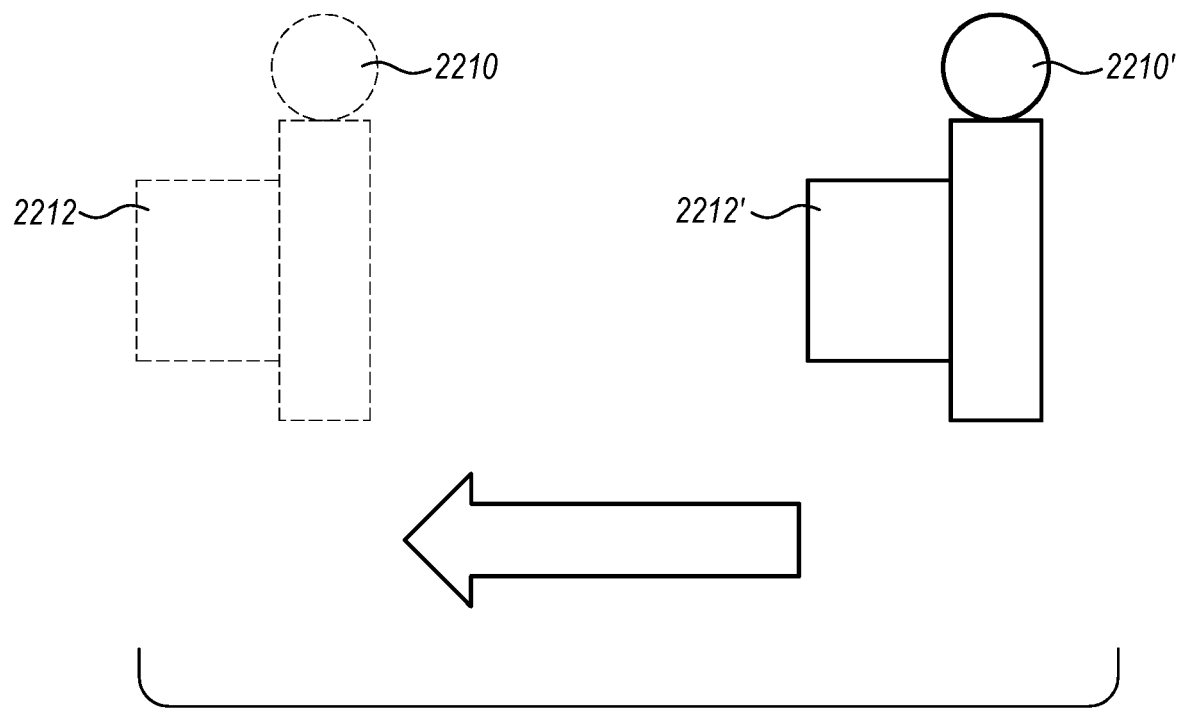
Figure 24:
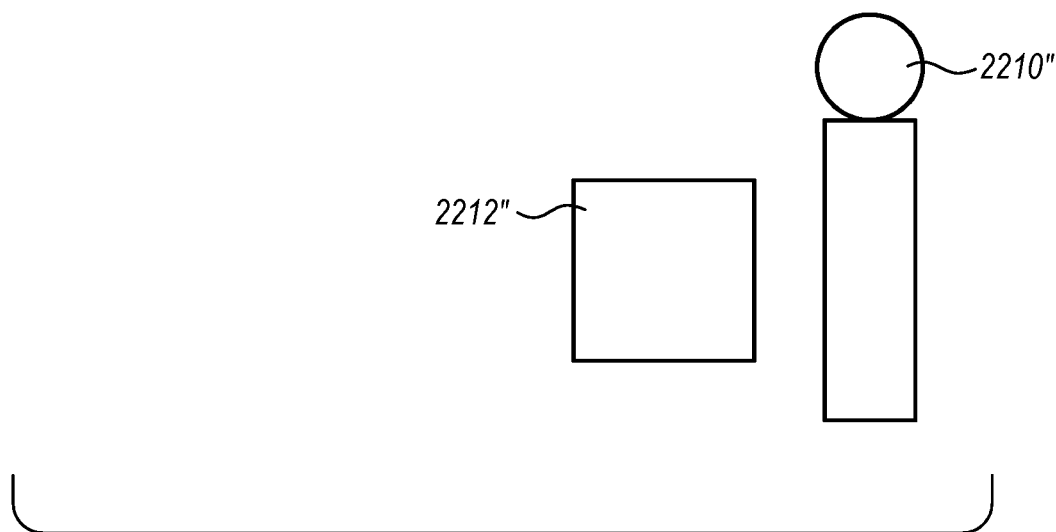

FIGS. 22-27 depict single depth warp according to two types of embodiments (FIGS. 22-24 and 25-27). FIGS. 22-24 depict single depth warp, according to some embodiments. FIG. 22 depicts the rendered virtual objects, i.e., a chess piece 2210 at a relatively nearer depth and a cube 2212 at a relatively farther depth.

FIG. 23 depicts warping the rendered virtual objects 2210, 2212 using a single depth. By using a single depth, the relative spatial relationship between the warped virtual objects (a warped chess piece 2210' and a warped cube 2212') is substantially the same as the relative spatial relationship between the rendered virtual objects 2210, 2212. The maintenance of substantially the same relative spatial relationship between warped virtual objects 2210', 2212' minimizes disocclusion artifacts because the occluded portion of the cube 2212 is not disoccluded until the entire cube 2212" is re-rendered in FIG. 24.

The single depth used to warp the rendered virtual objects 2210, 2212 in the embodiment depicted in FIGS. 22-24 is the nearest depth of any virtual object in the FOV (i.e., the chess piece 2210). This nearest depth is included in the data corresponding to the rendered virtual objects 2210, 2212. Therefore no depth testing is required. This reduces the computational load of this single depth warp method.

Comparing the warped virtual objects 2210', 2212' in FIG. 23 with the re-rendered virtual objects 2210", 2212" in FIG. 24 (i.e., the next rendered frame without user FOV movement) shows that the warped chess piece 2210' and the re-rendered chess piece 2210" are in substantially the same location because the depth used to warp the chess piece 2210 is the near depth D10 of the chess piece 2210. On the other hand, the warped cube 2212' and the re-rendered cube 2212" are in different positions because the depth D10 used to warp the cube 2212 is less than the actual far depth D12 of the cube 2212. This causes the warped cube 2212' to overly shift to the right in response to left lateral FOV movement. Accordingly, sequentially displaying the warped virtual objects 2210', 2212' in FIG. 23 followed by the re-rendered virtual objects 2210", 2212" in FIG. 24 causes the rendered cube 2212 to appear to move to the right, then snap back to the left. This "jitter artifact" (or "wiggle artifact") is exacerbated by continuous FOV movement resulting in a series of direction changes for the farther object (i.e., the rendered cube 2212) or objects in the background generally.

Figure 25:
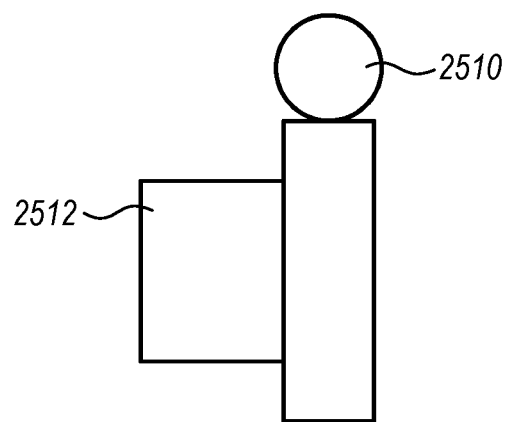
FIGS. 25-27 depict warping two overlapping virtual objects located at different depths to correct for user movement while minimizing jitter artifacts, according to some embodiments.
Figure 26:
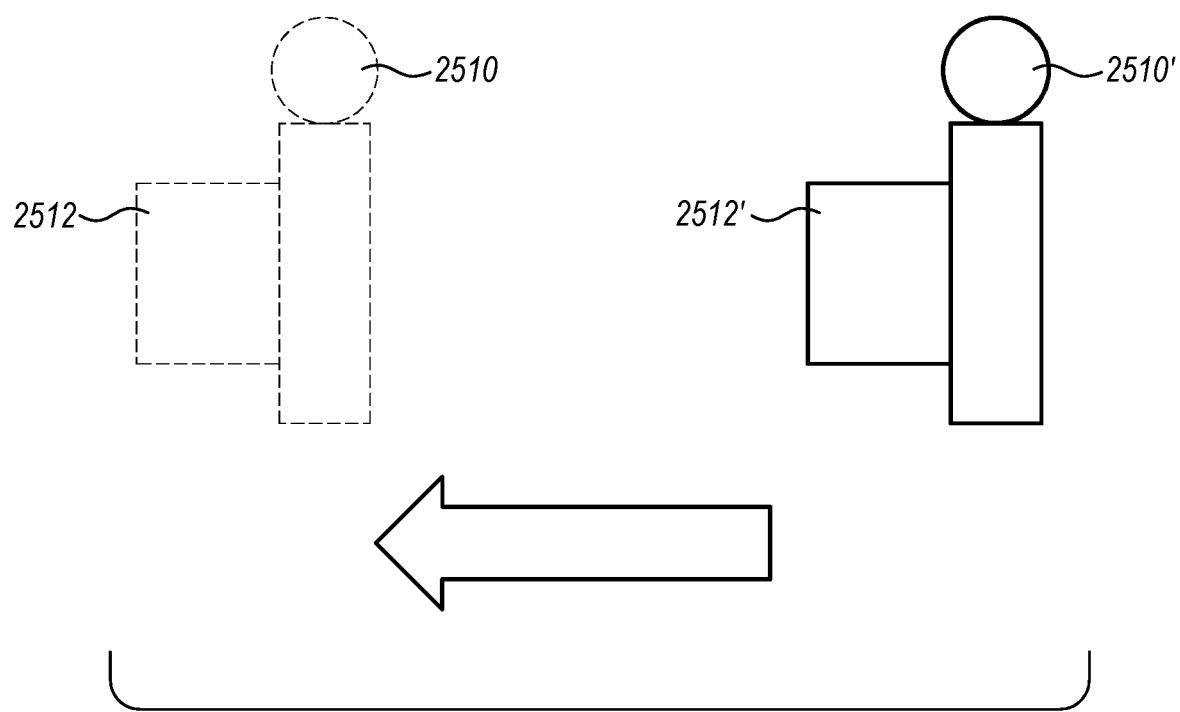
Figure 27:
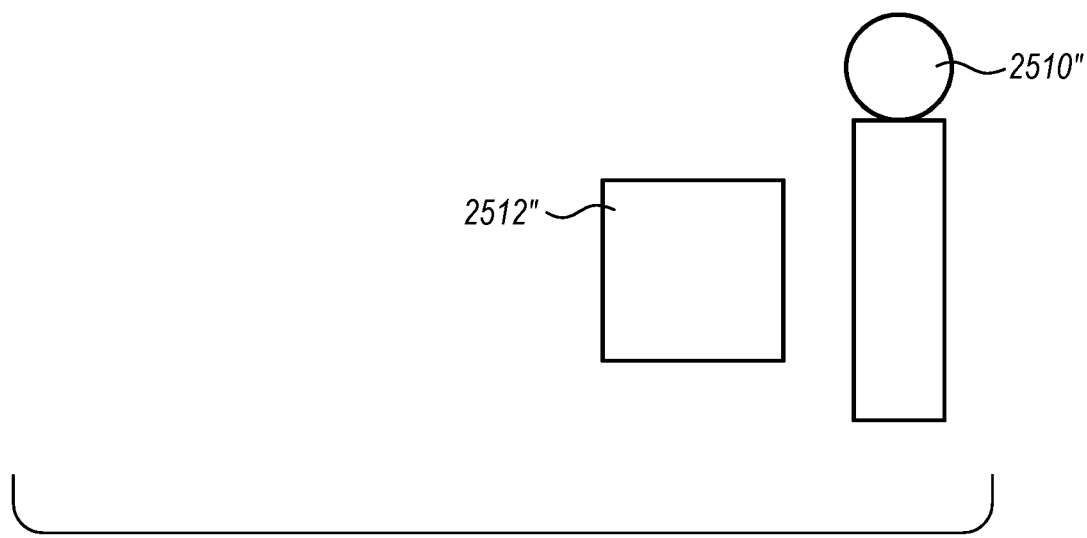

FIGS. 25-27 depict single depth warp, according to some other embodiments. FIG. 25 depicts the rendered virtual objects, i.e., a chess piece 2510 at a relatively nearer depth and a cube 2512 at a relatively farther depth.

FIG. 26 depicts warping the rendered virtual objects 2510, 2512 using a single depth to maintain substantially the same relative spatial relationship between the warped virtual objects (a warped chess piece 2510' and a warped cube 2512'). As explained above, maintaining essentially the same relative spacing between the warped virtual object 2510', 2512' minimizes disocclusion artifacts because the occluded portion of the cube 2512 is not disoccluded until the entire cube 2512" is re-rendered in FIG. 27.

The single depth used to warp the rendered virtual objects 2510, 2512 in the embodiment depicted in FIGS. 25-27 is the farthest depth of any virtual object in the FOV (i.e., the cube 2512). This farthest depth is included in the data corresponding to the rendered virtual objects 2510, 2512. Therefore no depth testing is required. This reduces the computational load of this single depth warp method.

Comparing the warped virtual objects 2510', 2512' in FIG. 26 with the re-rendered virtual objects 2510", 2512" in FIG.

27 (i.e., the next rendered frame without user FOV movement) shows that the warped cube 2512' and the re-rendered cube 2512" are in substantially the same location because the depth used to warp the cube 2512 is the far depth D12 of the cube 2512. On the other hand, the warped chess piece 2510' and the re-rendered chess piece 2510" are in different positions because the depth D12 used to warp the chess piece 2510 is more than the actual near depth D10 of the chess piece 2510. This causes the warped chess piece 2510' to under shift to the right in response to left lateral FOV movement. Accordingly, sequentially displaying the warped virtual objects 2510', 2512' in FIG. 26 followed by the re-rendered virtual objects 2510", 2512" in FIG. 27 causes the rendered chess piece 2510 to appear to move partially to the right, then to move further to the right, disoccluding the cube 2512. This artifact has less effect on the realism of the mixed reality scenario for a typical user compared to the jitter artifact described above and shown in FIGS. 22-24. This may be due to the lack of direction change in the artifact depicted in FIGS. 25-27, which is perceived (if at all) as a lag rather than a jitter or wiggle with a direction change.

While single distance warp using the farthest and the nearest depths of virtual objects in a FOV are both describe above, other depths in the FOV may also be used to warp rendered virtual objects. For example, in some embodiments, the single distance is the average of the distances of the nearest and farthest objects in the FOV. In some embodiments, the single distance is the mean/average of the distances of all objects in the FOV. In some embodiments, the single distance is the median of the distances of all objects in the FOV.

Multiple Discrete Depth Warp

Figure 28:
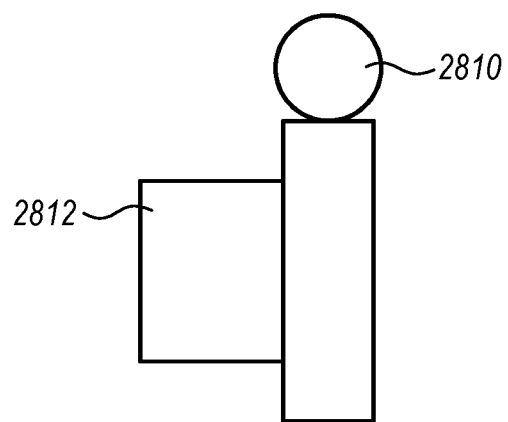
FIGS. 28-31 depict warping two overlapping virtual objects located at different depths using multiple depths to correct for user movement, according to some embodiments.

FIGS. 28-31 depict multiple depth warping according to some embodiments. FIG. 28 depicts the rendered virtual objects, i.e., a chess piece 2810 at a relatively nearer depth and a cube 2812 at a relatively farther depth.

Figure 29A:
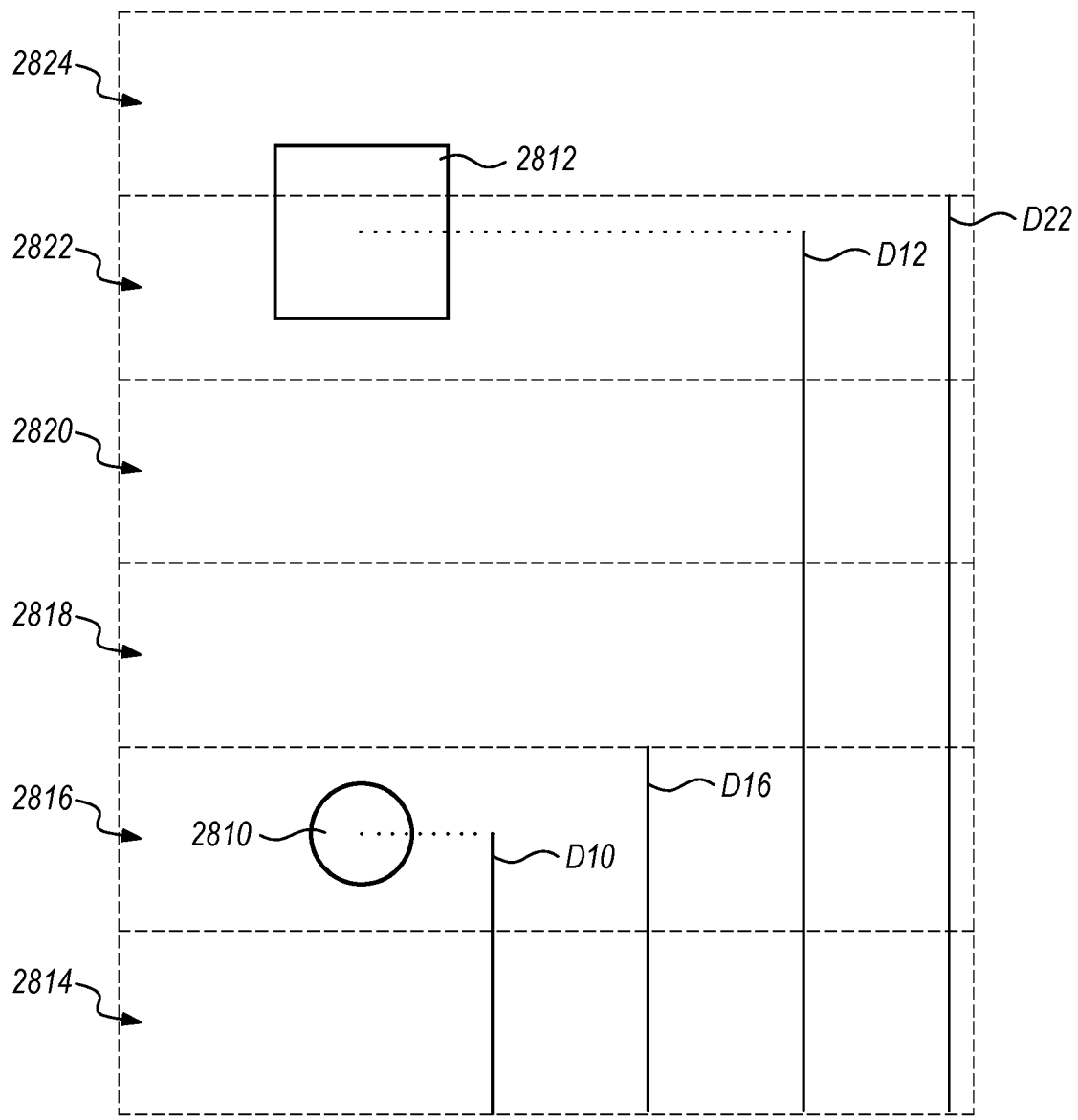

FIG. 29A depicts the rendered virtual objects 2810, 2812 from a top view to show the differences in depth of the rendered virtual objects 2810, 2812. The chess piece 2810 is closer to the viewer at depth D10, and the cube 2812 is farther away from the viewer at depth D12. FIG. 29A also shows six discrete depth slices into which the FOV has been divided 2814, 2816, 2818, 2820, 2822, 2824. In some embodiments, these discrete depth slices 2814, 2816, 2818, 2820, 2822, 2824 correspond to depth slices at which a VR/AR/MR system is configured to display virtual content. The depth slices 2814, 2816, 2818, 2820, 2822, 2824 have limits along an optical axis. For instance, a depth slice according to some embodiments may range from 0.37 m to 1.5 m away from the user's eye. Another depth slice according to some embodiments may include all distances greater than 1.5 m away from the user's eye.

Figure 29B:
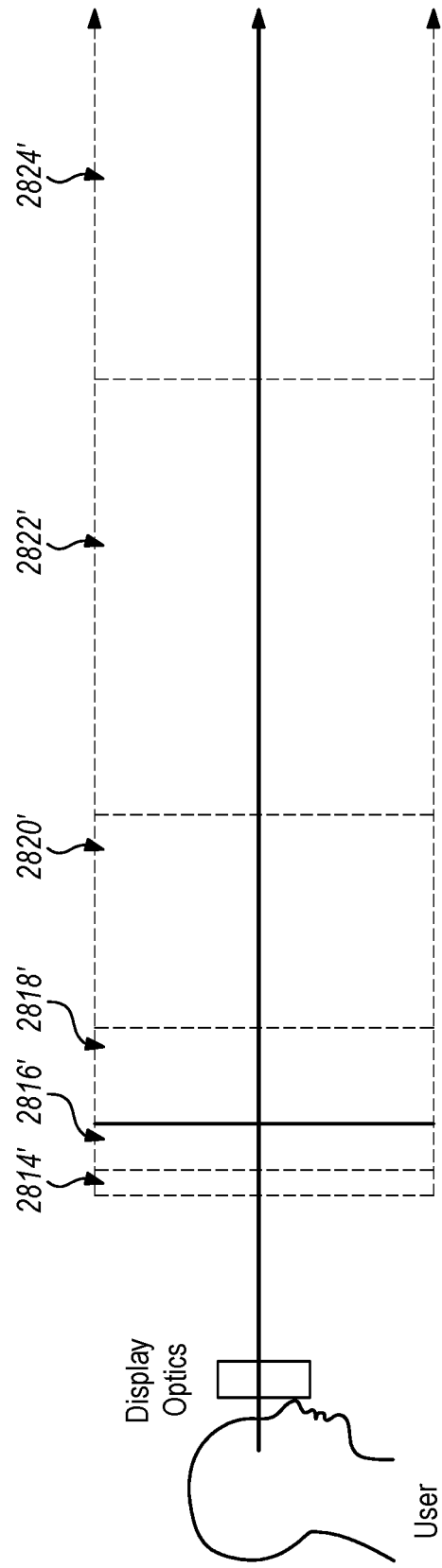

While FIG. 29A depicts six depth slices 2814, 2816, 2818, 2820, 2822, 2824 having similar thicknesses, in other embodiments, depth slices closer to the user's eye have thinner thicknesses because the user is more sensitive to depth differences close to the user. For example, FIG. 29B depicts sixe depth slices 2814', 2816', 2818', 2820', 2822', 2824' according to some other embodiments. In FIG. 29B, each successively farther depth slice (e.g., 2816' vs 2814') has a greater thickness. For instance, objects at 1 m and 2 m may be located in discrete depth slices, but objects at 5 m and 10 m may be located in the same depth slice. In some embodiments, the farthest depth slice 2824' extends to infinity. In various embodiments, the thicknesses of the depth slices can increase linearly or logarithmically (as shown in FIG. 29B).

While FIG. 29A depicts six depth slices 2814, 2816, 2818, 2820, 2822, 2824, in other embodiments, the number of depth slices into which a FOV is divided can correspond to the number of virtual objects in the FOV. For instance, if there are three virtual objects in a FOV, the FOV will be divided into three depth slices. While FIGS. 29A and 29B include six depth slices, in other embodiments, the number of depth slices can be greater than or less than six depending on the virtual scenario and available system resources.

Figure 30:
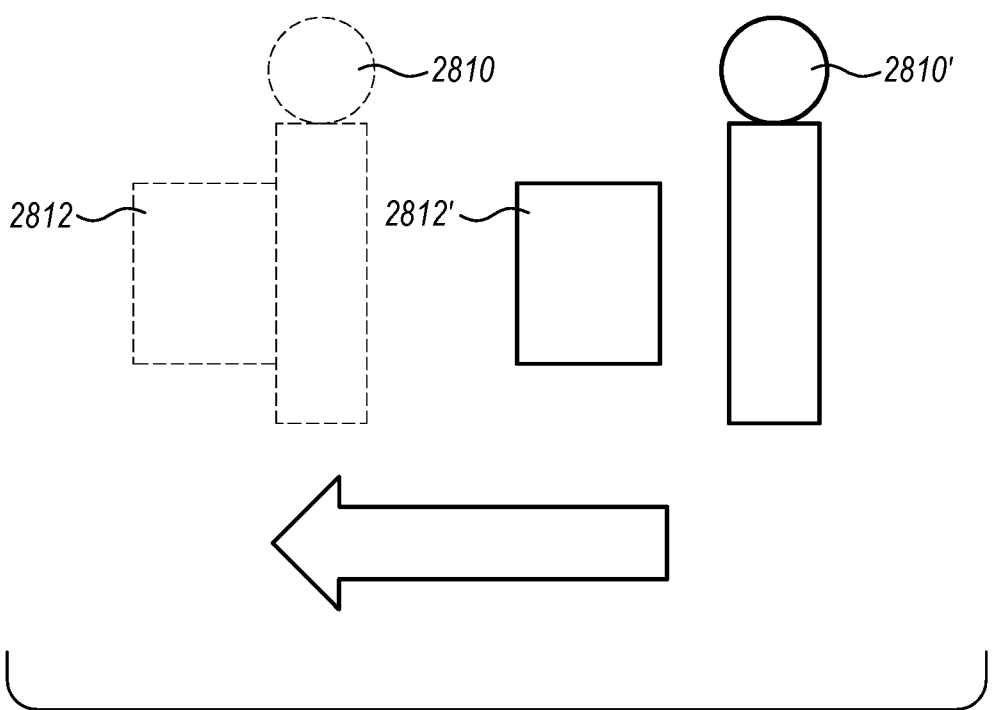

FIG. 30 depicts warping the rendered virtual objects 2810, 2812 (in FIG. 29A) using a different depth for each rendered virtual object 2810, 2812 to more accurately position the warped virtual objects 2810', 2812'. In some embodiments, the distance used to warp the relatively nearer chess piece 2810 is the far distance ("far clip") D16 of the depth slice 2816 containing the chess piece 2810. The distance used to warp the relatively further cube 2812 is the far clip D22 of the depth slice 2822 containing most of the cube 2812. In other embodiments, the distance used to warp and object may be the middle distance or any other distance of the depth slice containing all or most or some of the virtual object.

Figure 31:
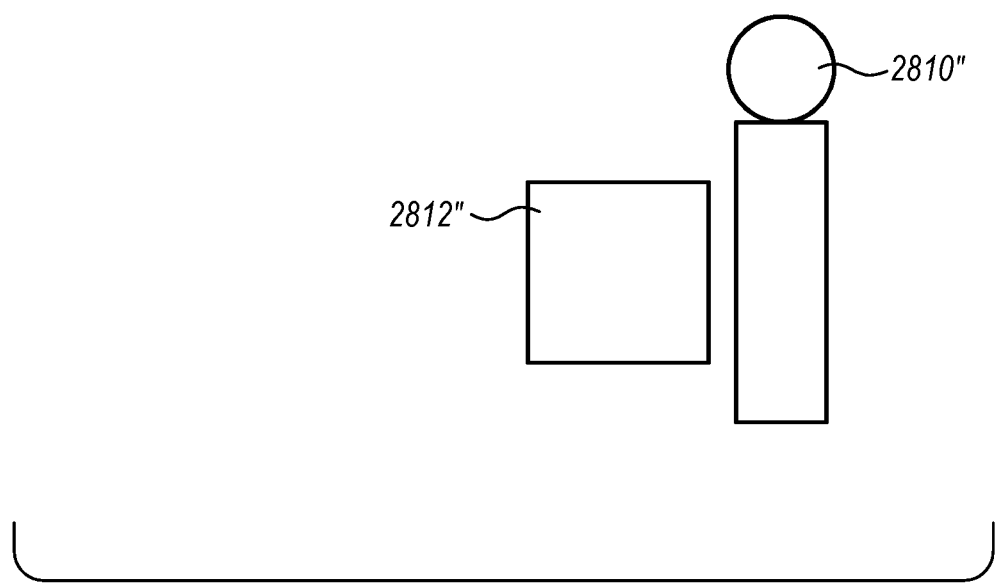

Comparing the warped virtual objects 2810', 2812' in FIG. 30 with the re-rendered virtual objects 2810", 2812" in FIG. 31 (i.e., the next rendered frame without user FOV movement) shows that the multiple discrete depth warp depicted in FIGS. 28-31, while it reduces computational load compared to full positional warping, is still susceptible to disocclusion artifacts.

While the virtual objects 2810, 2812 shown in FIG. 29A are separated by several depth slices, in other embodiments, virtual objects may be separated by distances so small that they can be warped together with minimal warping artifacts. For instance, in some embodiments, objects that are less than 0.1 m apart from each other (e.g., 1.5 m vs 1.6 m) do not trigger multiple depth warping. In other embodiments, the threshold for multiple depth warping can be measured in diopters (e.g., only for objects more than 1 diopter apart).

Single Depth Warp Based on Eye Tracking

Figure 32:
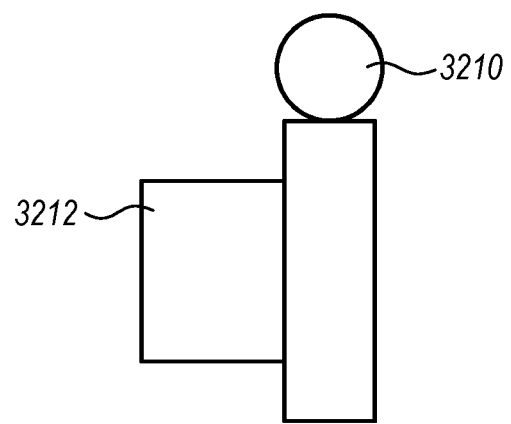
FIGS. 32-38 depict warping two overlapping virtual objects located at different depths using eye tracking to correct for user movement, according to some embodiments.

FIGS. 32-38 depict single depth warping based on eye tracking according to some embodiments. FIG. 32 depicts the rendered virtual objects, i.e., a chess piece 3210 at a relatively nearer depth and a cube 3212 at a relatively farther depth.

Figure 33:
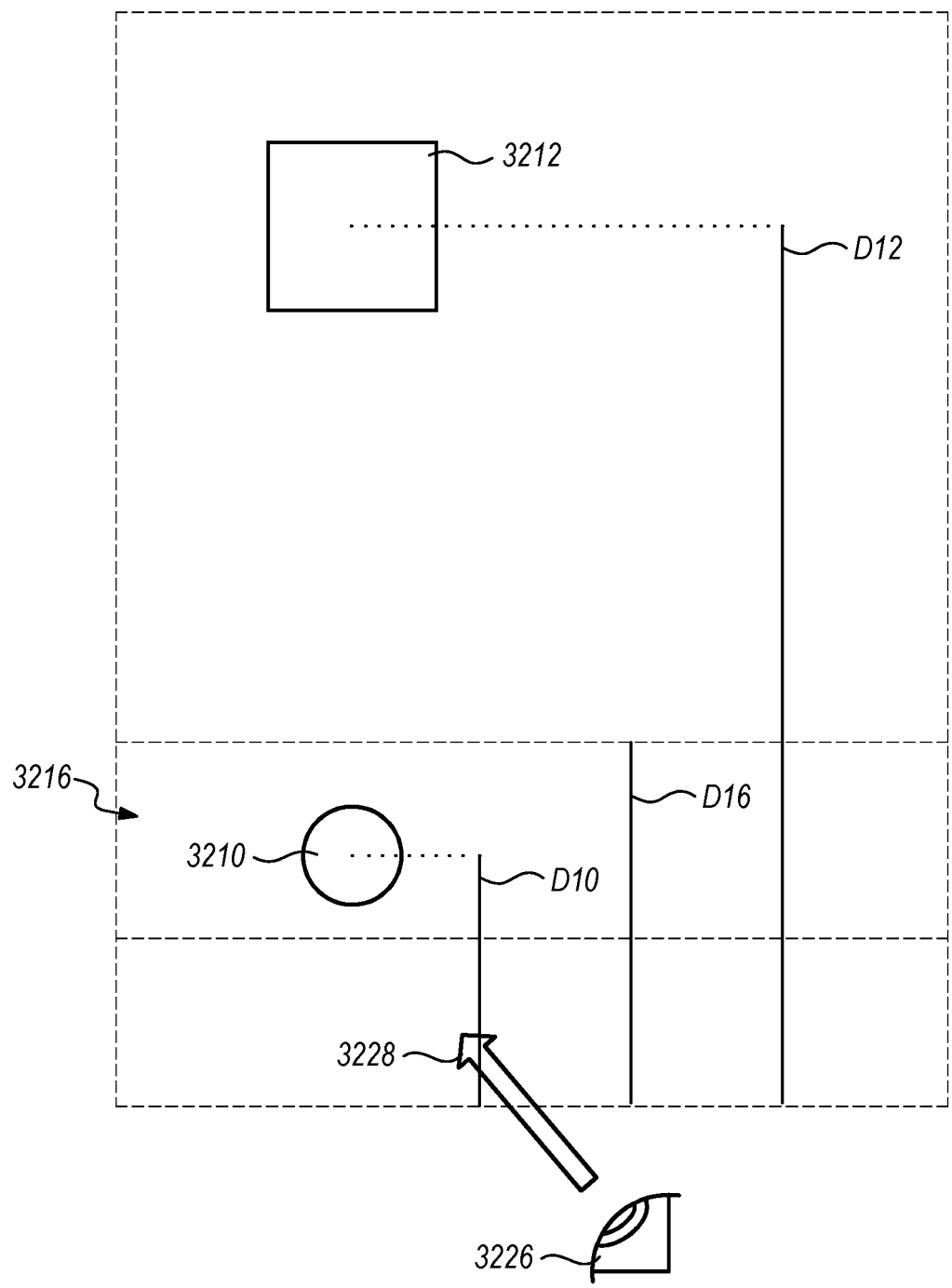

FIG. 33 depicts the rendered virtual objects 3210, 3212 from a top view to show the differences in depth of the rendered virtual objects 3210, 3212. The chess piece 3210 is closer to the viewer at depth D10, and the cube 3212 is farther away from the viewer at depth D12. FIG. 33 also shows that an eye 3226 of the user is tracking to a direction 3228 that coincides with a location of the chess piece 3210. The direction of the user's eye 3226 can be tracked, for example, using sensors/camera on an AR system 200.

Figure 34:
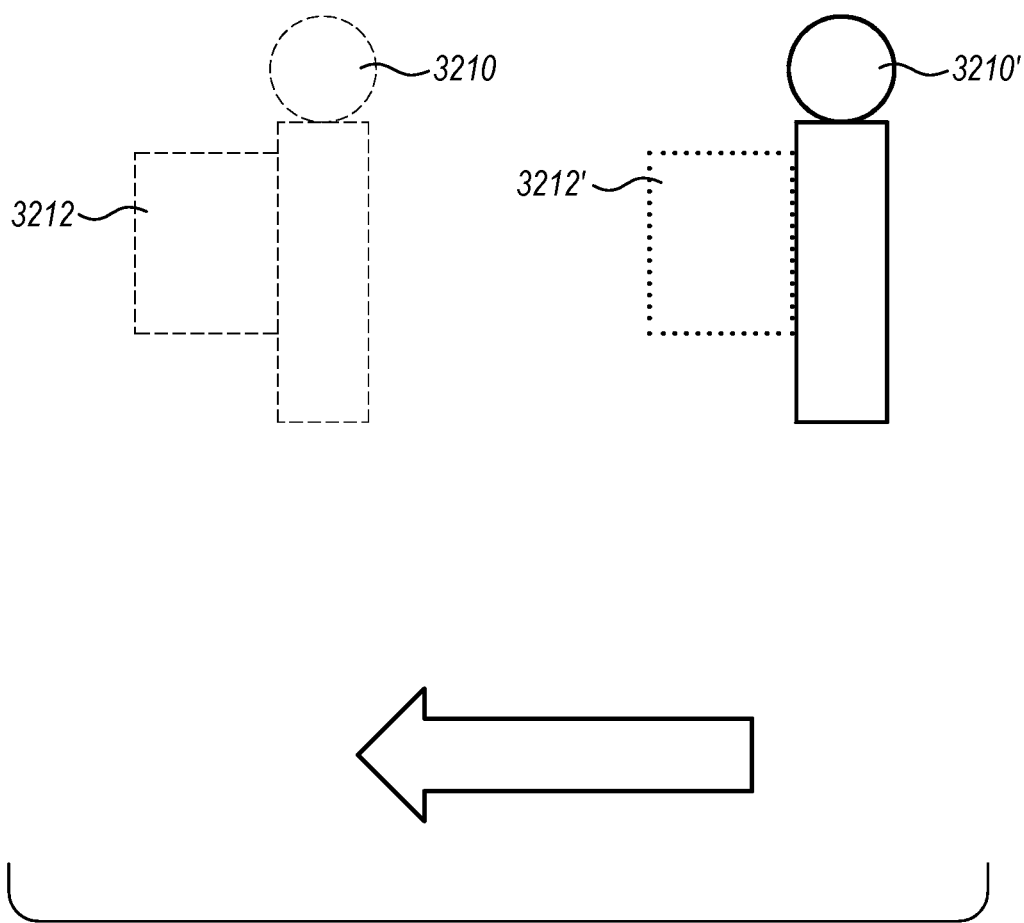

Because the direction 3228 of the user's eye 3226 has been tracked to the chess piece 3210, the depth used to warp both rendered virtual objects 3210, 3212 is the far clip D16 of the depth slice 3216 containing the chess piece 3210. The result of this warp is shown in FIG. 34, where the warped virtual objects 3210', 3212' are generated using a depth D16 more similar to the depth D10 of the closer chess piece 3210 than the depth D12 of the farther cube 3212.

Figure 35:
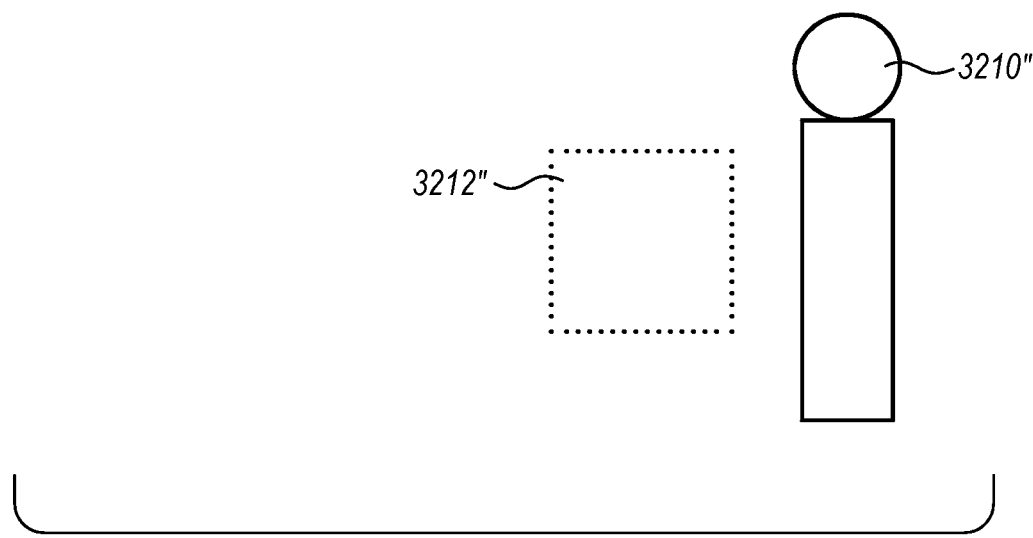

As explained above, the warped chess piece 3210' in FIG. 34 and the re-rendered chess piece 3210" in FIG. 35 (i.e., the next rendered frame without user FOV movement) are in substantially the same location because the depth D16 used to warp the chess piece 3210 approximates the depth D10 of the chess piece 3210. On the other hand, the warped cube 3212' and re-rendered cube 3212" are in different positions because the depth D16 used to warp the cube 3212 is less than the actual far depth D12 of the cube 3212. This causes the warped cube 3212' to overly shift to the right in response to left lateral FOV movement. Accordingly, sequentially displaying the warped virtual objects 3210', 3212' in FIG. 34 followed by the re-rendered virtual objects 3210", 3212" in FIG. 35 causes the rendered cube 3212 to appear to move to the right, then snap back to the left, resulting in the jitter artifact.

However, these embodiments use the depth D16 as the single depth for warping all rendered virtual content because the system has tracked the direction 3228 of the user's eye 3226 to the nearer object (i.e., the chess piece 3210). Accordingly, while the warped cube 3212' and the re-rendered cube 3212" are displayed, the user's focus is away from the cube 3212. The warped cube 3212' and the re-rendered cube 3212" are shown in broken lines in FIGS. 34 and 35 to indicate that the user's focus is away from the cube 3212. Consequently, even though the warp depicted in FIG. 34 includes a jitter artifact, the effect of that artifact is minimized by the user's focus being away from the cube 3212. The user's focus being directed away from the cube 3212 is depicted in FIGS. 34 and 35 by rendering the warped and re-rendered cubes 3212', 3212" using dotted lines. On the other hand, the user's focus is directed to the chess piece 3210, which is more accurately warped into the warped chess piece 3210'.

Figure 36:
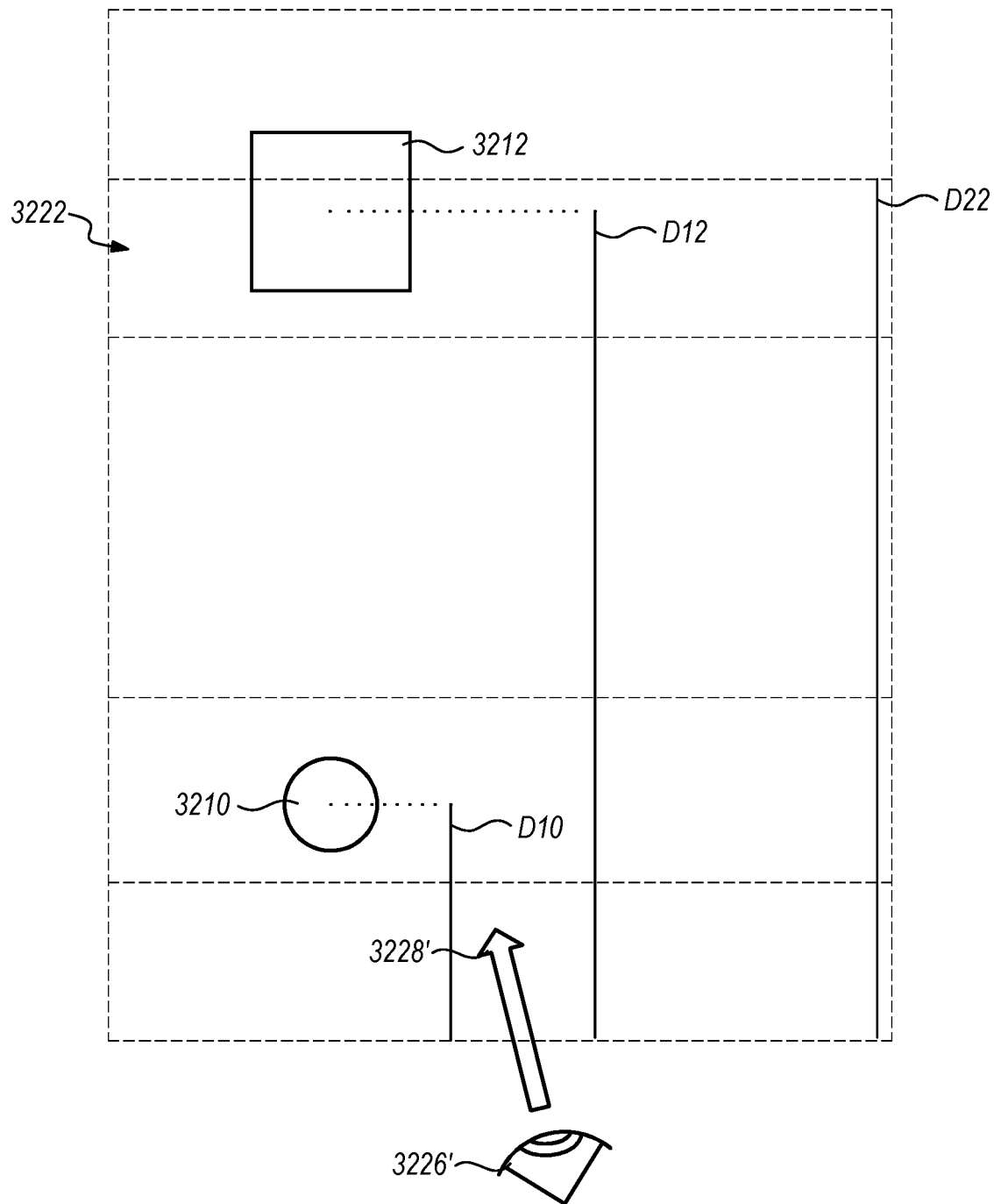

FIG. 36 depicts the rendered virtual objects 3210, 3212 from a top view similar to FIG. 33. FIG. 36 also shows that an eye 3226' of the user is tracking to a direction 3228' that coincides with a location of the cube 3212.

Figure 37:
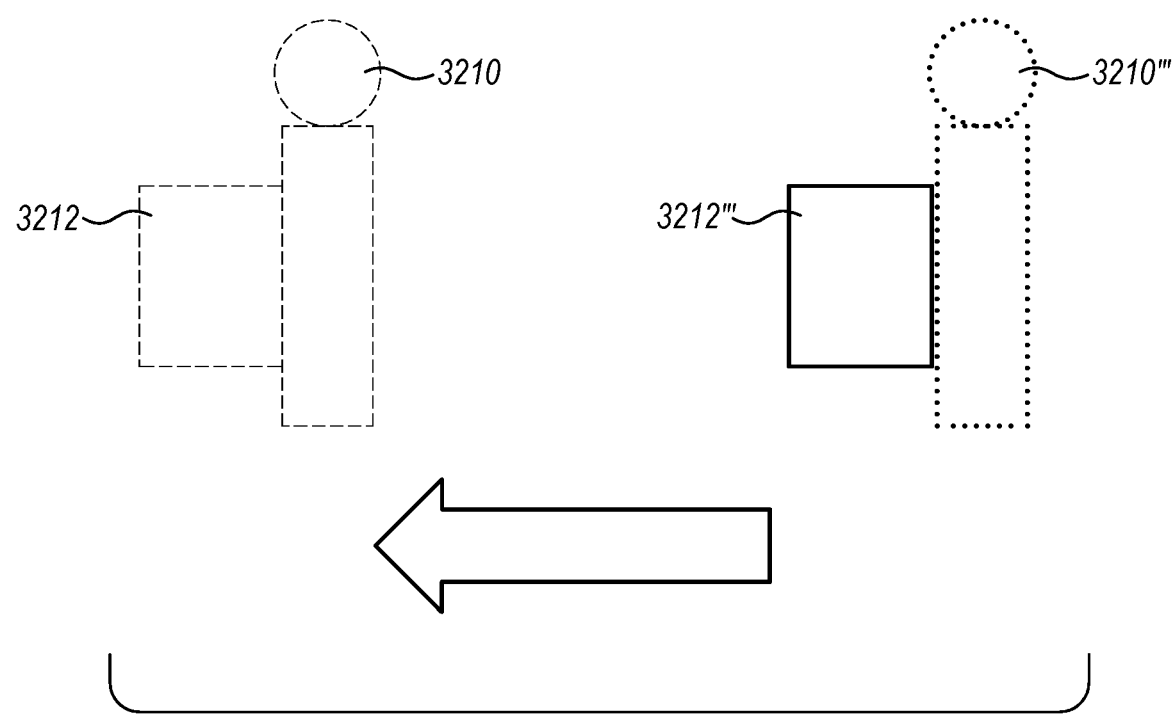

Because the direction 3228' of the user's eye 3226' has been tracked to the cube 3212, the depth used to warp both rendered virtual objects 3210, 3212 is the far clip D22 of the depth slice 3222 containing the majority of the cube 3212. The result of this warp is shown in FIG. 37, where the warped virtual objects 3210''', 3212''' are generated using a depth D22 more similar to the depth D12 of the cube 3212 then the depth D10 of the chess piece 3210.

Figure 38:
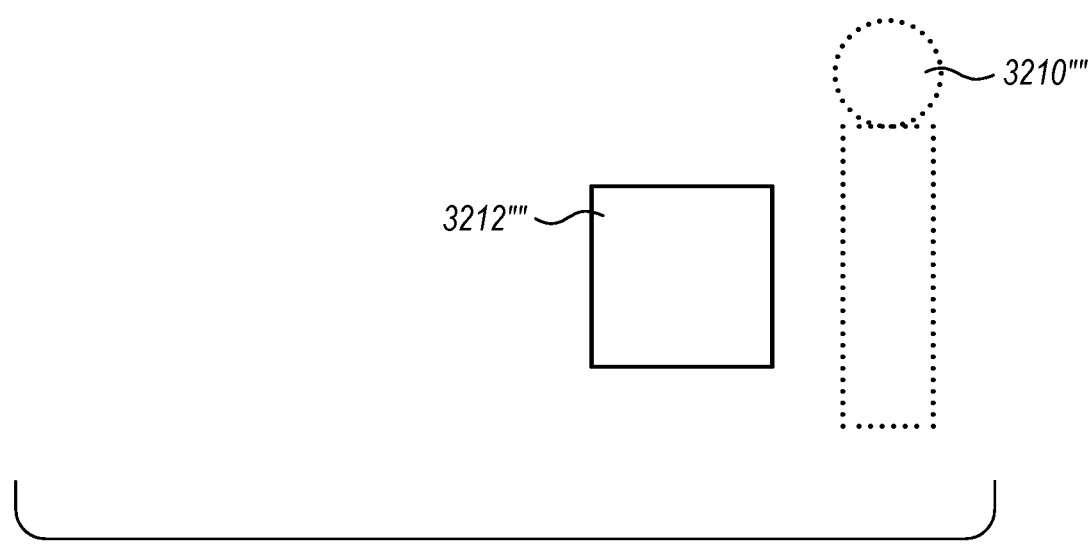

As explained above, the warped cube 3212''' in FIG. 37 and the re-rendered cube 3212'''' in FIG. 38 (i.e., the next rendered frame without user FOV movement) are in substantially the same location because the depth D22 used to warp the cube 3212 approximates the far depth D12 of the cube 3212. On the other hand, the warped chess piece 3210''' and re-rendered chess piece 3210'''' are in different positions because the depth D16 used to warp the chess piece 3210 is less than the actual near depth D10 of the chess piece 3210. This causes the warped chess piece 3210''' to under shift to the right in response to left lateral FOV movement. Accordingly, sequentially displaying the warped virtual objects 3210''', 3212''' in FIG. 37 followed by the re-rendered virtual objects 3210'''', 3212'''' in FIG. 38 causes the rendered chess piece 3210 to appear to move partially to the right, then to move further to the right, disoccluding the cube 3212, resulting in the lag artifact.

However, these embodiments use the depth D22 as the single depth for warping all rendered virtual content because the system has tracked the direction 3228' of the user's eye 3226' to the farther object (i.e., the cube 3212). Accordingly, while the warped chess piece 3210''' and the re-rendered chess piece 3210'''' are displayed, the user's focus is away from the chess piece 3210. The warped chess piece 3210''' and the re-rendered chess piece 3210'''' are shown in broken lines in FIGS. 36 and 37 to indicate that the user's focus is away from the chess piece 3210. Consequently, even though the warp depicted in FIG. 36 includes a lag artifact, the effect of that artifact is minimized by the user's focus away from the chess piece 3210. The user's focus being directed away from the chess piece 3210 is depicted in FIGS. 37 and 38 by rendering the warped and re-rendered chess pieces 3210', 3210" using dotted lines. On the other hand, the user's focus is directed to the cube 3212, which is more accurately warped into the warped cube 3212'''.

While single depth warp using the far clip of a depth slice including a virtual object to which a user's eye has been tracked is described above, the single depth based on eye tracking can be other depths associated with a virtual object. These include the near distance ("near clip") of the depth slice including the virtual object, or any distance between the near and far clips.

Mesh Based Warp

Figure 39:
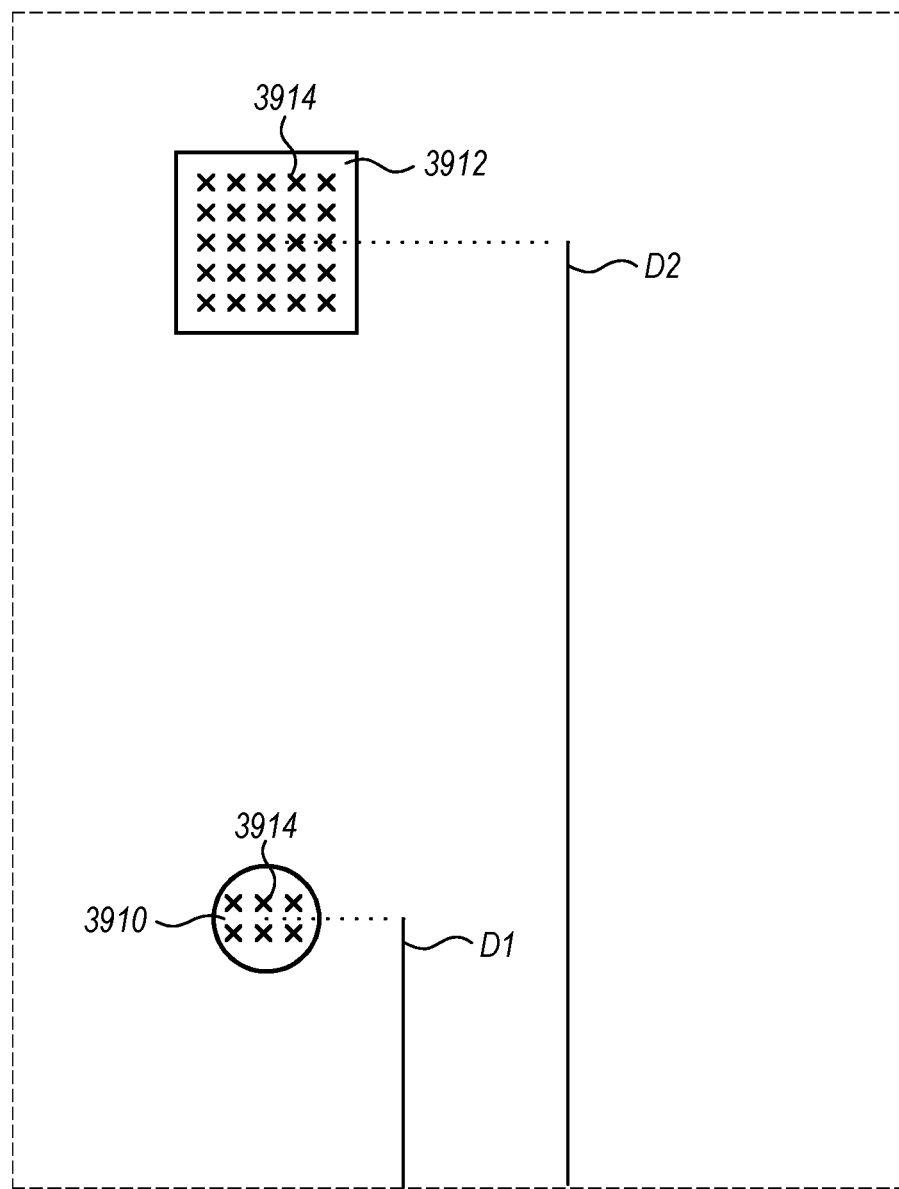
FIGS. 39-45 depict warping two overlapping virtual objects located at different depths using meshes to correct for user movement, according to some embodiments.

FIGS. 39-45 depict warping using meshes of virtual content, for example, to reduce the computational load, according to some embodiments. FIG. 39 schematically depicts the rendered virtual objects 3910, 3912 from a top view to show the differences in depth of the rendered virtual objects 3910, 3912. The chess piece 3910 is closer to the viewer at depth D1, and the cube 3912 is farther away from the viewer at depth D2. FIG. 39 also shows that each of the rendered virtual objects 3910, 3912 includes one or more pixels 3914 (see pixels 1116 of primitive triangle 1100 in FIG. 11). The rendered virtual objects 3910, 3912 may also include one or more primitives. Warping each pixel 3914 of each rendered virtual objects 3910, 3912 may be computationally expensive.

Figure 40:
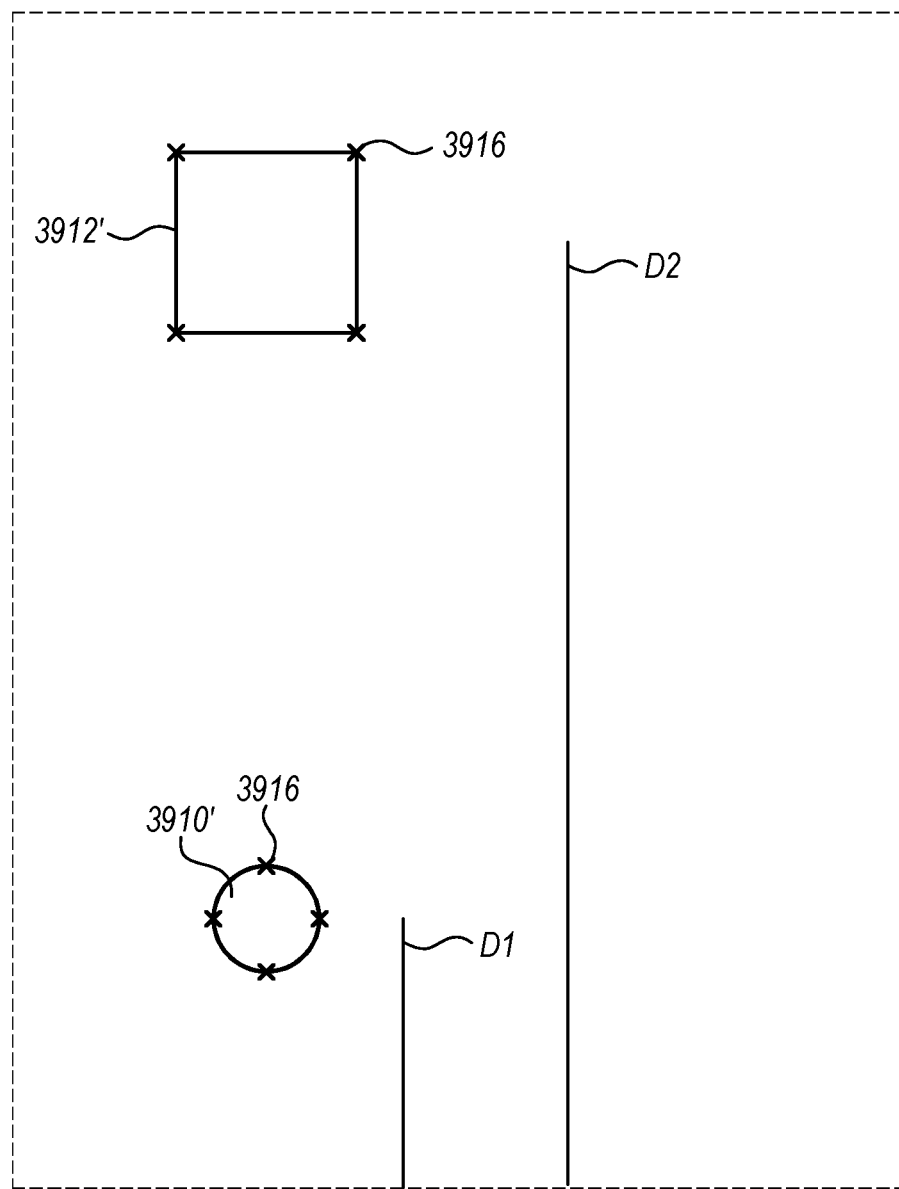
Figure 41:
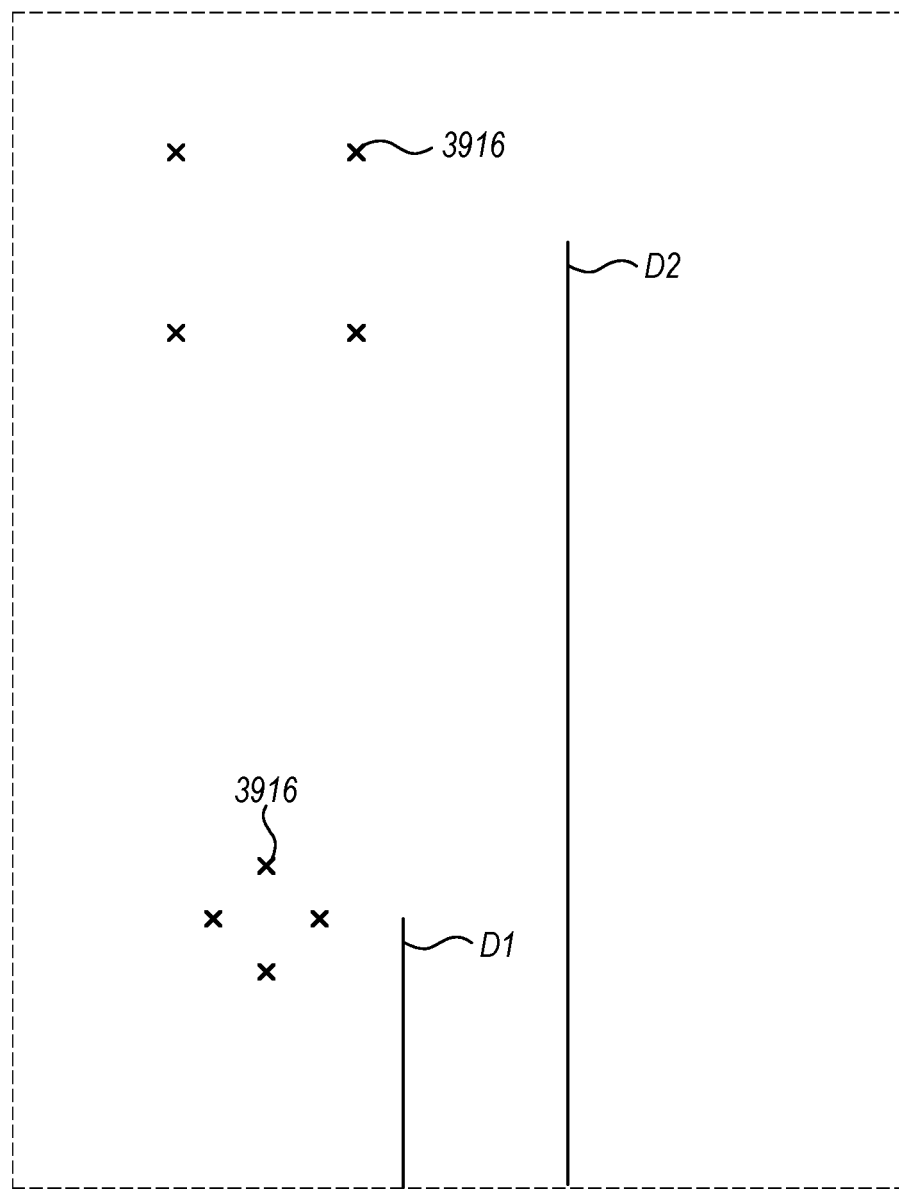
Figure 42:
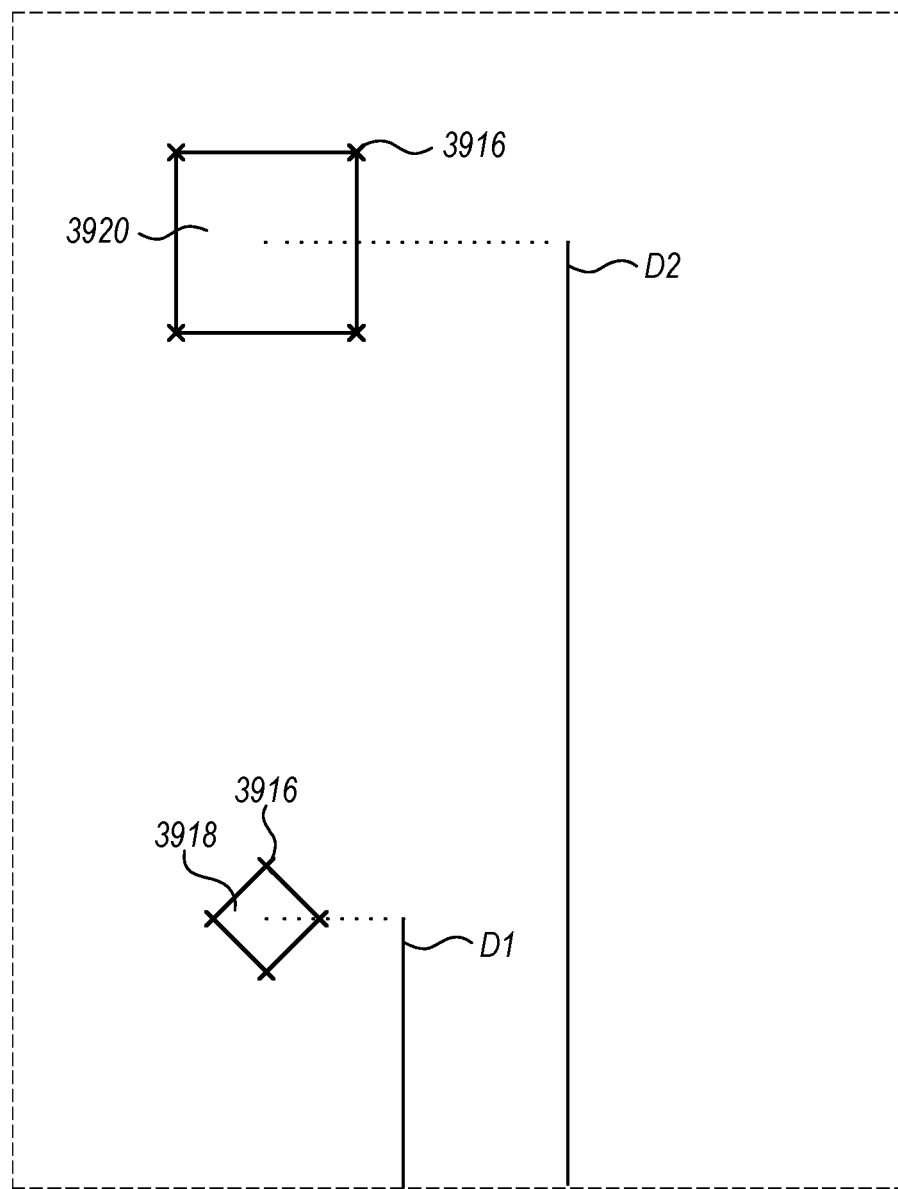

FIG. 40 schematically depicts meshes 3910', 3912' formed from and approximating the rendered virtual objects 3910, 3912 (see FIG. 39). The meshes 3910', 3912' do not include individual pixels 3914, which may reduce computational complexity for warping. The meshes can be formed from the rendered virtual objects 3910, 3912 using a grid. Further, the meshes 3910', 3912' include vertices 3916 that approximate the meshes 3910', 3912', which may further reduce computational complexity for warping, as shown in FIG. 41. The meshes 3910', 3912' can be reconstructed from the vertices 3916 and the virtual objects 3910, 3912 can be reconstructed from the meshes 3910', 3912'. However, the simplification and reconstruction process may introduce artifacts into the reconstructed virtual objects 3918, 3920, as shown in FIG. 42.

Figure 43:
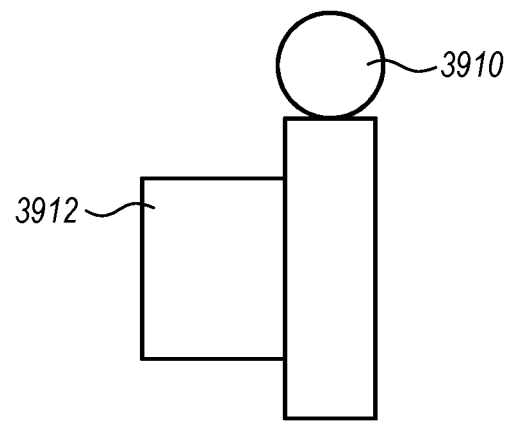
Figure 44:
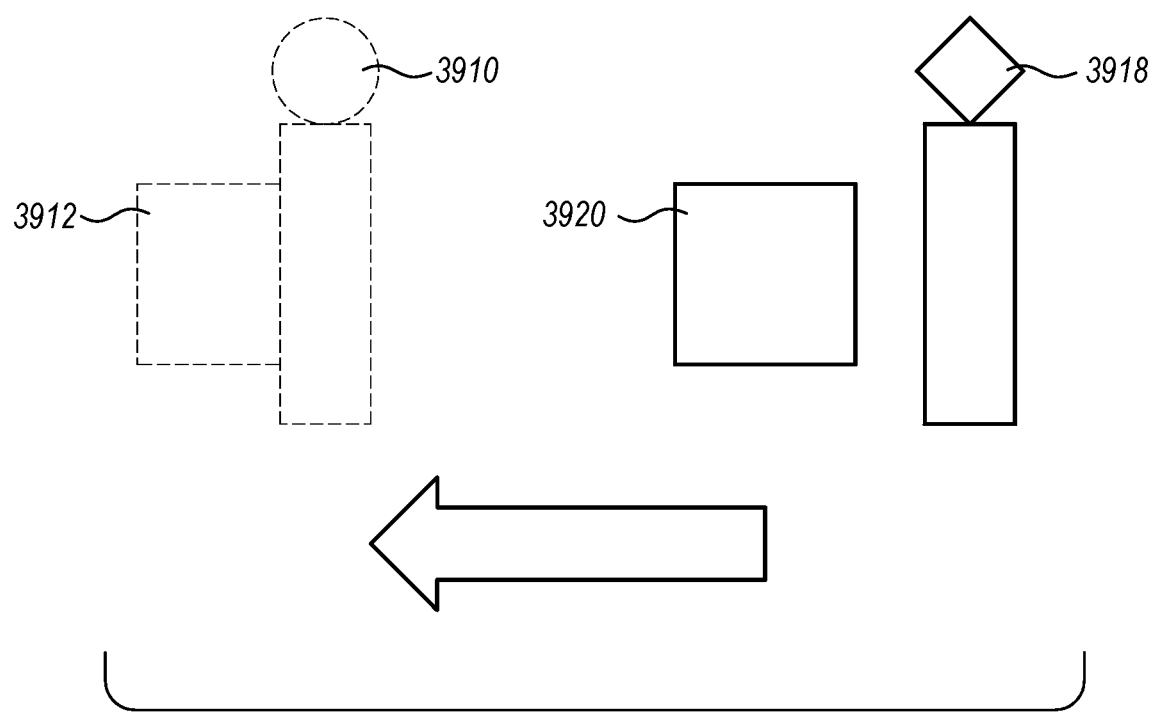
Figure 45:
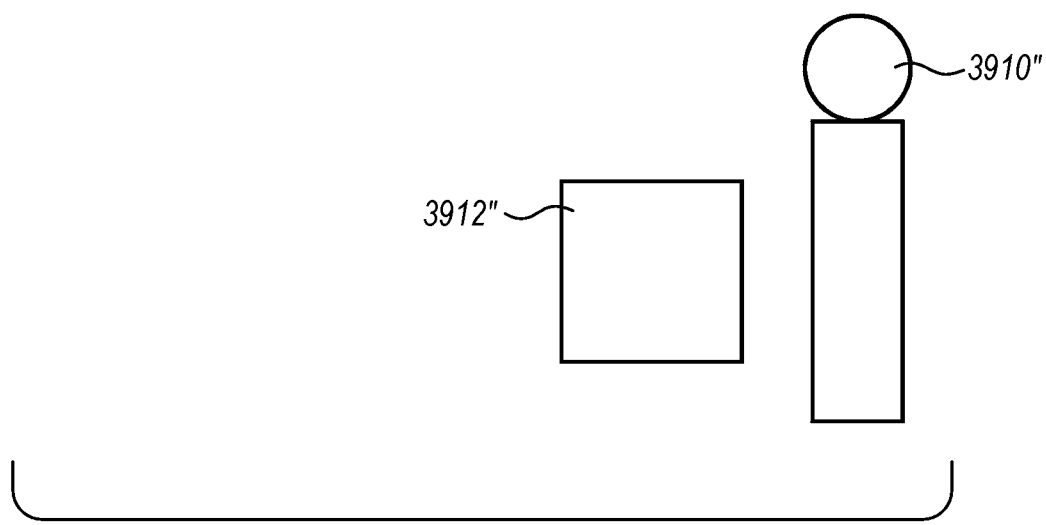

FIG. 43 depicts the rendered virtual objects, i.e., a chess piece 3910 at a relatively nearer depth and a cube 3912 at a relatively farther depth. FIG. 44 depicts the results of a mesh based warp (i.e., reconstructed chess piece 3918 and reconstructed cube 3920), and FIG. 45 depicts the next frame of re-rendered virtual objects (i.e., re-rendered chess piece 3910" and re-rendered cube 3912" without user FOV movement). Because of the simplification of the rendered virtual objects 3910, 3912 into meshes 3910', 3912' and/or vertices 3916, the simplified virtual objects can be warped using positional warping techniques without undue computational load. While the regularly shaped cube is similar in both FIGS. 44 and 45, the less regularly shaped chess piece has some reconstruction artifacts in FIG. 44. The size of the meshes can be adjusted to optimize reconstruction artifacts while minimizing computational load.

While various warping techniques have been described individually, these techniques can be combined with each other to improve warp effectiveness without departing from the scope and spirit of the disclosure.

System Architecture Overview

Figure 46:
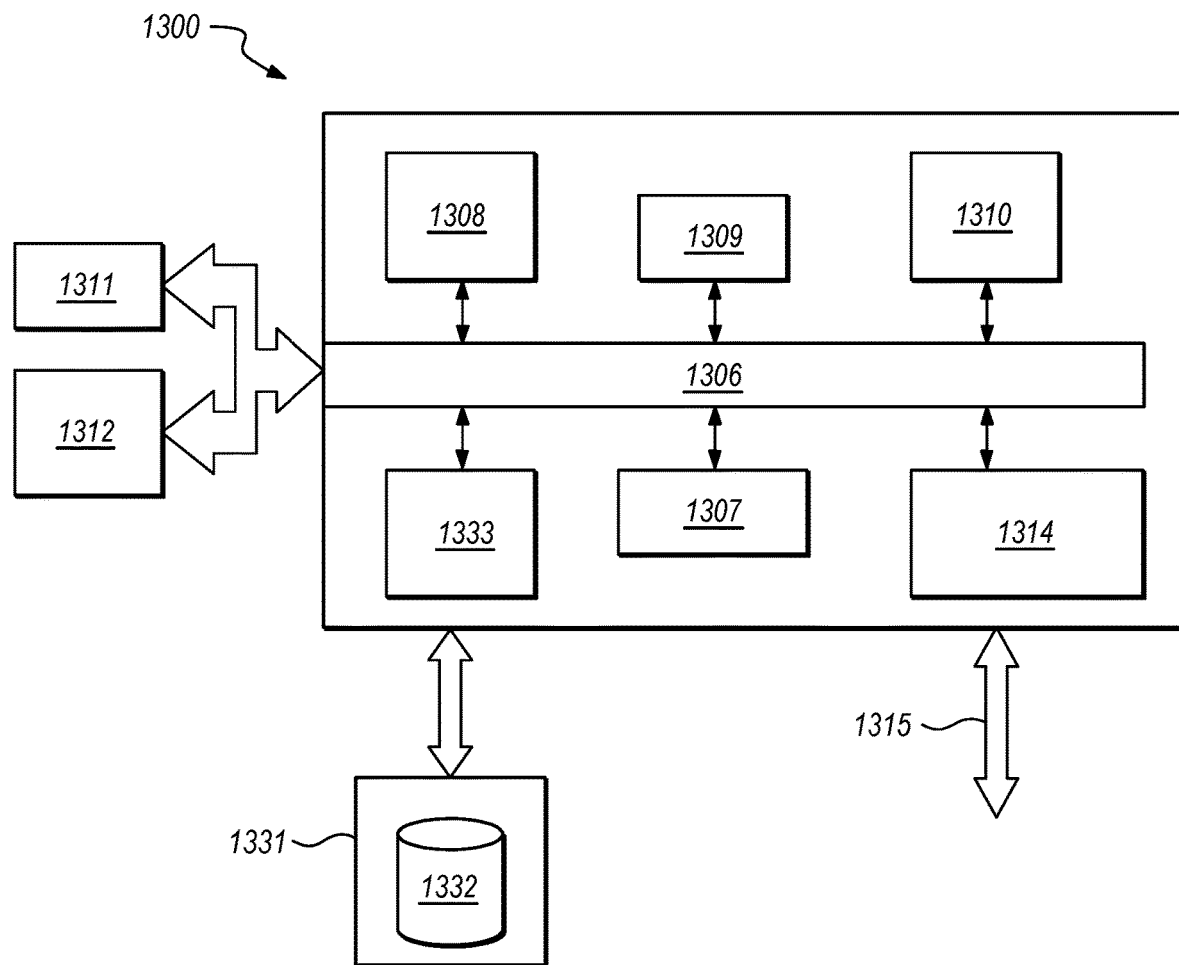
FIG. 46 is a block diagram schematically depicting an illustrative computing system, according to some embodiments.

FIG. 46 is a block diagram of an illustrative computing system 1300 suitable for implementing an embodiment of the present disclosure. Computer system 1300 includes a bus 1306 or other communication mechanism for communicating information, which interconnects subsystems and devices, such as processor 1307, system memory 1308 (e.g., RAM), static storage device 1309 (e.g., ROM), disk drive 1310 (e.g., magnetic or optical), communication interface 1314 (e.g., modem or Ethernet card), display 1311 (e.g., CRT or LCD), input device 1312 (e.g., keyboard), and cursor control.

According to one embodiment of the disclosure, computer system 1300 performs specific operations by processor 1307 executing one or more sequences of one or more instructions contained in system memory 1308. Such instructions may be read into system memory 1308 from another computer readable/usable medium, such as static storage device 1309 or disk drive 1310. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 1307 for execution. Such a medium may take many forms, including but not limited to, non-volatile media and volatile media. Non-volatile media includes, for example, optical or magnetic disks, such as disk drive 1310. Volatile media includes dynamic memory, such as system memory 1308.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM (e.g., NAND flash, NOR flash), any other memory chip or cartridge, or any other medium from which a computer can read.

In an embodiment of the disclosure, execution of the sequences of instructions to practice the disclosure is performed by a single computer system 1300. According to other embodiments of the disclosure, two or more computer systems 1300 coupled by communication link 1315 (e.g., LAN, PTSN, or wireless network) may perform the sequence of instructions required to practice the disclosure in coordination with one another.

Computer system 1300 may transmit and receive messages, data, and instructions, including program, i.e., application code, through communication link 1315 and communication interface 1314. Received program code may be executed by processor 1307 as it is received, and/or stored in disk drive 1310, or other non-volatile storage for later execution. Database 1332 in storage medium 1331 may be used to store data accessible by system 1300 via data interface 1333.

Virtual Object Depth Determination

The depth of a virtual object is needed to accurately warp that virtual object. However, in some embodiments, the depth of virtual objects are not known. For instance, some applications only provide a stereo pair of images for a virtual object (e.g., for projection) and not the virtual object's depth. In order to accurately warp such virtual objects, a method is needed to determine the depth of such virtual objects while minimizing demands on system resources.

FIGS. 47 to 53 depict a method for determining/estimating the depth of a virtual object from a stereo pair of images for that virtual object. This method assumes that the first member of the stereo pair (e.g., left or right eye) is a perfect warp for the other member of the stereo pair (e.g., right or left eye) because the application rendered both members of the stereo pair using the appropriate point of view (POV). In general, the method identifies one member of the stereo pair (e.g., right eye) as the "reference eye," and warps/re-projects the second member of the stereo pair (e.g., left eye) to the POV of the first member at one or more depths. Then the method compares the re-projected second member to the first member to determine a re-projection error at each of the one or more depths. The depth with the minimum re-projection error is then identified as the determined/estimated depth of the virtual object.

Figure 53:
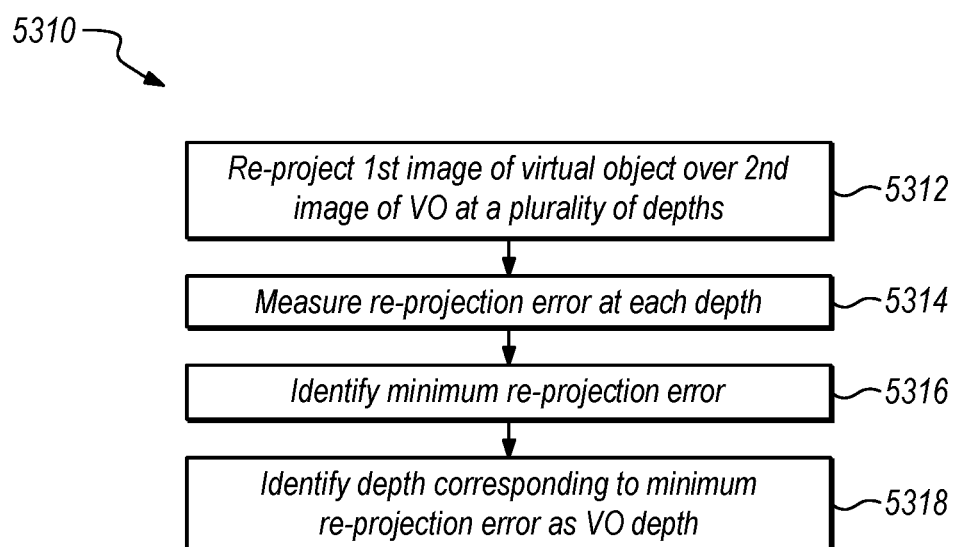
FIG. 53 is a flowchart illustrating a method for determining a depth of a virtual object from a stereo image pair of the virtual object, according to some embodiments.

FIG. 53 is a flowchart illustrating the method 5310. At step 5312, a system (e.g., a VR/AR/MR system) re-projects a first image of a stereo pair of a virtual object over a second image of the stereo pair of the virtual object at one or more depths to generate one or more combination images.

Figure 50:
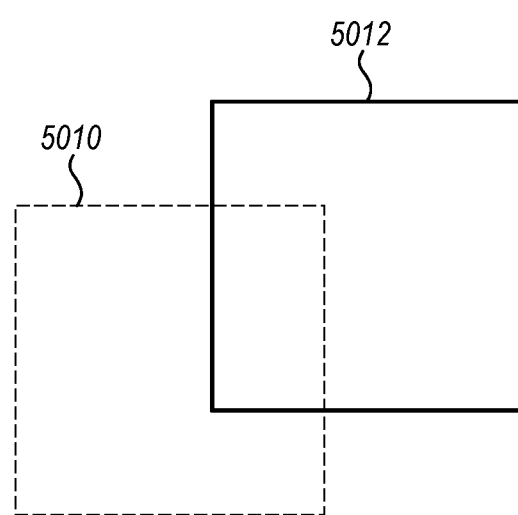
FIGS. 50 to 52 show various combination images generated by a method for determining a depth of a virtual object from a stereo image pair of the virtual object, according to some embodiments.
Figure 51:
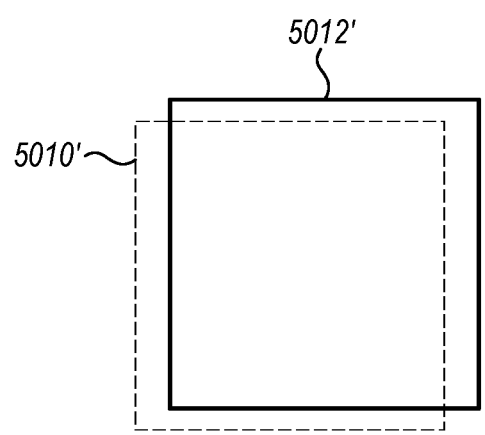
Figure 52:
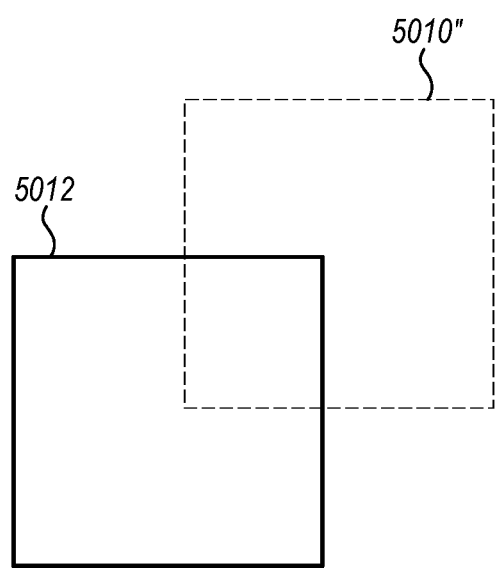

Exemplary combination images are shown in FIGS. 50 to 52. In those figures, the reference second image 5012 remained stationary and the test first image is re-projected 5110, 5110', 5110" at different depths over the reference second image 5112. Because of the different depths used to re-project the test first image, the re-projected first test images 5110, 5110', 5110" are in different positions relative to the reference second image 5012.

The number of depths used in this method may be determined by the lesser of (1) the maximum number of depths the system can evaluate in real-time and (2) the maximum disparity in pixels between the eyes of a viewer. In other words, even if the system is capable of evaluating 100 different depths in real-time, if the maximum distance parity in pixels between the eyes of a user corresponds to 50 different depths, 50 different depths will be used in the method to identify the depth of a virtual object. In some embodiments, 64 different depths are used in the method. The maximum disparity in pixels between the eyes of the user may be a function of the interpupillary distance, the focal length, and/or the near depth plane. In some embodiments, each depth plane is evenly space such that the corresponding re-projected first test image shifts by approximately 1 pixel intervals.

Referring to FIG. 53, at step 5314 the system measures a re-projection error at each depth. Re-projection errors occur when the depth plane used to re-project the first test image is a sub optimal mismatch to the depth of the virtual object (e.g., in the reference second image). The system quantitates the re-projection error at each depth.

At step 5316, the system analyzes the one or more re-projection errors corresponding to the one or more depths to identify a minimum re-projection error. The depth with the minimum re-projection error is then identified as the determined/estimated depth of the virtual object in step 5318.

In order to perform these analyses in real-time, the system may divide the series of evaluations at each of the one or more depth planes into multiple frames (e.g., approximately 10 frames). The analyses may also be performed on a down sampled version of the image frame (e.g., at 25% of each dimension) to reduce the computational load. The method 5300 may be repeated a number of times to improve the accuracy of the method.

Figure 47:
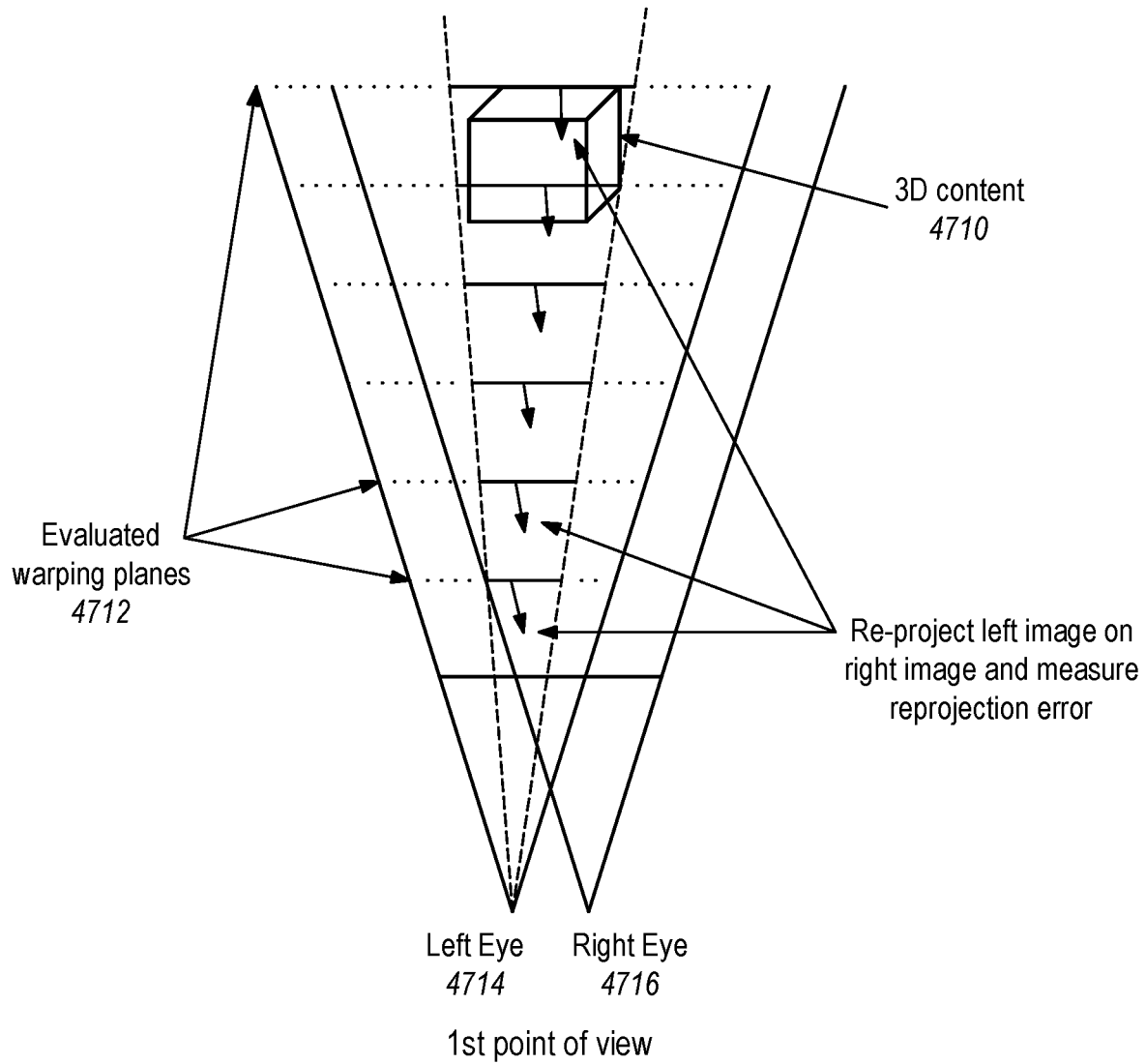
FIGS. 47 to 49 schematically depict a method for determining a depth of a virtual object from a stereo image pair of the virtual object, according to some embodiments.
Figure 48:
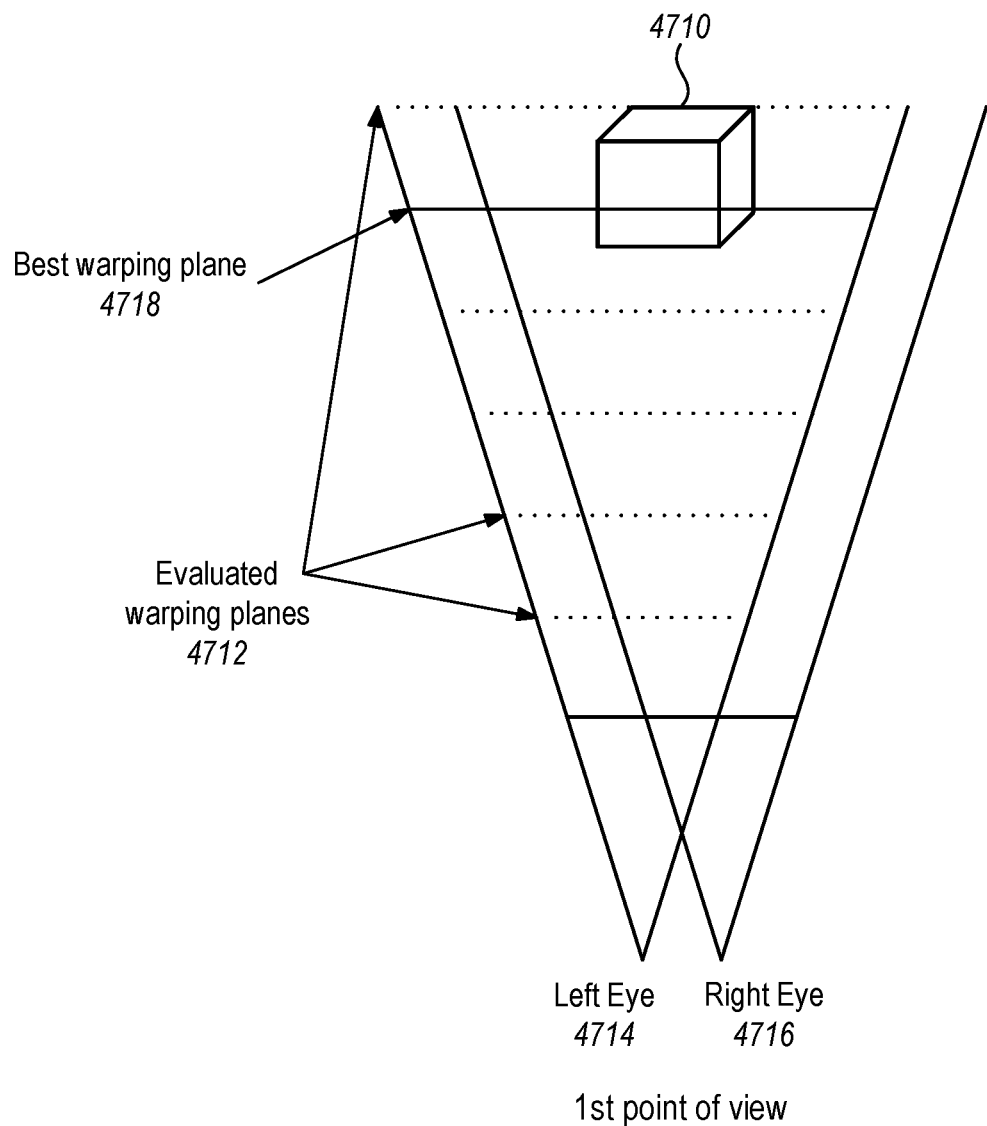
Figure 49:
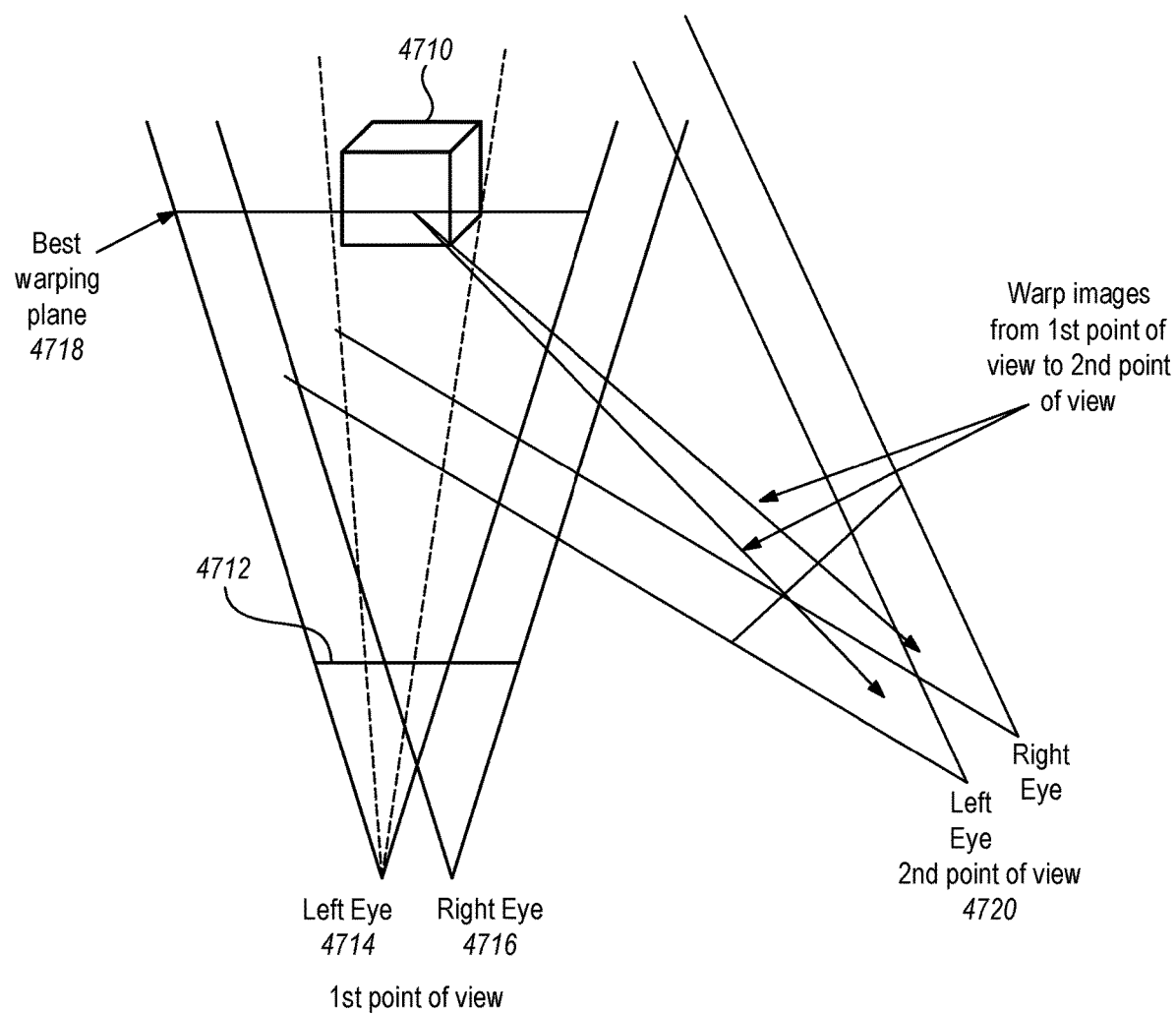

FIGS. 47 to 49 schematically depicts the method 5300 described above. FIG. 47 shows that a 3D virtual object 4710 is re-projected from the left eye 4714 to the right eye 4716 at one or more depth planes 4712. FIG. 48 shows that the method identifies a best warping plane 4718 (e.g., combination image with the minimum re-projection error) that corresponds with the depth of the virtual object 4710. FIG. 49 shows that the best warping plane 4718 and its determined/estimated depth may be used by the system to more accurately warp the stereo pair of images 4714, 4716 to a new POV 4720 (e.g., resulting from your movement).

Stabilization Plane Depth Determination

For any given amount of POV movement, as a virtual object's approaches infinity, the apparent movement of the virtual object with the POV movement approaches zero. The "stabilization plane" is defined as the depth (approaching infinity) at which the apparent movement of a virtual object with a particular POV movement approaches zero to such a degree that the apparent movement becomes unnoticeable/un-perceivable to a system viewer. For instance, system limitations in terms of display, processing, speed, etc. may render small amounts of movement (e.g., one or two pixels) unnoticeable/un-perceivable to a typical user. Identifying the depth of the stabilization plane with a particular POV movement allows the system to forgo warping of virtual objects farther than the stabilization plane with POV movements less than the particular POV movement. This optimization reduces system demands in terms of processing, memory, communications channels, etc.

Figure 54:
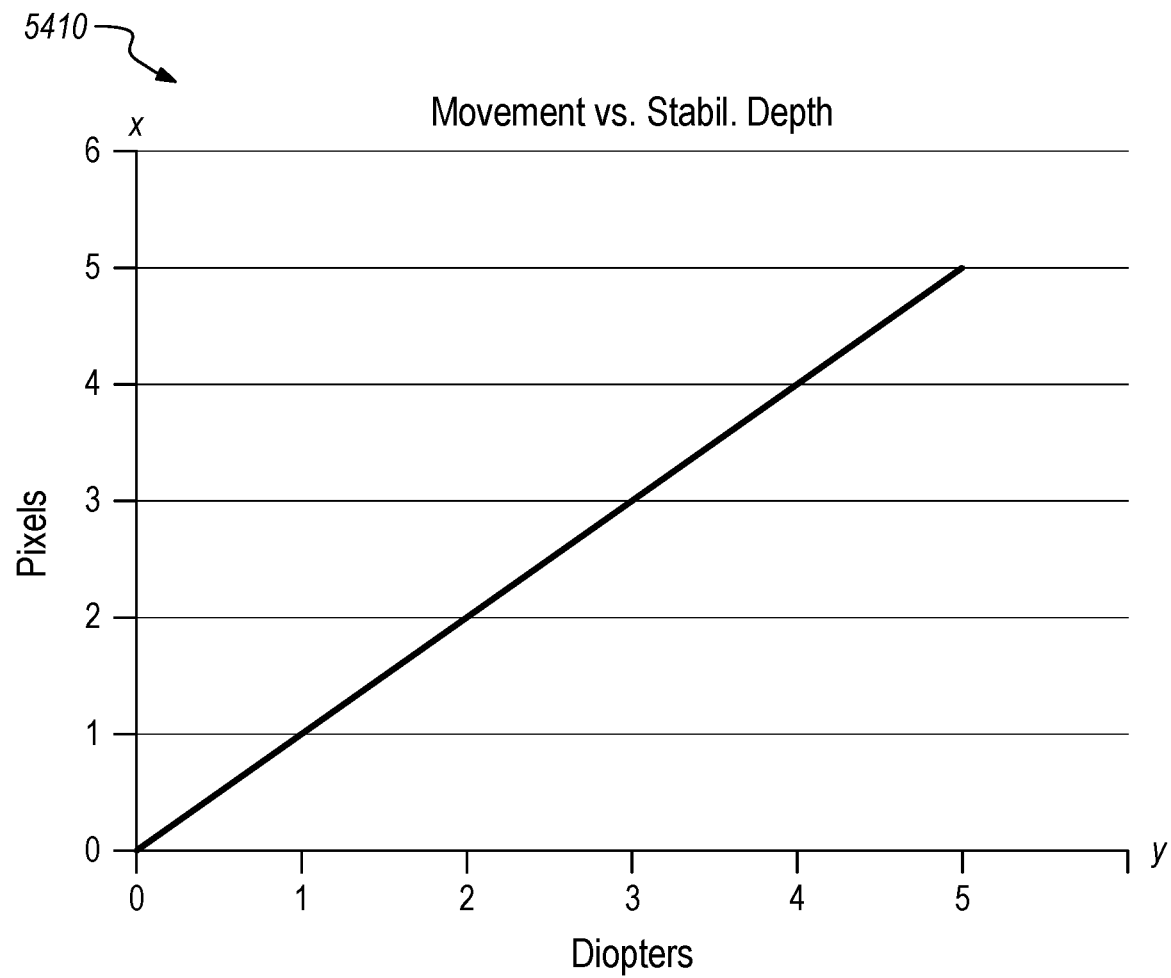
FIG. 54 is a graph illustrating a relationship between a stabilization depth and apparent movement of the virtual object with POV movement.

As shown in FIG. 54, in some embodiments, there is an inverse relationship between apparent movement of a virtual object (in terms of pixels) and the stabilization depth (in terms of diopters, which is an inverse of distance).

Figure 55:
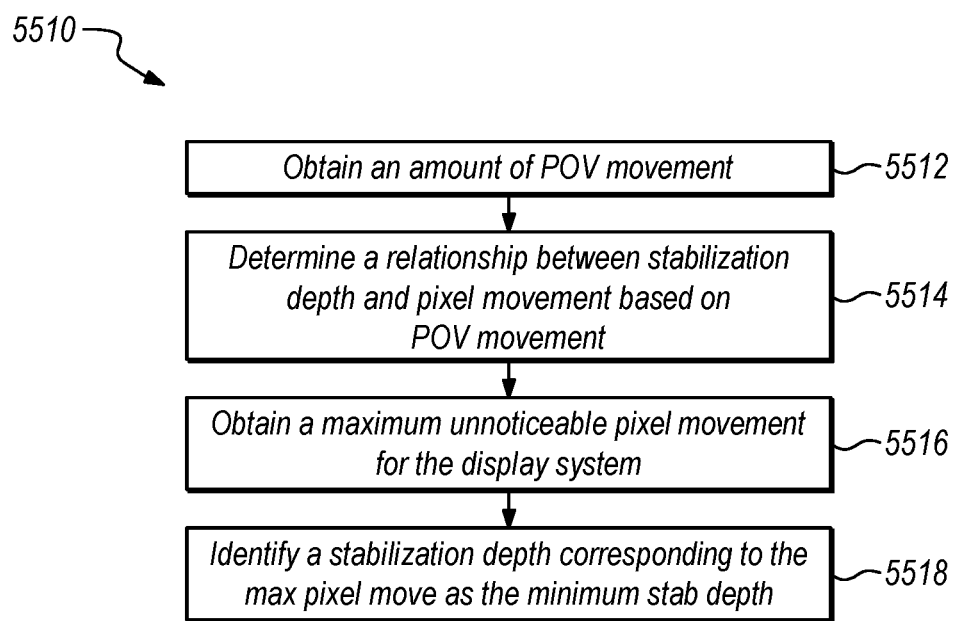
FIG. 55 is a flowchart illustrating a method for determining a stabilization depth, according to some embodiments.

FIG. 55 depicts a method of determining a stabilization plane depth. At step 5512, the system (e.g., a VR/AR/MR system) obtains an amount of POV movement. The amount of POV movement may be obtained from sensors on the system showing user/viewer movement, or the amount of POV movement may be a predetermined maximal POV movement value.

At step 5514, the system determines a relationship between stabilization depth and apparent virtual object movement based on the obtained POV movement. In some embodiments, a pixels versus diopters graph such as the one shown in FIG. 54 may be generated.

At step 5516, the system obtains a maximum unnoticeable/un-perceivable apparent virtual object movement for the display system as described above. This value may be measured in pixels.

At step 5518, the system identifies a stabilization depth corresponding to the maximum unnoticeable/un-perceivable apparent virtual object movement as the minimum stabilization depth.

At this minimum stabilization depth, POV movement up to the amount of POV movement obtained at step 5512 will be unnoticeable/un-perceivable to a typical user of the system. As such, the system may be configured to forgo warping of any virtual objects farther than this minimum stabilization depth from the as long as POV movement remains under the POV movement obtained at step 5512. Foregoing warping of these virtual objects improves the efficiency of the system by reducing system load in terms of processing, memory, communications channels, etc.

The disclosure includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

The invention claimed is:

1. A computer implemented method for determining a depth of a virtual object, comprising:
   re-projecting a first image of the virtual object corresponding to a first eye over a second image of the virtual object corresponding to a second eye at a plurality of depth planes at different respective depths to generate a plurality of respective combination images;
   measuring the re-projection error in each of the plurality of respective combination images to generate a plurality of re-projection errors;
   identifying a minimum re-projection error in the plurality of re-projection errors corresponding to a combination image of the plurality of respective combination images; and
   identifying a depth corresponding to the combination image having the minimum re-projection error as the depth of the virtual object.

2. The method of claim 1, further comprising:
   using the identified depth of the virtual object to warp the virtual object from a first point of view to a second point of view.

3. The method of claim 1, further comprising:
   receiving rendered virtual content data, the rendered virtual content data including the first image of the virtual object and the second image of the virtual object;
   receiving movement data indicating a user movement in a direction orthogonal to an optical axis; and
   generating warped rendered virtual content data based on the rendered virtual content data, the identified depth, and the movement data.

4. The method of claim 3, wherein the virtual object is the farthest virtual object in the a displayed view of the rendered virtual content data, the rendered virtual content comprises a near virtual object and a far virtual object, the warped rendered virtual content data corresponds to a warped near virtual object and a warped far virtual object, and a first position shift between the near virtual object and the warped near virtual object is substantially equal to a second position shift between the far virtual object and the warped far virtual object.

5. The method of claim 4, wherein generating the warped rendered virtual content data based on the rendered virtual content data, the identified depth, and the movement data reduces a parallax related artifact compared to the rendered virtual content data.

6. The method of claim 5, wherein the parallax related artifact is a disocclusion artifact.

7. The method of claim 1, wherein the plurality of depths consists of 64 depths.

8. The method of claim 1, wherein each of the plurality of depths corresponds to a one pixel difference in re-projecting the first image of the virtual object.

9. The method of claim 1, further comprising:
   prior to measuring the re-projection error in each of the plurality of respective combination images to generate a plurality of re-projection errors, dividing each of the depth planes into multiple frames.

10. The method of claim 9, wherein each depth plane is divided into approximately 10 frames.

11. The method of claim 1, wherein the first image and second image are down sampled versions of rendered virtual content data.

12. A computer implemented method for warping virtual content, comprising:
   receiving rendered virtual content data, the rendered virtual content data including a first image of stereo pair of images of a virtual object corresponding to a right eye and a second image of the stereo pair of images of the virtual object corresponding to a left eye;
   re-projecting the first image over the second image of the virtual object at a plurality of depth planes at different respective depths to generate a plurality of respective combination images;
   measuring the re-projection error in each of the plurality of respective combination images to generate a plurality of re-projection errors;
   identifying a minimum re-projection error in the plurality of re-projection errors corresponding to a combination image of the plurality of respective combination images; and
   identifying a depth corresponding to the combination image having the minimum re-projection error as the object depth of the virtual object;
   receiving movement data indicating a user movement in a direction orthogonal to an optical axis; and
   generating warped rendered virtual content data based on the rendered virtual content data, the object depth, and the movement data.

13. The method of claim 12, wherein the rendered virtual content data corresponds to a near virtual object and a far virtual object.

14. The method of claim 12, wherein a first position shift between the near virtual object and the warped near virtual object is substantially equal to a second position shift between the far virtual object and the warped far virtual object.

15. The method of claim 12, wherein generating the warped rendered virtual content data based on the rendered virtual content data, the far depth, and the movement data reduces a parallax related artifact compared to the rendered virtual content data.

16. The method of claim 15, wherein the parallax related artifact is a disocclusion artifact.

17. The method of claim 15, wherein the parallax related artifact is a smearing artifact.

18. The method of claim 15, wherein the parallax related artifact is a jitter artifact.

19. The method of claim 12, wherein the rendered virtual content data corresponds to a first depth segment, the method further comprising:
   receiving second rendered virtual content data corresponding to a second depth segment, the second rendered virtual content data including a second object depth; and
   generating warped second rendered virtual content data based on the second rendered virtual content data, the second object depth, and the movement data.

* * * * *